(12) United States Patent
Aghai et al.

(10) Patent No.: US 11,985,914 B2
(45) Date of Patent: May 21, 2024

(54) PREDATION-RESISTANT CAPSULAR PLANTING SYSTEMS AND METHODS

(71) Applicant: DRONESEED CO., Seattle, WA (US)

(72) Inventors: Matthew Mehdi Aghai, Seattle, WA (US); Grant Everest Canary, Seattle, WA (US); John William Thomson, Seattle, WA (US); Tiffani Manteuffel-Ross, Seattle, WA (US)

(73) Assignee: DRONESEED CO., Seattle, WA (US)

( * ) Notice: Subject to any disclaimer, the term of this patent is extended or adjusted under 35 U.S.C. 154(b) by 1358 days.

(21) Appl. No.: 16/460,747

(22) Filed: Jul. 2, 2019

(65) Prior Publication Data

US 2020/0137943 A1    May 7, 2020

Related U.S. Application Data

(60) Provisional application No. 62/756,451, filed on Nov. 6, 2018, provisional application No. 62/756,462, filed on Nov. 6, 2018.

(51) Int. Cl.
| *A01C 1/06* | (2006.01) |
| *A01C 1/04* | (2006.01) |
| *A01C 14/00* | (2006.01) |
| *A01C 15/16* | (2006.01) |
| *A01C 17/00* | (2006.01) |
| *B64C 39/02* | (2023.01) |
| *B64D 1/12* | (2006.01) |
| *G05D 1/00* | (2006.01) |
| *H02J 7/00* | (2006.01) |
| *H02M 3/335* | (2006.01) |
| *B64U 50/34* | (2023.01) |
| *B64U 101/00* | (2023.01) |

(52) U.S. Cl.
CPC ........... *A01C 1/06* (2013.01); *A01C 14/00* (2013.01); *A01C 15/16* (2013.01); *A01C 17/00* (2013.01); *B64C 39/024* (2013.01); *B64D 1/12* (2013.01); *G05D 1/0027* (2013.01); *H02J 7/00716* (2020.01); *H02J 7/007192* (2020.01); *H02M 3/33507* (2013.01); *B64U 50/34* (2023.01); *B64U 2101/00* (2023.01)

(58) Field of Classification Search
CPC ........... A01C 1/06; A01C 14/00; A01C 17/00; A01C 15/16
See application file for complete search history.

(56) References Cited

U.S. PATENT DOCUMENTS

| 3,561,159 A | 2/1971 | Adams, Jr. |
| 4,628,633 A | 12/1986 | Nilsson |
| 5,427,593 A | 6/1995 | Carlson et al. |
| 7,764,231 B1 | 7/2010 | Karr et al. |
| 8,146,539 B2 | 4/2012 | Robbins |
| 8,682,888 B2 | 3/2014 | Smith |
| 8,775,428 B2 | 7/2014 | Birdwell et al. |
| 9,014,516 B2 | 4/2015 | Boncyk et al. |
| 9,113,590 B2 | 8/2015 | Johnson |
| 9,131,644 B2 | 9/2015 | Osborne |
| 9,137,246 B2 | 9/2015 | Parry et al. |
| 9,202,252 B1 | 12/2015 | Smith et al. |
| 9,237,416 B2 | 1/2016 | Root et al. |
| 9,268,915 B2 | 2/2016 | Holmes et al. |
| 9,269,022 B2 | 2/2016 | Rhoads et al. |
| 9,277,525 B2 | 3/2016 | Dupray et al. |
| 9,286,511 B2 | 3/2016 | Chung et al. |
| 9,310,354 B2 | 4/2016 | Duncan et al. |
| 9,311,605 B1 | 4/2016 | Mewes et al. |
| 9,336,492 B1 | 5/2016 | Mewes et al. |
| 9,340,797 B2 | 5/2016 | Baum et al. |
| 9,354,235 B2 | 5/2016 | Roberts et al. |
| 9,355,154 B2 | 5/2016 | Nissen |
| 9,373,051 B2 | 6/2016 | Viviani |
| 9,373,149 B2 | 6/2016 | Abhyanker |
| 9,378,065 B2 | 6/2016 | Shear et al. |
| 9,378,509 B2 | 6/2016 | Terrazas et al. |
| 9,378,554 B2 | 6/2016 | Chang et al. |
| 9,383,750 B2 | 7/2016 | DeMarco et al. |
| 9,390,331 B2 | 7/2016 | Sant et al. |
| 9,412,140 B2 | 8/2016 | Molloy et al. |
| 9,420,737 B2 | 8/2016 | Spiller et al. |
| 9,423,249 B2 | 8/2016 | Deppermann et al. |
| 10,078,784 B2 | 9/2018 | Prouty et al. |
| 11,228,200 B2 | 1/2022 | Wang et al. |
| 2006/0042530 A1 | 3/2006 | Bodycomb et al. |
| 2009/0107370 A1 | 4/2009 | Ostlie |
| 2011/0035999 A1 | 2/2011 | Iter |
| 2011/0083363 A1 | 4/2011 | Vila et al. |
| 2011/0303137 A1 | 12/2011 | Tevs et al. |
| 2013/0081245 A1 | 4/2013 | Vavrina et al. |
| 2015/0183326 A1 | 7/2015 | Ryberg et al. |
| 2016/0039300 A1 | 2/2016 | Wang et al. |
| 2016/0039542 A1 | 2/2016 | Wang |
| 2016/0073573 A1 | 3/2016 | Ethington et al. |
| 2016/0167807 A1 | 6/2016 | Wang |
| 2016/0234997 A1 | 8/2016 | Camacho |
| 2016/0286715 A1 | 10/2016 | Kraus |
| 2017/0029109 A1 | 2/2017 | Chase |

(Continued)

FOREIGN PATENT DOCUMENTS

| CN | 101103666 A | 1/2008 |
| CN | 104274424 A | 1/2015 |

(Continued)

OTHER PUBLICATIONS

Extended European Search Report and Search Opinion received for EP Application No. 19882399.9, dated Oct. 7, 2022, 15 pages.

(Continued)

*Primary Examiner* — Zohreh A Fay
(74) *Attorney, Agent, or Firm* — AEON Law, PLLC; Adam L. K. Philipp; Jonathan E. Olson

(57) ABSTRACT

Methods and systems are presented for making good use of recently obtained biometric data, for configuring propagule capsules (e.g. containing seeds or spores with growth media and other helpful materials) for deployment via drones so that each has an improved chance of survival, and for configuring drones or piloted craft for safe fleet deployment in remote locations.

20 Claims, 29 Drawing Sheets

(56) References Cited

U.S. PATENT DOCUMENTS

| | | |
|---|---|---|
| 2017/0103263 A1 | 4/2017 | Prouty et al. |
| 2017/0282091 A1 | 10/2017 | Wang et al. |
| 2017/0285927 A1 | 10/2017 | Wang et al. |
| 2017/0286089 A1 | 10/2017 | Wang et al. |
| 2017/0288976 A1 | 10/2017 | Wang et al. |
| 2017/0359943 A1 | 12/2017 | Calleija et al. |
| 2018/0000028 A1 | 1/2018 | Suntych |
| 2018/0024422 A1 | 1/2018 | Ye |
| 2018/0024570 A1 | 1/2018 | Hutson |
| 2018/0035606 A1 | 2/2018 | Burdoucci |
| 2018/0075834 A1 | 3/2018 | Fong |
| 2018/0077855 A1 | 3/2018 | Hyman et al. |
| 2018/0141453 A1 | 5/2018 | High et al. |
| 2018/0229859 A1 | 8/2018 | Evans |
| 2018/0263170 A1 | 9/2018 | Aghai et al. |
| 2018/0287833 A1 | 10/2018 | Kennedy |
| 2018/0312069 A1 | 11/2018 | McClymond |
| 2020/0002015 A1 | 1/2020 | Hiller et al. |

FOREIGN PATENT DOCUMENTS

| | | |
|---|---|---|
| CN | 104758271 A | 7/2015 |
| CN | 105191802 A | 12/2015 |
| CN | 106258069 A | 1/2017 |
| CN | 206932600 U | 1/2018 |
| CN | 105917496 B | 7/2021 |
| EP | 2677646 A2 | 12/2013 |
| JP | 2014075903 A | 4/2014 |
| WO | 2016014631 A1 | 1/2016 |
| WO | 2016049217 A1 | 3/2016 |

OTHER PUBLICATIONS

Partial Supplementary European Search Report for EP Patent Application No. 19882399.9 dated Jul. 5, 2022, 17 pages.

International Search Report dated Jan. 17, 2020, for PCT/US19/060105, filed Nov. 6, 2019.

Written Opinion dated Jan. 17, 2020, for PCT/US19/060105, filed Nov. 6, 2019.

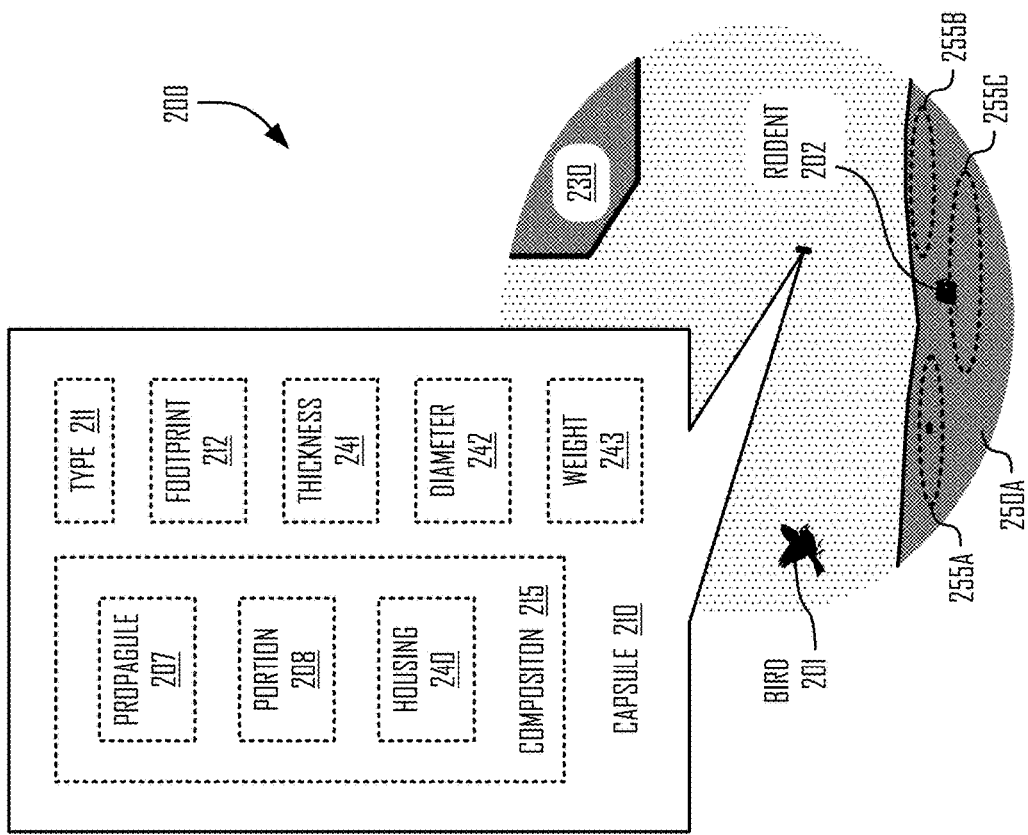
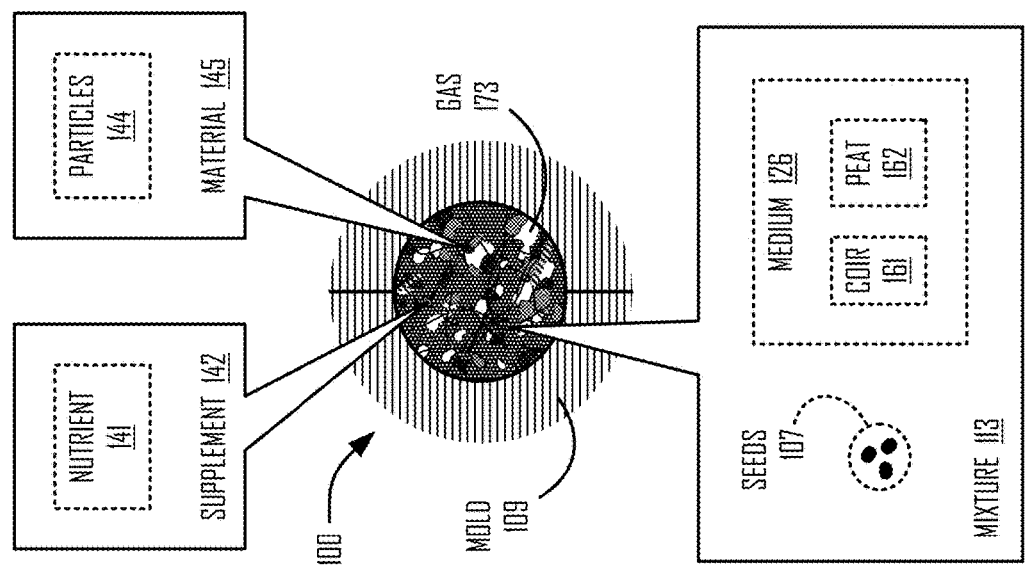

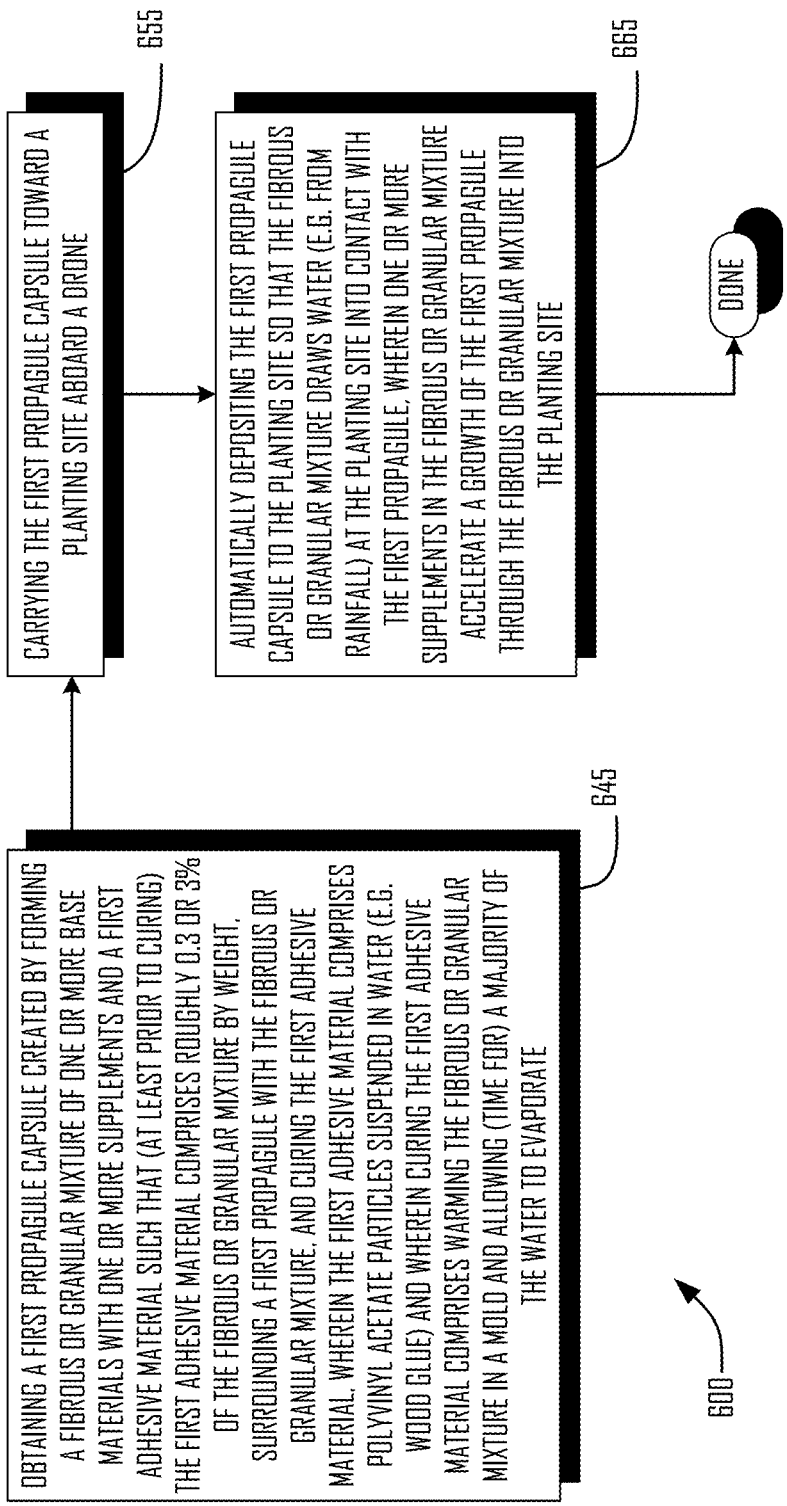

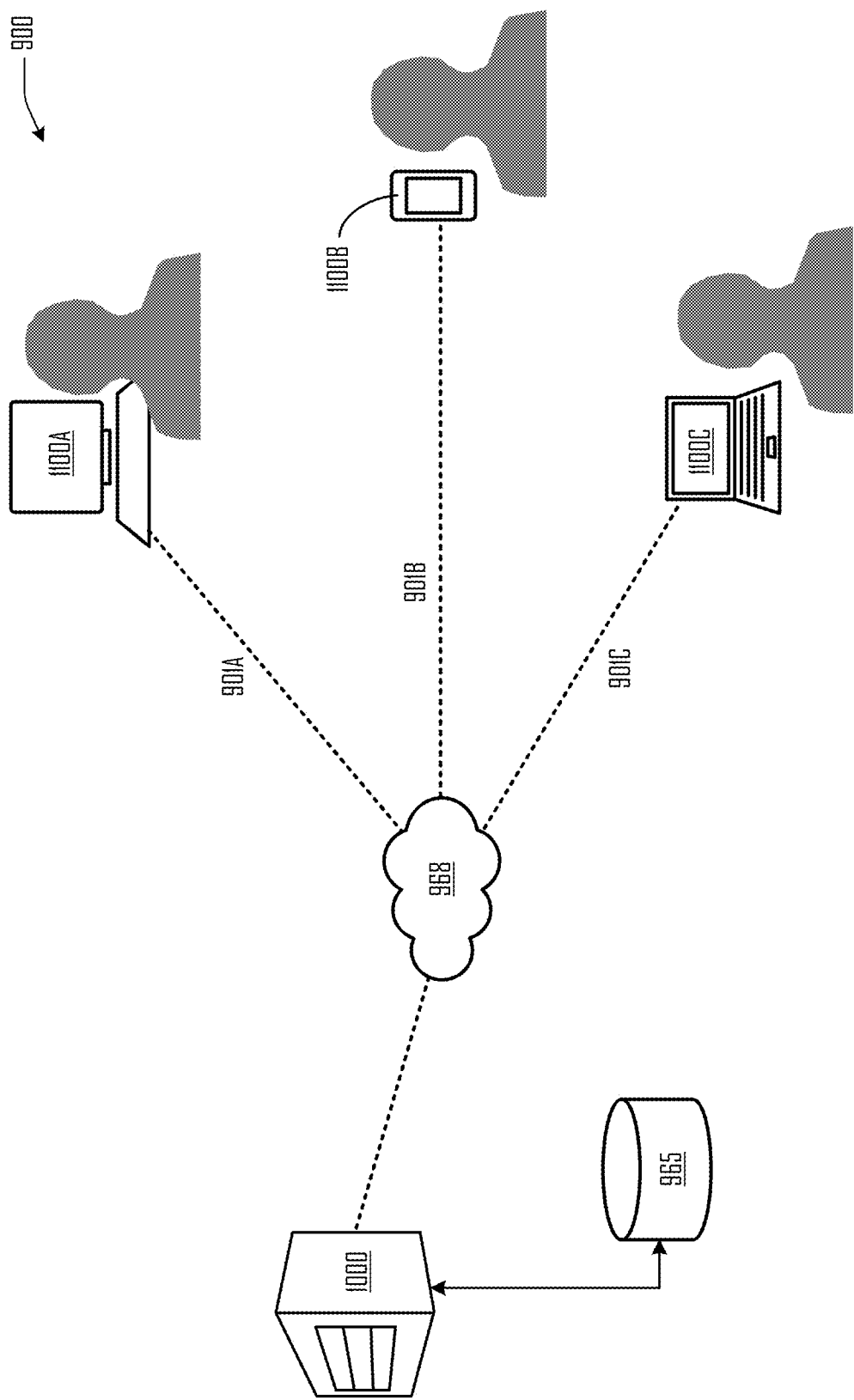

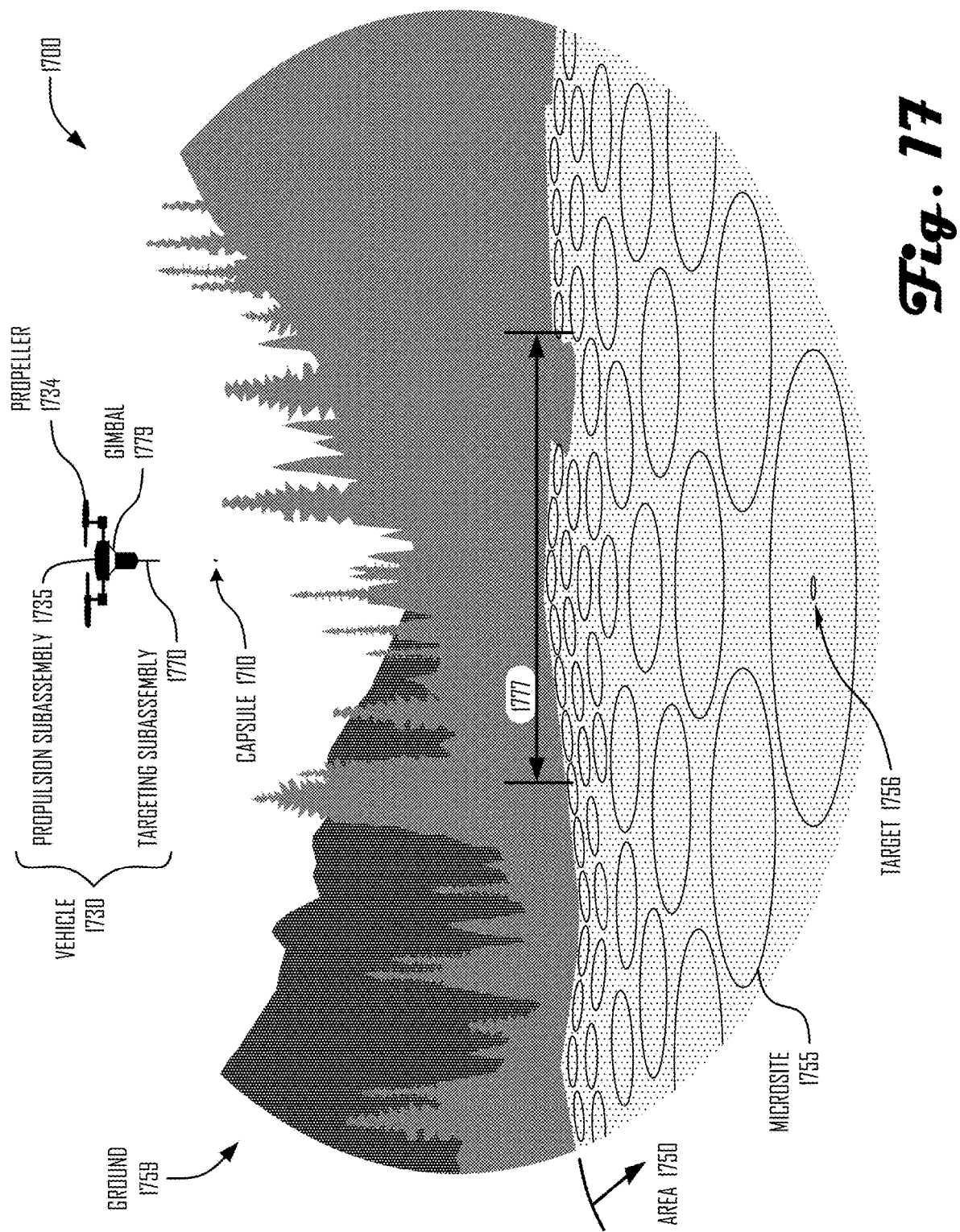

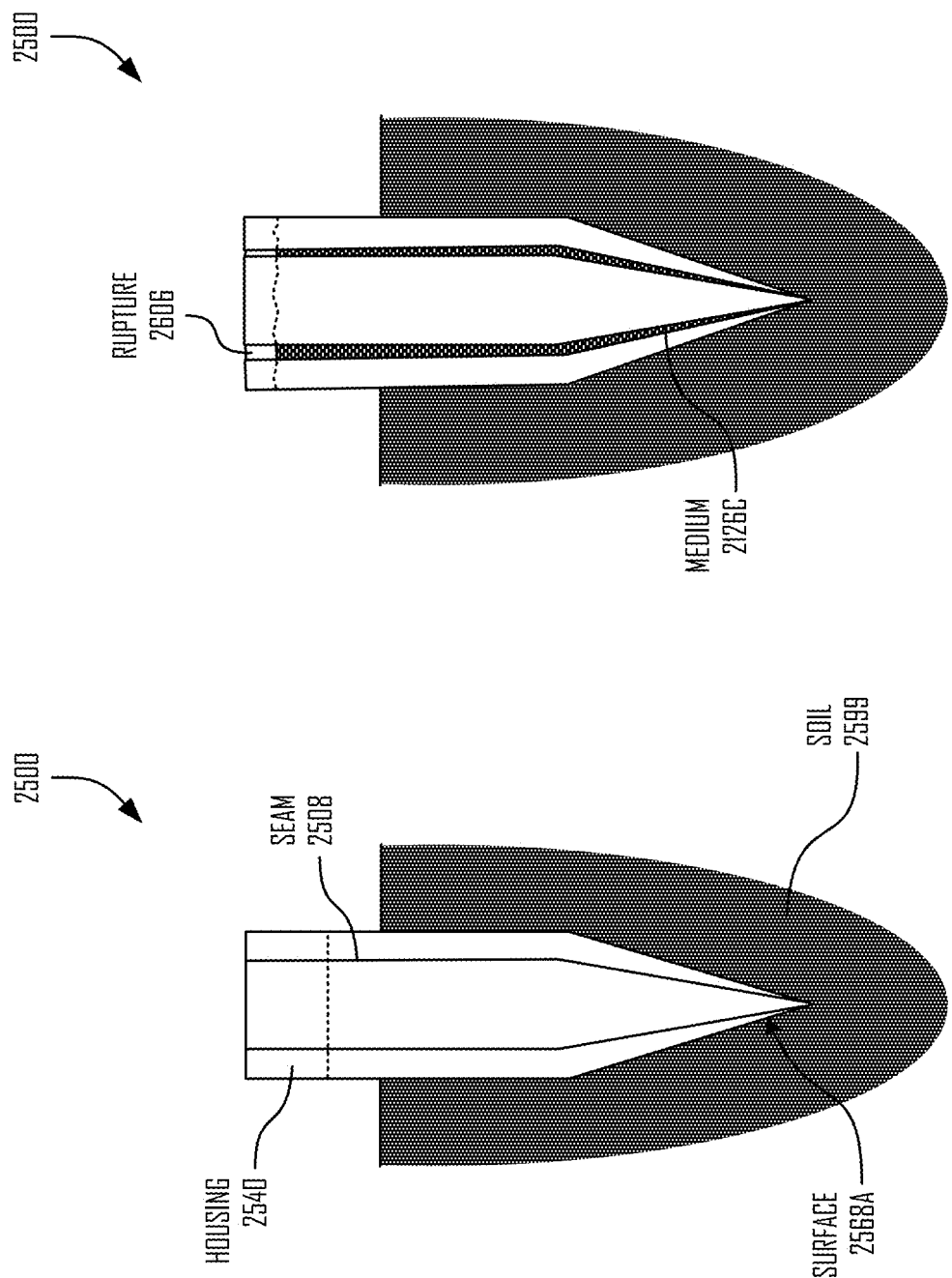

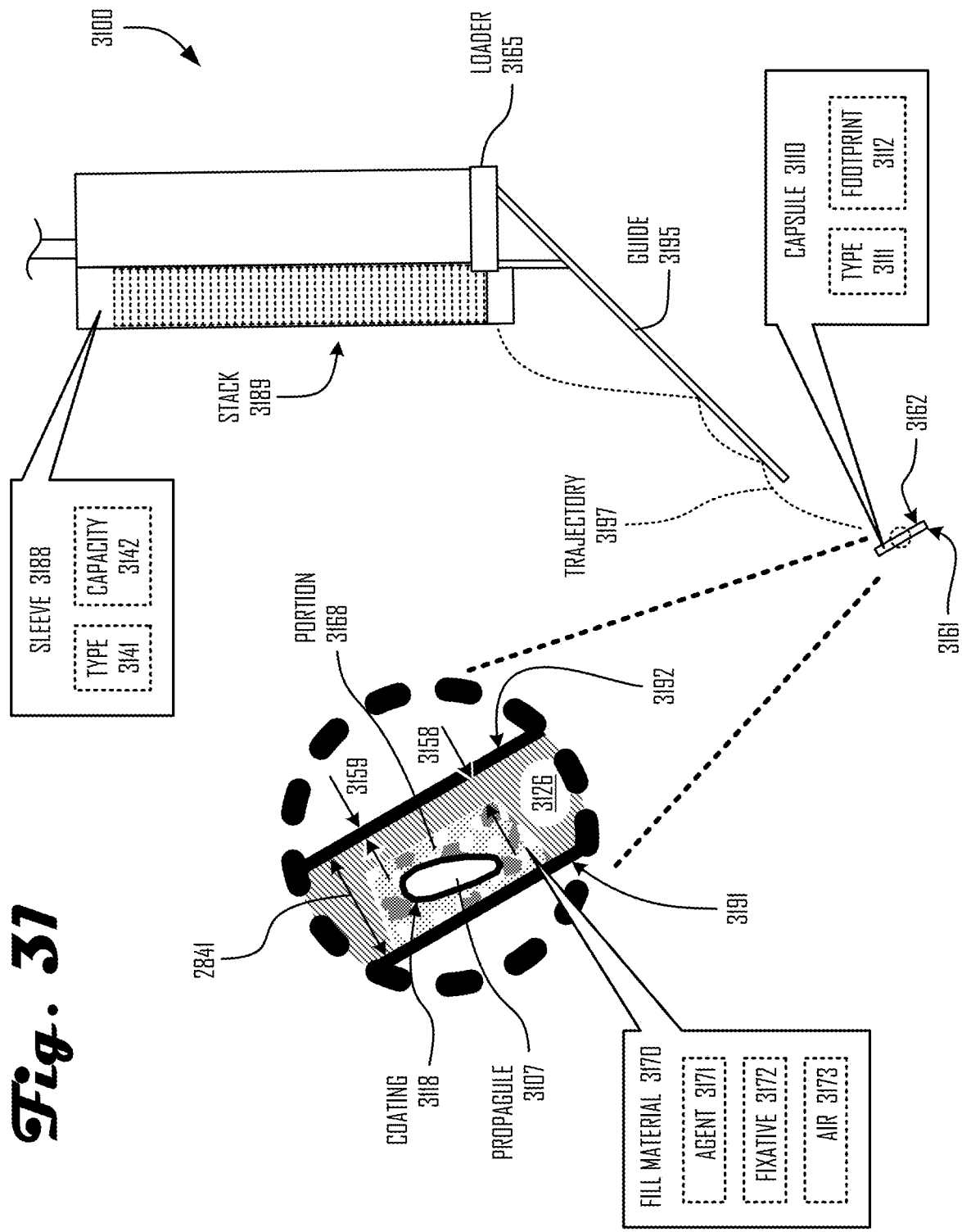

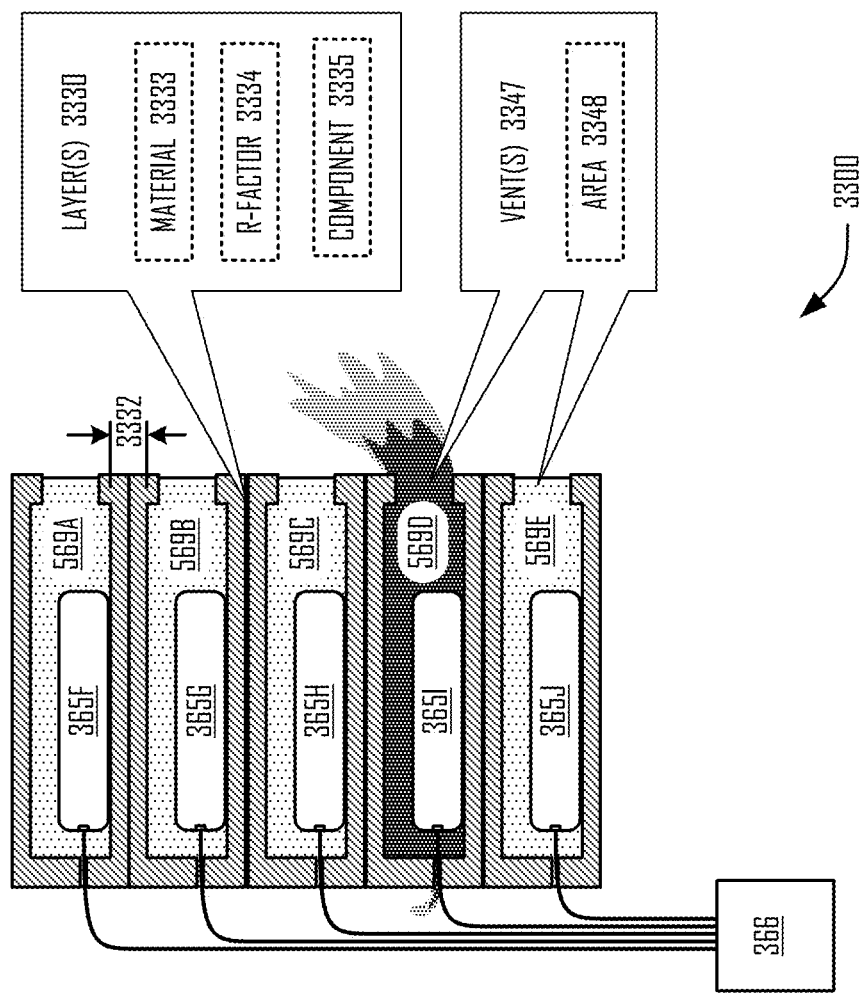

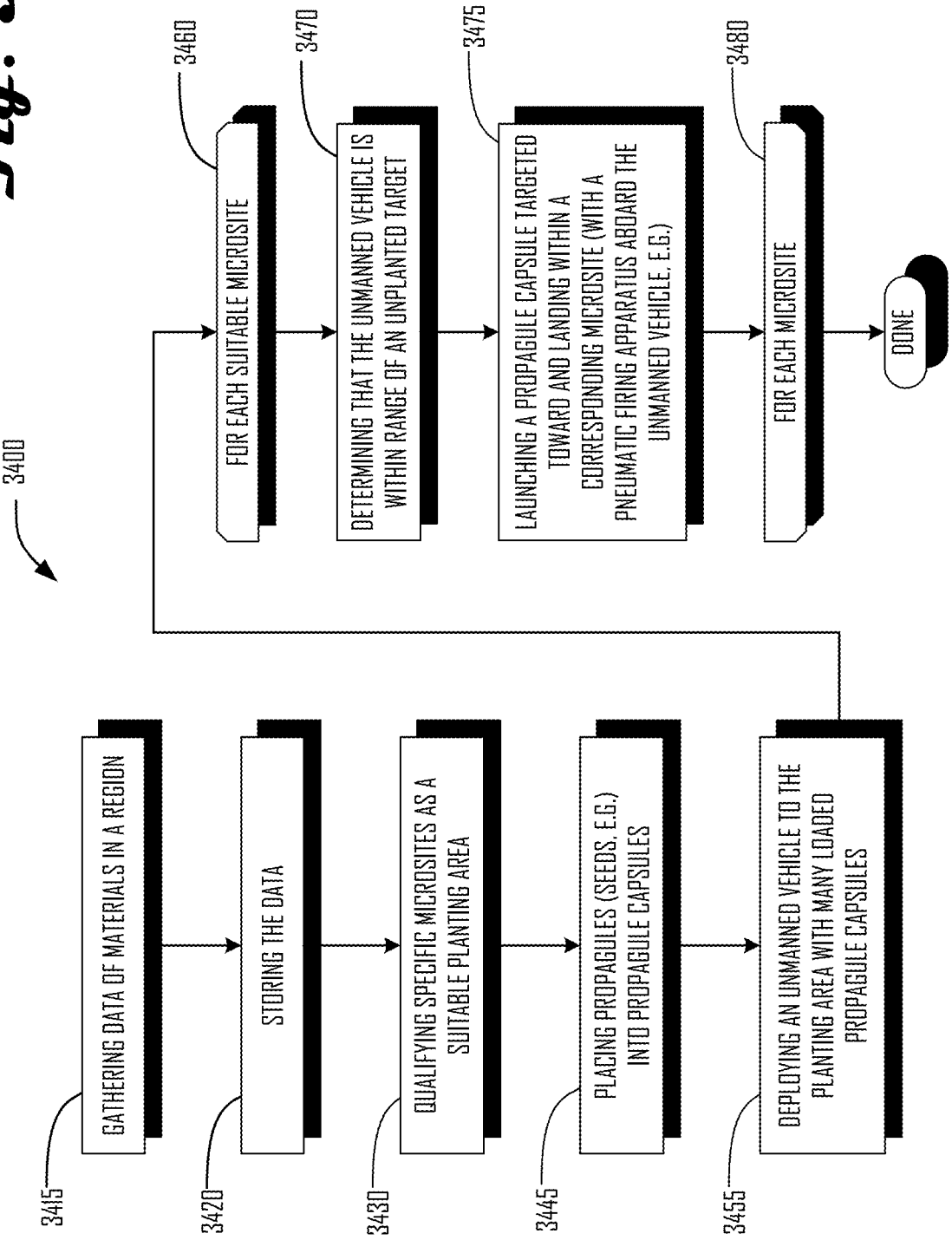

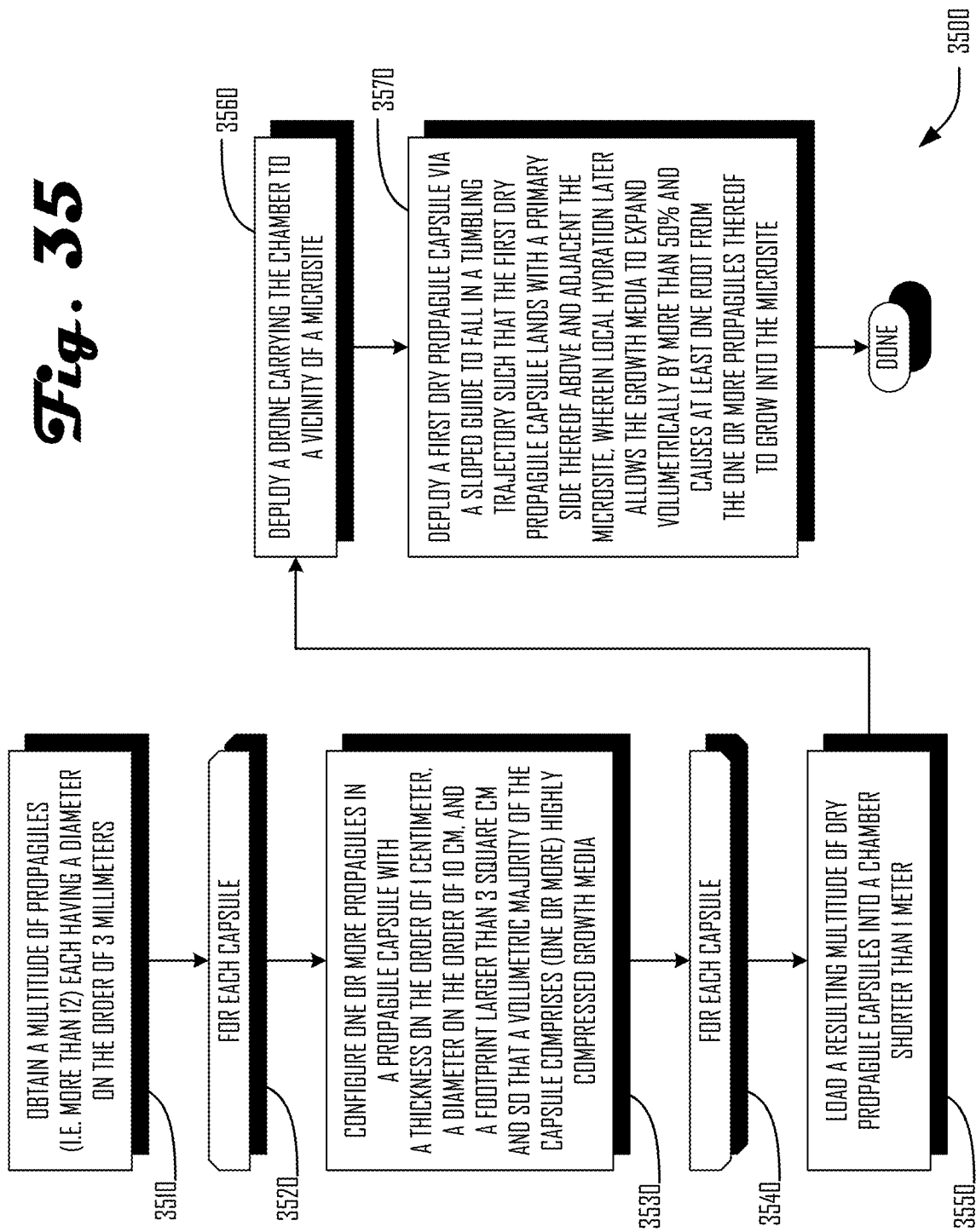

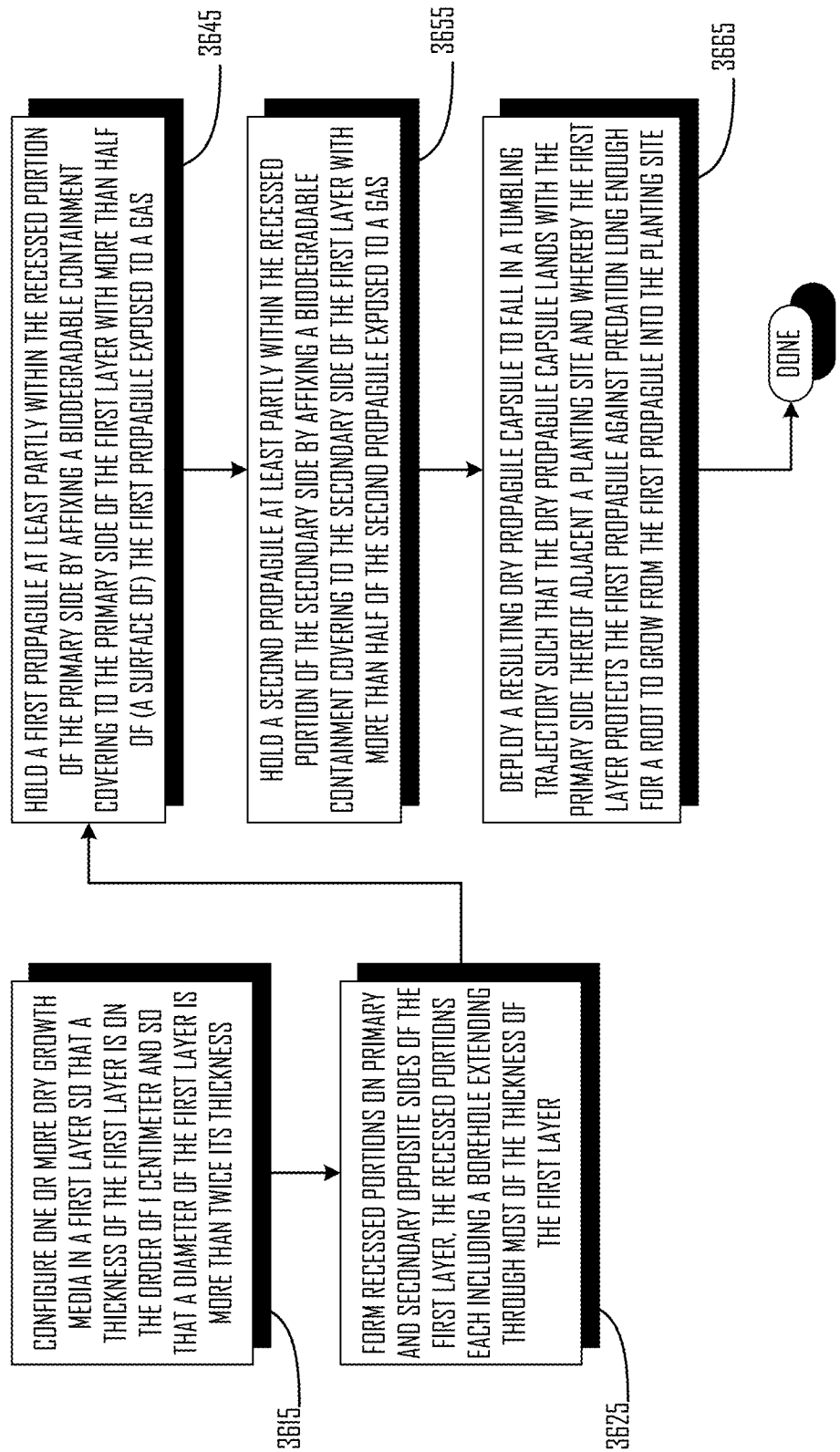

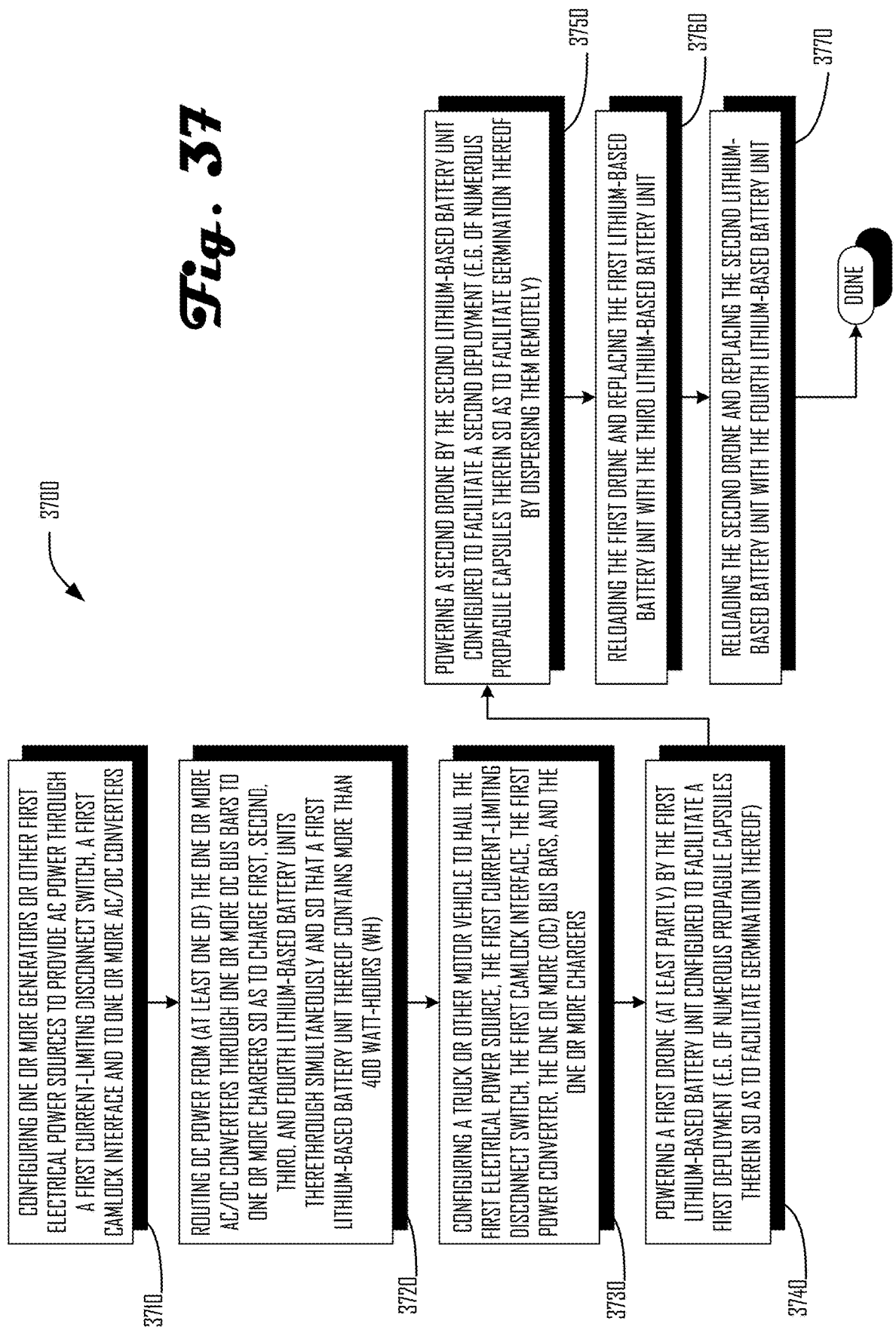

PREDATION-RESISTANT CAPSULAR PLANTING SYSTEMS AND METHODS

BRIEF DESCRIPTION OF THE DRAWINGS

FIG. 1 illustrates exemplary special-purpose-hardware in which a mixture that includes seeds is being processed in a mold according to one or more embodiments.

FIG. 2 illustrates a physical system in which propagule capsules are being deployed into environment with wildlife as described herein according to one or more embodiments.

FIG. 6 illustrates a flow chart of operations relating to (at least partly) automated deployment for large scale remote planting and related aspects of forestry/agriculture.

FIG. 9 illustrates an exemplary special-purpose system by which various portable client devices interact with a network according to one or more embodiments.

FIG. 17 illustrates an aerial deployment planting system configured to access microsites over irregular ground according to one or more embodiments.

FIG. 25 illustrates a deployed propagule capsule about to undergo post-deployment changes induced primarily by moisture according to one or more embodiments.

FIG. 26 illustrates the deployed propagule capsule of FIG. 25 having undergone post-deployment structural changes amenable to propagule survival according to one or more embodiments.

FIG. 31 illustrates a system including a container with a multitude of wide base propagule capsules and shows a magnified view of an inside of one of the capsules in a tumbling trajectory.

FIG. 33 illustrates a portable system configured to facilitate safe remote recharging of battery units.

FIG. 34 illustrates a flow chart of operations relating to an automated deployment planting.

FIG. 35 illustrates a flow chart of operations relating to automated deployment for planting or other operations relating to forestry/agriculture.

FIG. 36 illustrates another flow chart of operations relating to automated deployment planting.

FIG. 37 illustrates another flow chart of operations relating to automated deployment planting.

DETAILED DESCRIPTION

Figure 3:
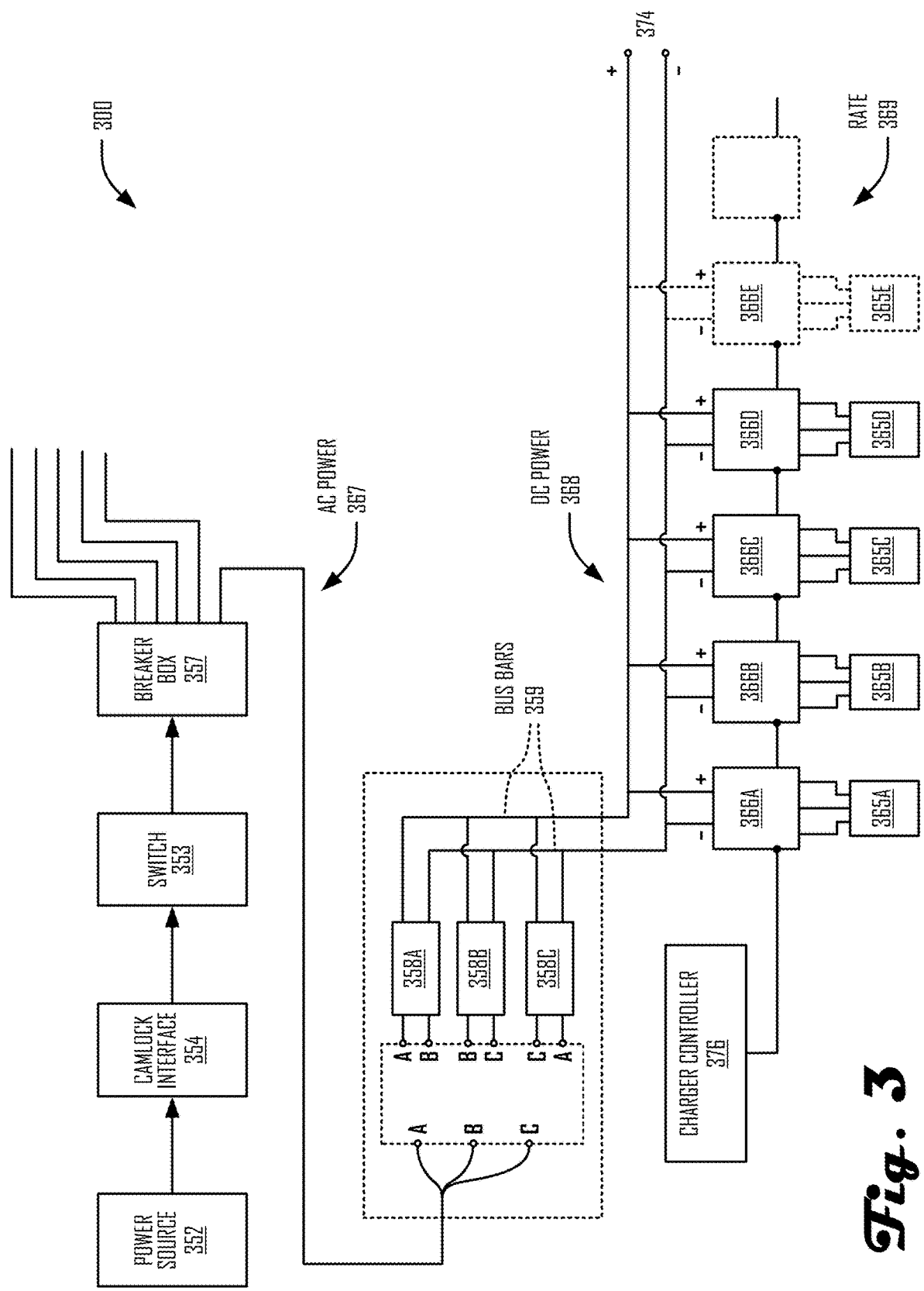
FIG. 3 illustrates a schematic of a power distribution system suitable for charging multiple lithium-based batteries according to one or more embodiments.

The detailed description that follows is represented largely in terms of processes and symbolic representations of operations by conventional computer components, including a processor, memory storage devices for the processor, connected display devices and input devices. Furthermore, some of these processes and operations may utilize conventional computer components in a heterogeneous distributed computing environment, including remote file servers, computer servers and memory storage devices.

The phrases "in one embodiment," "in various embodiments," "in some embodiments," and the like are used repeatedly. Such phrases do not necessarily refer to the same embodiment. The terms "comprising," "having," and "including" are synonymous, unless the context dictates otherwise. As used herein a quantity is "about" a value X only if they differ by less than a factor of 3, unless context dictates otherwise. As used herein "many" means ten or more, unless context dictates otherwise. As used herein "numerous" means hundreds or more, unless context dictates otherwise. As used herein a structure is "porous" only if it has numerous moisture-permeable pores (i.e. holes smaller than 5 microns in diameter) pervading therethrough. As used herein a structure is "absorbent" only if it is porous enough to soak up more than 5 microliters of liquid per hour by wicking (capillary action, e.g.).

"Aboard," "about," "above," "absorbent," "active," "adjacent," "advantageous," "aerial," "allowed," "along," "artificial," "at least," "automatic," "balanced," "below," "between," "biodegradable," "biometric," "by," "capsular," "closed," "compressed," "concentrated," "concerning," "condensed," "conditional," "current," "deployed," "downward," "each," "enhanced," "enough," "extending," "first," "forestry," "forward," "funnel-shaped," "having," "highly," "in response," "indicated," "integrated," "into," "lateral," "latticed," "local," "location-specific," "longitudinal," "made of," "more," "narrowest," "near," "non-toxic," "numerous," "obtained," "of," "opened," "optical," "outside," "part," "penetrated," "photographic," "pneumatic," "porous," "prioritized," "processed," "qualified," "received," "remote," "retracted," "the," "scalar," "second," "selected," "selected," "shorter," "slight," "slippery," "smooth," "some," "staging," "stratified," "thereof," "third," "toward," "transmitted," "tubular," "tumbling," "unmanned," "upon," "wherein," "within," or any other such descriptors herein are used in their normal yes-or-no sense, not merely as terms of degree, unless context dictates otherwise. In light of the present disclosure those skilled in the art will understand from context what is meant by "remote" and by other such positional descriptors used herein. Terms like "processor," "center," "unit," "computer," or other such descriptors herein are used in their normal sense, in reference to an inanimate structure. Such terms do not include any people, irrespective of their location or employment or other association with the thing described, unless context dictates otherwise. "For" is not used to articulate a mere intended purpose in phrases like "circuitry for" or "instruction for," moreover, but is used normally, in descriptively identifying special purpose software or structures.

As used herein a structure is "biodegradable" if more than half of the material thereof (by weight) comprises any combination of (1) non-toxic water-soluble material; (2) inorganic material that can be decomposed by microorganisms; or (3) organic material that can be broken down into carbon dioxide, water, methane, or simple organic molecules.

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications and equivalents. In alternate embodiments, additional devices, or combinations of illustrated devices, may be added to, or combined, without limiting the scope to the embodiments disclosed herein.

FIG. 1 illustrates a system 100 comprising special-purpose-hardware suitable for use in preparation for situating one or more seeds 107 in a fibrous or granular planting medium 126 (optionally comprising a compressible ingredient such as coconut coir 161 or peat 162). Mixtures 113 of such components may further comprise one or more nutrients 141, pest deterrents, or other supplements. Alternatively or additionally, such mixtures 113 may include one or more instances of particles 144 or other materials 145 such as polyvinyl acetate particles 144 suspended in water (e.g. wood glue).

In some variants such compositions (comprising the mixture 113 with one or more supplements with other materials) may be pressed into a mold 109 and treated such that one or more adhesive materials 145 thereof (within an order of magnitude of 3% of the total composition by weight when introduced) thereof are blended in and cured under pressure (in mold 109, e.g.). In some variants such treatment(s) may include exerting a net pressure within an order of magnitude of 5 atmospheres upon the composition, heating the composition 5-50 degrees C. to reduce the relative humidity, injecting a dry gas 173 (e.g. dehumidified air) through the composition, ventilating a vicinity of the mold, or some combination of these. As used herein growth media 126 are "highly compressed" if they have been shaped using a pressure greater than 1.5 atmospheres and are reduced in one or more dimensions by more than 1% and configured to expand (e.g. upon hydration).

As used herein a material is "water-soluble" if it is at least 10% more soluble in water than corn starch unless context dictates otherwise. As used herein a number is "on the order of" another or "roughly" the same as another if they differ by less than a factor of ten (i.e. by less than an "order of magnitude"). As used herein a structure is (deemed nominally) "dry" if less than 5% of the weight of the structure is (unsealed, unfrozen, and otherwise) available liquid hydration unless context dictates otherwise. As used herein hydration is "available" to a structure if it is absorbed into a growth medium thereof or configured so that the growth medium can draw the hydration in or through it unless context dictates otherwise. Thus some hydration within the structure (frozen or encapsulated water, e.g.) may not be "available" at times even if it is adjacent one or more growth media 126 unless context dictates otherwise.

Referring now to FIG. 2, there is shown a system 200 that includes a winged, wheel-borne, or other motorized vehicle 230 configured to deliver propagule capsules 210 (optionally each comprising a porous housing 240) to respective sites 255A-C of a planting area (tract 250A, e.g.). In some variants magazines or other cartridges as described below may contain or comprise several individual propagule capsules 210 therein. In some variants such housings 240 may have a defined interior volume (e.g. with seeds therein). Alternatively or additionally, the propagule capsules 210 may also comprise hydrogels, polymers, or polyacrylamides for preventing germinated propagules from drying out. Having hydrogels, polymers, or polyacrylamides in the propagule capsules 210 and near roots of a seedling or other propagule 207 desirably improves access to water while maintaining aeration. Additionally, the propagule capsules 210 may further comprise fertilizers, mycorrhizal fungi, mycelium, pesticides, herbicides, predator deterrents, or any combination thereof. Such olfactory or gustatory predator deterrent supplements 142, for example, may be a capsule's primary defense against birds 201 and rodents 202 up to and during germination. In addition to the housing 240 and other portions 208 (nutrients 141 and other particles 144, e.g.) forming the composition 215, the success of each capsule 210 may depend on one or more types 211, footprint 212, thickness 241, diameter 242, weight 243, and other aspects of a capsule 210 also, as further described below. All such extensive properties of items and materials are nominal or median values, unless context dictates otherwise.

Referring now to FIG. 3, there is shown a (schematic of a) power distribution system 300 suitable for charging multiple (lithium-ion polymer battery or other) lithium-based battery units 365 according to one or more embodiments, even in remote locations. One or more (instances of)

power sources 352 (e.g. generators or fuel cells) are operably coupled (directly or otherwise) to provide alternating-current (AC) power 367. In some variants such AC power 367 passes through one or more current-limiting disconnect switches 353, one or more camlock interfaces 354, one or more breaker boxes 357, or some combination of these and into one or more alternating-current-to-direct-current (AC/DC) converters 358A-C. This allows the one or more AC/DC converters 358 to provide direct current (DC) power 368 at a nominal DC voltage 374 (e.g. more than 10 and less than 100 volts) across multiple chargers 366A-E to one or more battery units 365A-E operably coupled to each under the control of one or more charger controllers 376 operably coupled therewith as shown.

Figure 4:
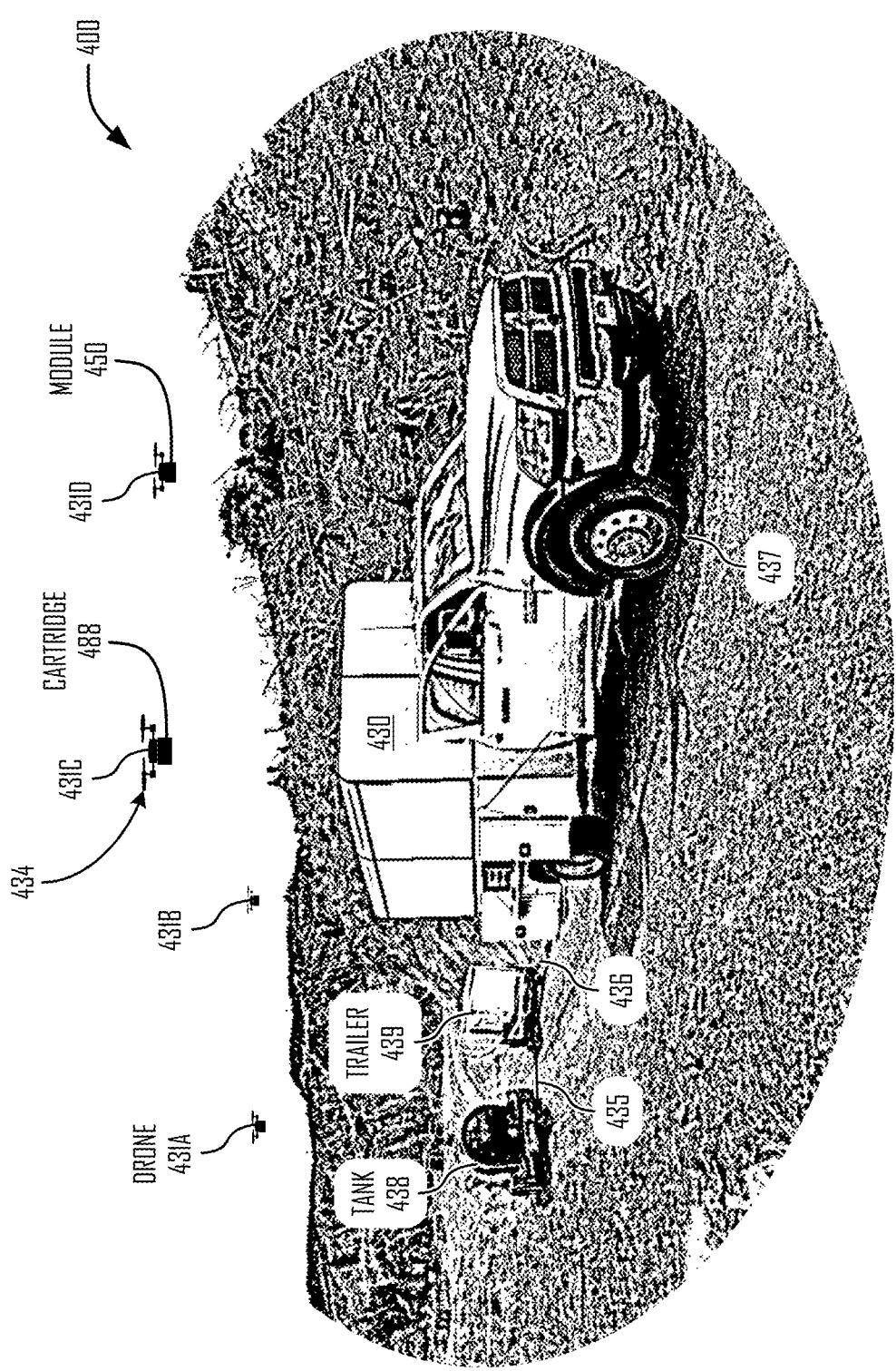
FIG. 4 illustrates a field deployment of a system by which a wheel-borne vehicle (e.g. a truck and trailer) provides power distribution to several airborne drones according to one or more embodiments.

FIG. 4 illustrates a portable power deployment system 400 by which a single wheel-borne vehicle 230 (e.g. a truck 430 and trailer 439) provides efficient power distribution to keep a fleet of 4 or more battery-powered drones 431A-D simultaneously airborne with as few as 1-2 human facilitators. A generator (implementing a power source 352) aboard the trailer 439 is removed and separated from its truck 430 by more than ten meters (for safety and sound abatement) and coupled to a fuel tank 438 by a hose 435. Heavy duty welding cables 436 carry AC power 367 from the power source 352 to a camlock 354 interface aboard the truck 430. See FIG. 8. This allows one battery 365 to power a current drone route/flight while a successor charges aboard the truck 430 as shown below. See FIG. 5. When each drone 431 (lands or otherwise) completes a route, planting cartridges 488 or other modules 450 are replaced and one or more depleted battery units 365 aboard are replaced with one or more recharged ones. In some variants each lithium-based battery unit 365 is charged with an average DC current exceeding 10 amperes so that even with a nominal charging voltage lower than 30 volts a charge exceeding 400 watt-hours (Wh) can be achieved in less than 60 minutes. (As used herein a "drone" may refer to a motor-propelled device that has no human occupants, whether or not it is piloted and whether or not it is capable of flight.)

Figure 5:
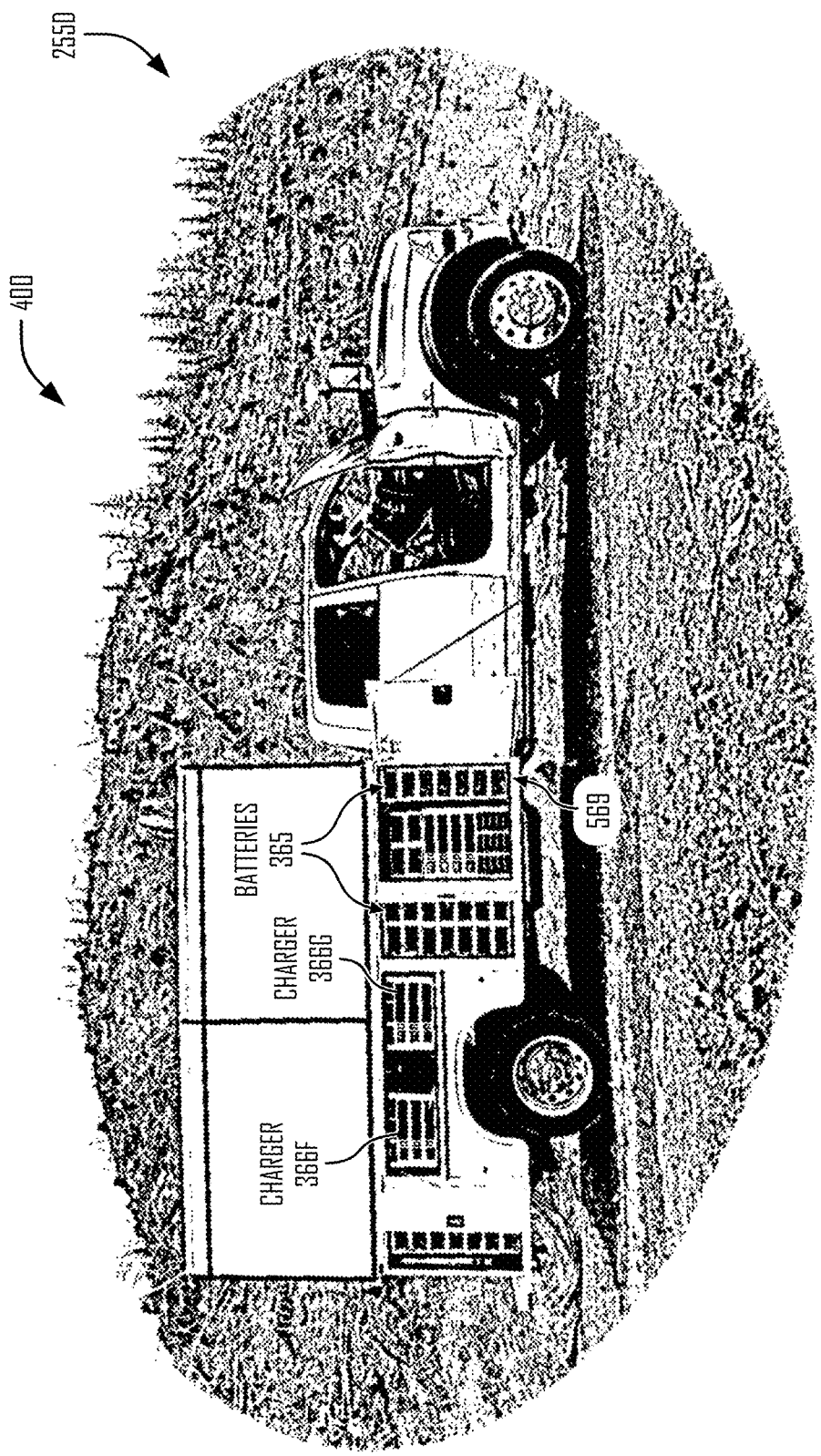
FIG. 5 illustrates additional (optional) aspects of the system of FIG. 4 according to one or more variant embodiments.

FIG. 5 illustrates another view of the portable power deployment system 400 of FIG. 4. Charging battery units 365 are held in respective outward-facing cubby holes 569 made of a fire-resistant material (e.g. containing a majority of gypsum by weight). Each cubby hole 569 is small enough to hold a single charging battery 365 with an open front to minimize the risk of a single exploding or burning battery detonating or igniting others. Each cubby faces away from the truck 430 for the same reason. Each charger 366F-G is operably coupled to several charging battery units 365. A significant majority of each drone's activity (e.g. deploying capsules 210 to nearby sites 255D) at any given work site occurs while replacement batteries are recharging, but idle time is minimized by the unprecedented rates of DC power 368 simultaneously distributed to several recharging battery units 365 by each deployed truck 430 at a remote work site (i.e. remote from any fixed power grid access). See FIG. 34.

FIG. 6 illustrates a flow chart of operations relating to (at least partly) automated deployment for large scale remote planting and related aspects of forestry/agriculture. Operation 645 describes obtaining a first propagule capsule created by forming a slurry or other mixture of one or more base materials with one or more supplements and a first adhesive material such that the first adhesive material comprises roughly 0.3 or 3% of the fibrous or granular mixture by weight, surrounding a first propagule with the fibrous or granular mixture, and curing the first adhesive material, wherein the first adhesive material comprises polyvinyl acetate particles suspended in water and wherein curing the first adhesive material comprises warming the fibrous or granular mixture in a mold and allowing (time for) a majority of the water to evaporate (e.g. a planting service building or buying numerous capsules 210 made in a mold 109 by forming a fibrous or granular mixture 113 of one or more growth media 126 with one or more supplements 142 and a first adhesive material 145 such that the adhesive material comprises one the order of 0.3% or of 3% or less by weight). This can occur, for example, in a context in which the curing is done quickly enough and under circumstances that forming the capsule 210 does not trigger germination, in which the mixture 113 surrounds one or more non-photoblastic seeds 107 therein, and in which irregular opacity of the fibrous or granular mixture 113 would otherwise cause unpredictable germination of a crop such as by delaying germination unduly (e.g. in the case of a negatively photoblastic seed species such as an onion) or by triggering germination before sufficient hydration is available (e.g. in the case of a positively photoblastic seed). Alternatively or additionally, such formation may be done using a factory mold 109 configured to exert significant pressure (e.g. within an order of magnitude of 15 atmospheres) upon a compressible component of the growth medium 126 so that hydration from the planting site triggers substantial volumetric expansion (i.e. of more than 10%). In some variants, moreover, such propagule capsules 210 may be constructed without any adhesive material 145.

As used herein a seed is "photoblastic" if a phytochrome thereof mediates the seed's photochemical response such that germination thereof is affected by light. Most sagebrush, onion, and lily seeds are therefore "photoblastic" as used herein. As used herein a seed is "non-photoblastic" if it has no such phytochromes such that a germination thereof is instead controlled by temperature, water, chemical inhibitors, or other such factors other than a photochemical response within the seed 107. Substantially all genetically unmodified conifer seeds are therefore "non-photoblastic" as used herein.

Operation 655 comprises carrying the first propagule capsule toward a planting site aboard a drone (e.g. a planting service programming and operating a fleet of several drones 431 in a single deployment—i.e. without moving a base of operations). This can occur, for example, in a context in which the flight patterns are designed in advance and in which each drone 431 (e.g. in a fleet of four or more) takes several flights in succession while a next preparatory operation (e.g. recharging) occurs all without moving a truck 430 serving as the base of operations.

Operation 665 describes automatically depositing the first propagule capsule to the planting site so that the fibrous or granular mixture draws water at the planting site into contact with the first propagule, wherein one or more supplements in the fibrous or granular mixture accelerate a growth of the first propagule through the fibrous or granular mixture into the planting site (e.g. a planting service delivering propagule capsules 210 to numerous selected sites 255 either in a dormant state or in a wet season so that water from the environment can trigger germination and sustain seedlings long enough so that an acceptable fraction of them survive and take root in respective planting sites 255D). This can occur, for example, in a context in which the planting service acquires institutional knowledge incrementally developed over time (e.g. as to how to minimize seed predation and place capsules 210 with precision) such as that presented in this document.

Figure 7:
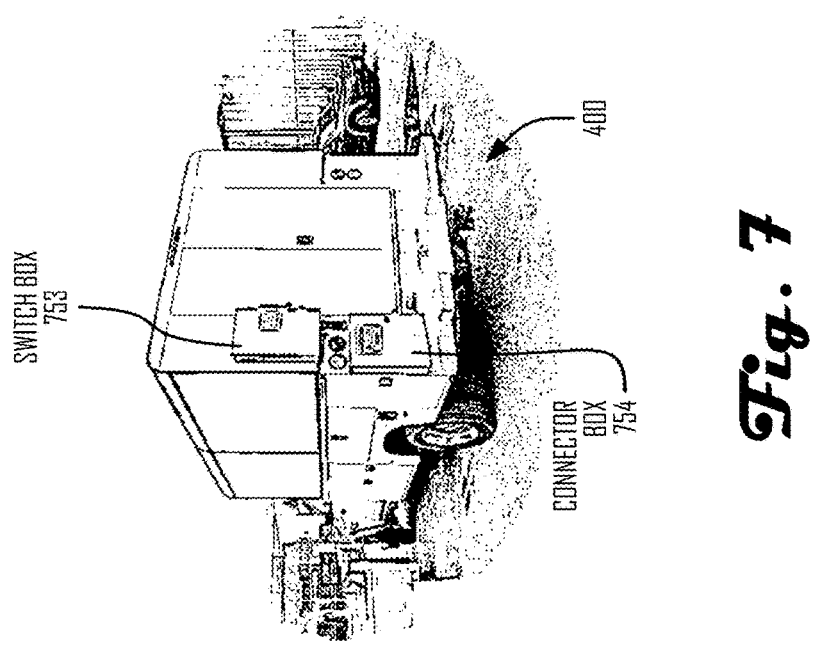
FIG. 7 illustrates additional aspects of the system of FIG. 4 according to one or more variant embodiments.

FIG. 7 illustrates additional aspects of the system 400 of FIG. 4 according to one or more variant embodiments. A switch box 753 mounted on the back of truck 430 provides a master switch functionality like that of switch 353 and current limiting functionality like breaker box 357 of system 300. Moreover a connector box 754 mounted on the back of truck 430 provides high capacity disconnectable cable linkage functionality like that of camlock interface 354 of system 300.

Figure 8:
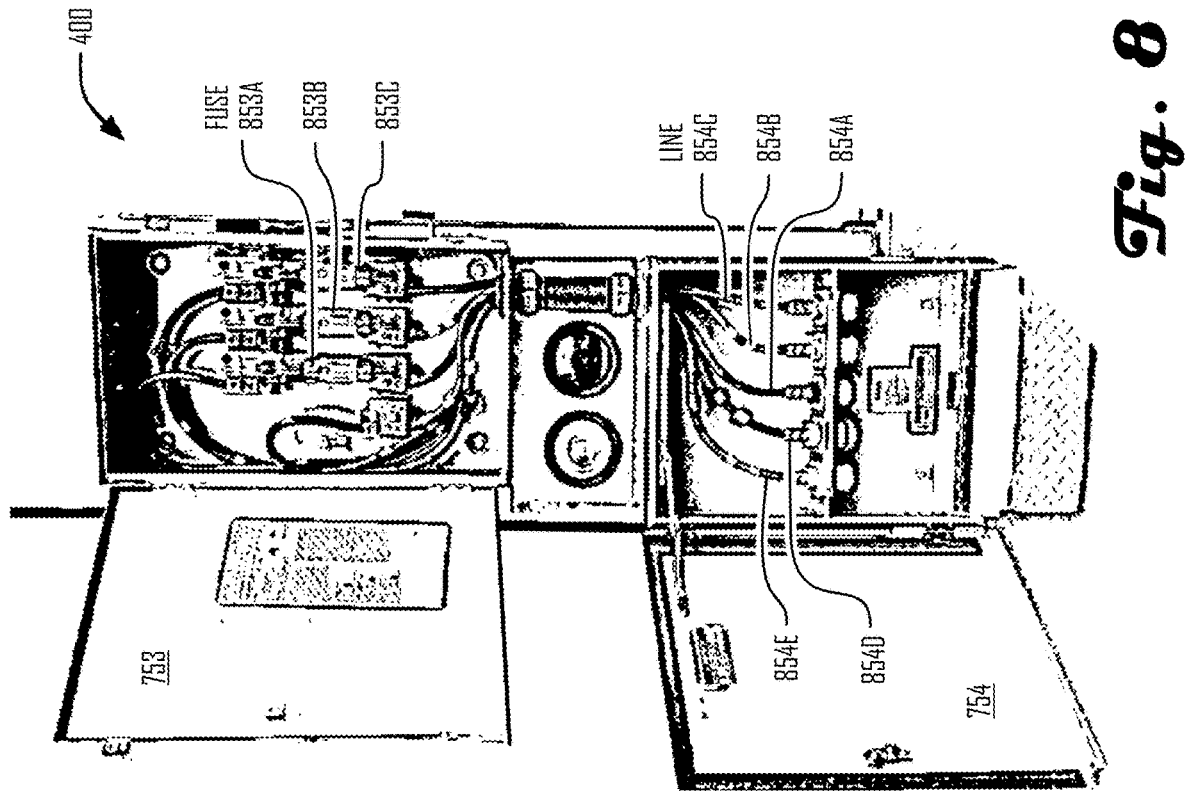
FIG. 8 illustrates further aspects of the system of FIG. 4 according to one or more embodiments.

FIG. 8 illustrates further additional aspects of the system of FIG. 4 according to one or more variant embodiments. A first-phase 120/208/240 volt line 854A (e.g. conventionally marked with black and passing through connector box 754) is configured to carry AC power 367 from an onsite power source 352 through a corresponding fuse 853A toward AC/DC converters 358. A second-phase 120/208/240 volt line 854B (e.g. conventionally marked with red and passing through connector box 754) is configured to carry AC power 367 from the power source 352 through a corresponding fuse 853B toward AC/DC converters 358. A third-phase 120/208/240 volt line 854C (e.g. conventionally marked with blue and passing through connector box 754) is likewise configured to carry AC power 367 from the power source 352 through a corresponding fuse 853C toward AC/DC converters 358. The fuses 853 are rated up to 250 volts AC as shown, but other nominal ratings between 100 volts AC and 1000 volts AC may also serve. Another line 854D (e.g. conventionally marked with white and passing through connector box 754) is configured to serve as neutral. Another line 854E (e.g. conventionally marked with green and passing through connector box 754) is configured to serve as protective earth or ground (PG).

In some variants one or more pneumatic or other robotic actuators of a walking or flying drone 431 are adapted to eject propagule capsules 210 as the drone or other vehicle 230 travels over the targeted sites 255. It is contemplated that microsites are targeted so that the propagule capsules 210 are shot toward the microsites and landed therein. See FIG. 15. Additionally, the gas regulators optimize the pressure to control the velocity of the seed capsule as it is shot. The velocity may vary depending on various factors such as wind speed, soil surface tension, species preferred germination habit, and the like. In some embodiments, the gas regulators may be adjusted manually or programmed to adjust automatically for different planting areas. Because the propagule capsules 210 are dissolvable, the seeds need not be buried or penetrated in soil and allows the root structure of the seed plant to expand without hindrance.

In some variants, the present invention may (optionally) further comprise seed amendment pellets. The pellets comprise a shotgun shell shape and include mycorrhizal fungi inoculated medium, pesticides, herbicides, fertilizers, odors or compounds, hydrogels, beneficial plants, multiple seeds, or any combination thereof.

During a "reconnaissance" phase, a drone 431 flies over an area. While airborne, the sensors of the UAV help identify suitable planting areas and microsites within the planting areas by collecting data. The collected data is processed via the CPU and stored in the memory unit or transmitted to a remote database server. Based on the data, at phase 370, the CPU maps at least one route for planting. Alternatively, the collected data is transmitted to another server or a mapping module on ground that may be configured to perform route mapping.

During a "planting" phase, a drone 431 flies over a preplanned route and launches the propagule capsules 210 when it is within a shooting range of the microsites. A launching mechanism of the drone 431 may be configured (with a spring or pneumatic launching mechanism or a controlled detonation, for example) to launch a propagule capsule within an order of magnitude of 5 or 10 meters per second. In this way, the UAV can fire encapsulated plant seeds into the ground in places identified as good growing area. Optionally, a drone 431 may also be programmed to fly over the planned route periodically to monitor seed germination and seedling growth.

FIG. 4 illustrates an exemplary network topology of an information management system 400 in accordance with various embodiments. A central information management server 1000 (see FIG. 10) is in data communication with a plurality of client devices 1100A-C (see FIG. 11) via one or more networks 468. In various embodiments, network 468 may include the Internet, one or more local area networks ("LANs"), one or more wide area networks ("WANs"), cellular data networks, and/or other data networks. Network 468 may, at various points, be a wired and/or wireless network. Remote information management server 1000 may be in data communication with one or more information management data stores 465.

In various embodiments, any of client devices 1100A-C may be networked computing devices having form factors including general purpose computers (including "desktop," "laptop," "notebook," "tablet" computers, or the like); mobile phones; watches, glasses, or other wearable computing devices. In the example shown in FIG. 4, client device 1100A is depicted as a laptop/notebook computer, client device 1100B is depicted as a handheld device, and client device 1100C is depicted as a computer workstation. In various embodiments there may be fewer or many more respondent devices than are shown in FIG. 4.

As is described in more detail below, in various embodiments, remote information management server 1000 may be a networked computing device generally capable of accepting requests over network 468 e.g. from any one of respondent devices 1100A-C and/or other networked computing devices (not shown), and providing responses accordingly. In a typical context, one or more devices 1100A-B networked together as described herein may rely upon a bandwidth-limited signal path 401A-B and one or more other devices 1100C also networked will rely upon a bandwidth-unlimited signal path 401C, the significance of which will be appreciated by one skilled in the art in light of the disclosure that follows. In general, bandwidth-limited signal path 401A-B and the devices 1100A-B that rely upon them are not adequate to allow a human user thereof to review pictographic and other bandwidth-intensive data and provide a timely verdict thereon (a diagnosis, work request, or other consequential decision soon enough to make a difference, e.g.). The functional components of an exemplary information management server 1000 that remotely supports advanced interactions with various client devices 1100A-C are described below in reference to FIG. 10.

FIG. 10 illustrates a server 1000 in which one or more technologies may be implemented. In respective embodiments, server 1000 may be a general-purpose computer or may include special-purpose components not shown. As shown in FIG. 10, exemplary server 1000 includes one or more processing units 1002 in data communication with one or more memories 1004 via one or more buses 1016. Each such memory 1004 generally comprises some or all of random access memory (RAM), read-only memory (ROM), and/or a permanent mass storage device, such as a disk drive, flash memory, or the like. Client device 1000 may also include one or more instances of network interfaces 1006, of user inputs 1008, of displays 1012, or of speakers (not shown).

As shown, memory 1004 of exemplary server 1000 may store an operating system 1010, as well as program code for a number of software applications, such as a client hosting application 1014. These and other software components, as well as various data files (not shown) may be loaded into memory 1004 via network interface (optional) 1006 (or via a selectively removable computer readable storage medium 1018, such as a memory card or the like). For hardware functions such as network communications via network interface 1006, obtaining data via user input 1008, rendering data via display 1012 and/or speaker, and allocating a position of memory 1004 to various resources, operating system 1010 may act as an intermediary between software executing on server 1000 and the server's hardware.

For example, operating system 1010 may cause a representation of locally available software applications, such as client hosting application 1014, to be rendered locally (via display 1012, e.g.). If operating system 1010 obtains, e.g. via user input 1008, a selection of client hosting application 1014, operating system 1010 may instantiate a client hosting application 1014 process (not shown), i.e. cause processing unit 1002 to begin executing the executable instructions of client hosting application 1014 and allocate a portion of memory 1004 for its use. In some variants, moreover, a download service 1024 resident in memory may allow apps (inventoried in medium 1018, e.g.) to be downloaded upon request to authorized client devices as described below. Alternatively or additionally, operations described below may be implemented with special-purpose circuitry 1022 resident in server 1000 as described below.

Figure 10:
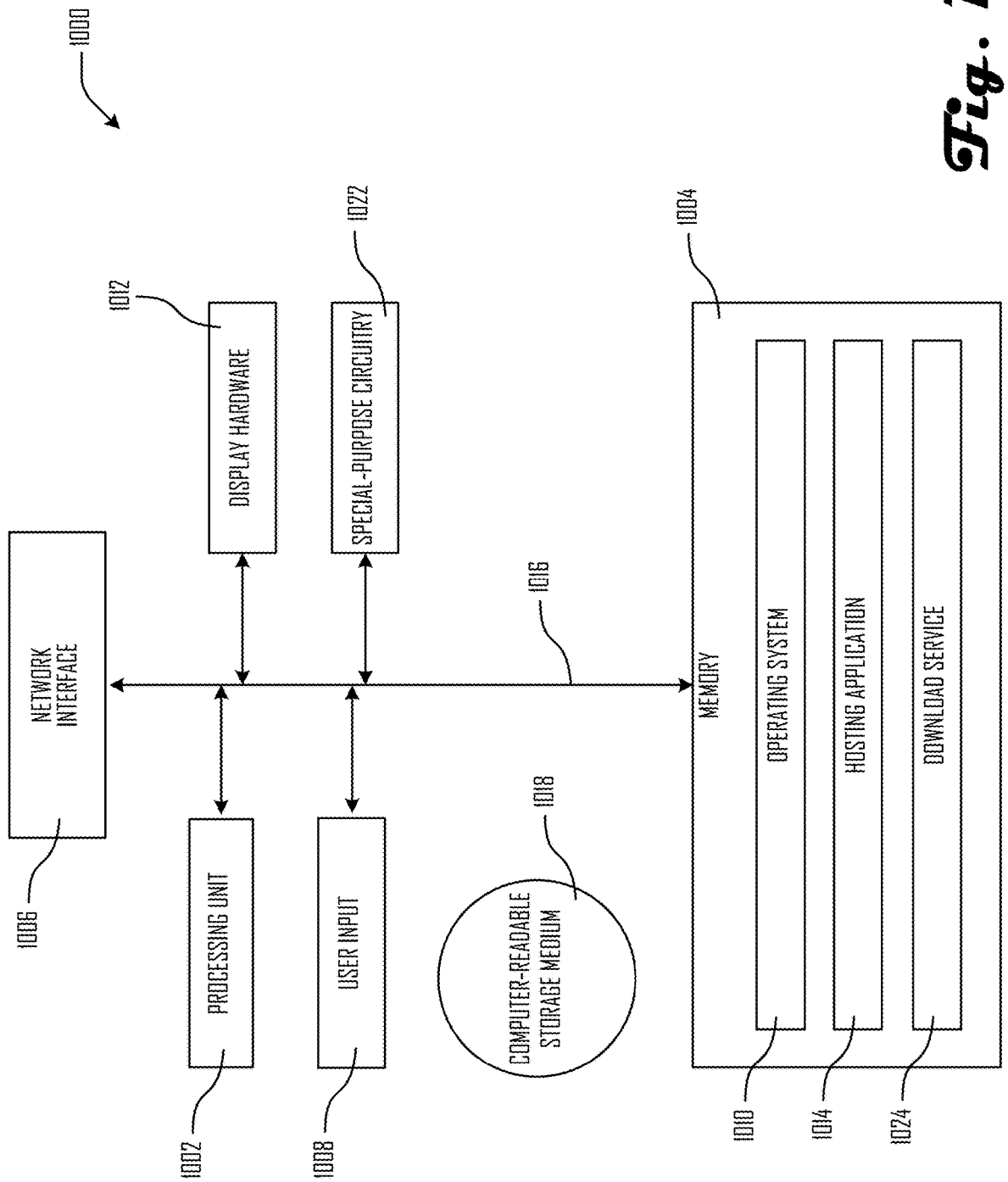
FIG. 10 illustrates a server in which one or more technologies may be implemented according to one or more embodiments.

Although an exemplary server 1000 has been described, a server 1000 may be any of a great number of computing devices capable executing program code, such as the program code corresponding to hosting application 1014. Alternatively or additionally, the structures described with reference to FIG. 10 may likewise be implemented by a special-purpose peer computer in a peer-to-peer network.

Figure 11:
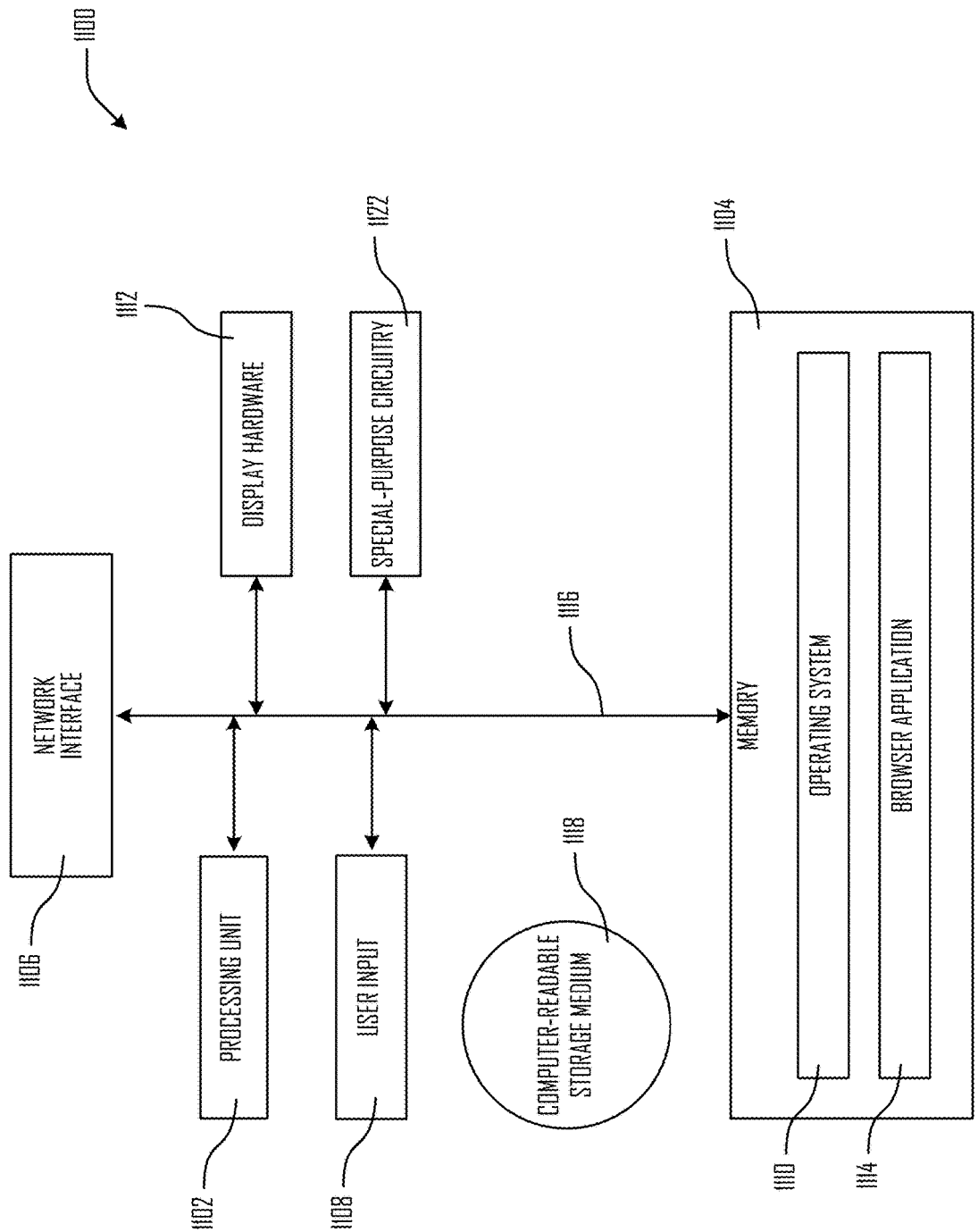
FIG. 11 illustrates a client device in which one or more technologies may be implemented according to one or more embodiments.

FIG. 11 illustrates a client device 1100 in which one or more technologies may be implemented. In respective embodiments, client device 1100 may be a general-purpose computer or may include special-purpose components not shown. As shown in FIG. 11, exemplary client device 1100 includes one or more processing units 1102 in data communication with one or more memories 1104 via one or more buses 1116. Each such memory 1104 generally comprises some or all of random access memory (RAM), read-only memory (ROM), and/or a permanent mass storage device, such as a disk drive, flash memory, or the like. Client device 1100 may also include one or more instances of network interfaces 1106, of user inputs 1108, of displays 1112, or of speakers (not shown).

As shown, memory 1104 of exemplary client device 1100 may store an operating system 1110, as well as program code for a number of software applications, such as a client web browser application 1114. Client web browser application 1114 is a software application by which, under server control, client devices can present data to users and transmit data entered by them. These and other software components, as well as various data files (not shown) may be loaded into memory 1104 via network interface (optional) 1106 (or via a selectively removable computer readable storage medium 1118, such as a memory card or the like). For hardware functions such as network communications via network interface 1106, obtaining data via user input 1108, rendering data via display 1112 and/or speaker, and allocation of memory 1104 to various resources, operating system 1110 may act as an intermediary between software executing on client device 1100 and the client device's hardware.

For example, operating system 1110 may cause a representation of locally available software applications, such as client web browser application 1114, to be rendered locally (via display 1112, e.g.). If operating system 1110 obtains, e.g. via user input 1108, a selection of client web browser application 1114, operating system 1110 may instantiate a client web browser application 1114 process (not shown), i.e. cause processing unit 1102 to begin executing the executable instructions of client web browser application 1114 and allocate a portion of memory 1104 for its use. Alternatively or additionally, operations described below may be implemented with special-purpose circuitry 1122 resident in client device 1100 as described below.

Figure 12:
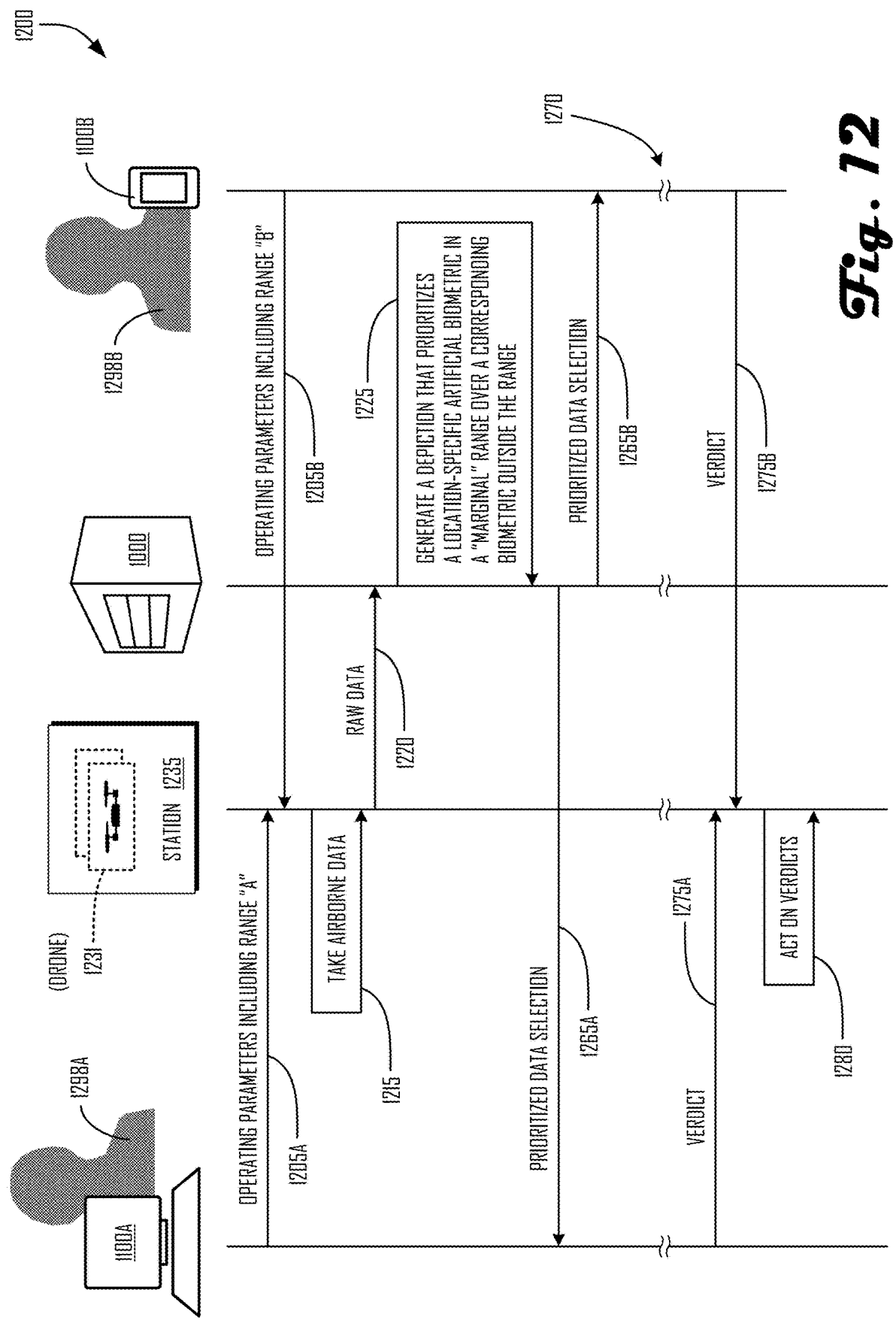
FIG. 12 illustrates a data flow diagram relating to one or more information management routines described herein according to one or more embodiments.

FIG. 12 illustrates a dataflow schematic suitable for use with at least one embodiment. Operational parameters 1205A including a biometric range "A" are transmitted from client device 1100A to station 1235 at which a plurality of flying drones 1231 or other aircraft are based and operated. Operational parameters 1205B including a biometric range "B" are likewise transmitted from client device 1100B to station 1235. One or more of the drones 1231 are accordingly dispatched take airborne data 1215 using the received operating parameters 1205A-B. In some variants such airborne data 1215 may be via one or both of hyperspectral imaging or LIDAR or LADAR (using one or more sensors aboard a drone, e.g.) and with the one or more removable/interchangeable compressed gas canisters and propagule cartridges 488 that a drone 431, 1231 leaves behind so as to extend that drone's range. Some or all of the current airborne data 1215 is then transmitted 1220 as raw data 1220 to server 1000. Server 1000 then applies one or both of ranges "A" and "B" to the raw data 1220 to determine (by executing block 775, e.g.), where appropriate, an automatic prioritization of the third position (e.g. site 255C of the planting area) over the other positions (e.g. sites 255A-B) of the land tract. This can manifest itself, for example, as a ranking that prioritizes an image of site 255C and causes that image to be transmitted automatically to a client device 1100A (in use by and associated with party 1298A as shown, e.g.) as an automatic and conditional response to that client device 1100A having provided the range "A" within which the third location-specific artificial biometric fell. In some contexts, the depiction containing that image may be large enough (several megabytes or larger, e.g.) so that it only arrives at device 1100A overnight (within 16 hours of having been taken, e.g.) by virtue of having been selected (as part of prioritized data selection 1265A, e.g.) and sent automatically. This can occur, for example, in a context in which the planting area (tract 250A, e.g.) is remote from high-bandwidth connections and in which prioritized data selection 1265A omits shape-indicative data pertaining to lower-priority positions 255A-255B for which the location-specific artificial biometrics were out-of-range.

Alternatively or additionally, in some contexts the generating a depiction 1225 include a determination (either by server 1000 or by a processing unit 1102 within vessel 230, e.g.) that an artificial biometric pertaining to a different position 255 may be prioritized as to a different client device 1100B (in use by and associated with party 1298B as shown, e.g.) by virtue of having fallen within a range 277B provided by that client device 1100B. This can occur, for example, in a context in which a corresponding biometric pertaining to position 255B is below range 277B; in which a corresponding biometric pertaining to position 255C is above range 277B; in which a conditional prioritized data selection 1265B automatically transmitted to client device 1100B is larger than 100 megabytes (including at least an image of position 255A, e.g.) but smaller than 100 terabytes (not including all the current images of planting area in the current raw dataset, e.g.); in which such transmission preceded a long delay 1270 (of 24-48 hours, e.g.) only by virtue of having been automatically prioritized and sent; and in which one or more verdicts 1275A, 1275B (decisions whether to plant or not, e.g.) would otherwise not have been acted upon 1280 until a subsequent deployment (when station 1235 returned to the planting area more than a year later, e.g.).

Figure 13:
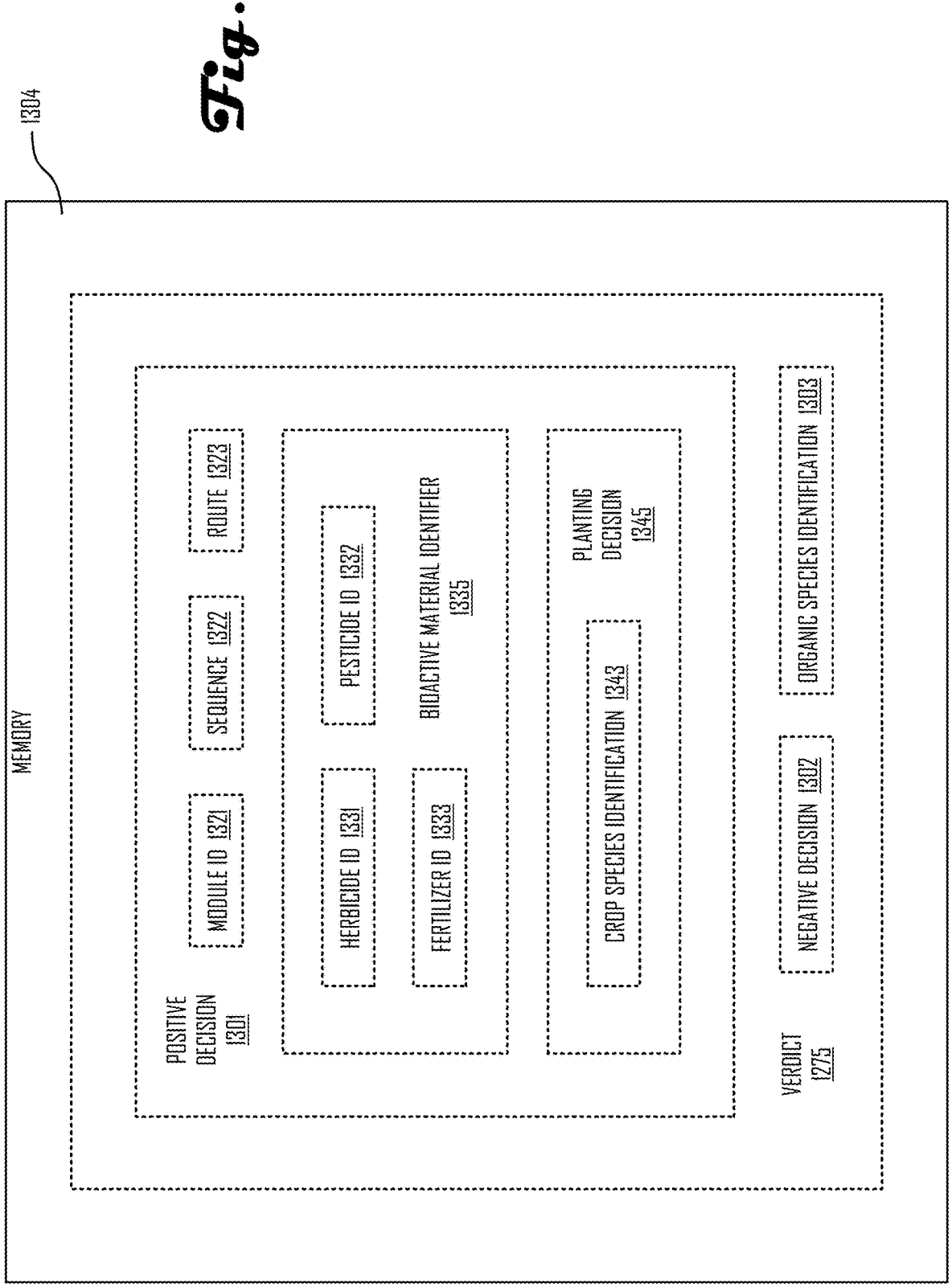
FIG. 13 illustrates various forestry-related verdicts according to one or more embodiments.

FIG. 13 provides a schematic illustration of various forestry-related verdicts 1275 as further described herein, residing in a memory 1304 (optionally implemented in one or more of the above-described memories 1004, 1104 or in a drone 431, 1231 or other vehicle 230, e.g.). A "verdict" as used herein may refer to any forestry-related determination (a diagnosis, plan of action, a prescription, silvicultural or owner objective(s), quantified estimate, or other judgment) from one or more human authorities (experts or device operators, e.g.) pertaining to consequential deployment actions upon land or vegetation at least partly based on current aerial data. As used herein, "current" data refers to measurements or other values that are affected or otherwise updated by a sensor detection (resulting from optical energy, e.g.) that has occurred in a vicinity under study (at or above a location of interest, e.g.) within six months of such verdict. When no such recent data that pertains to an area is used to ascertain a more recent condition of the vicinity, the older data pertaining to that vicinity is "not current."

Such verdicts 1275 may each include one or more instances of positive decisions 1301, of negative decisions 1302 (not to take an action under consideration, e.g.), of diagnoses (specifying a noxious organism with an organic species identification 1303, e.g.), or of additional work requests (analyses and verdicts by other human authorities, e.g.). In some contexts, for example, such positive decisions 1301 under consideration may be expressed as one or more portable module identifiers 1321 (a serial number effectively determining which bioactive materials to apply to the "third position" under consideration. Alternatively or additionally, a verdict 1275 may include one or more task or instruction sequences 1322 or defined routes 1323 (specifying when and how a drone-implemented delivery flight will be executed, e.g.). Alternatively or additionally, a verdict 1275 may include one or more instances of bioactive material identifiers 1335 (such as herbicide identifiers 1331, pesticide identifiers 1332, fertilizer identifiers 1333, or other such deliverable cargo, e.g.). Alternatively or additionally, a verdict 1275 may express one or more instances of crop species identifications 1343 or other components of (positive) planting decisions 1345.

Figure 14:
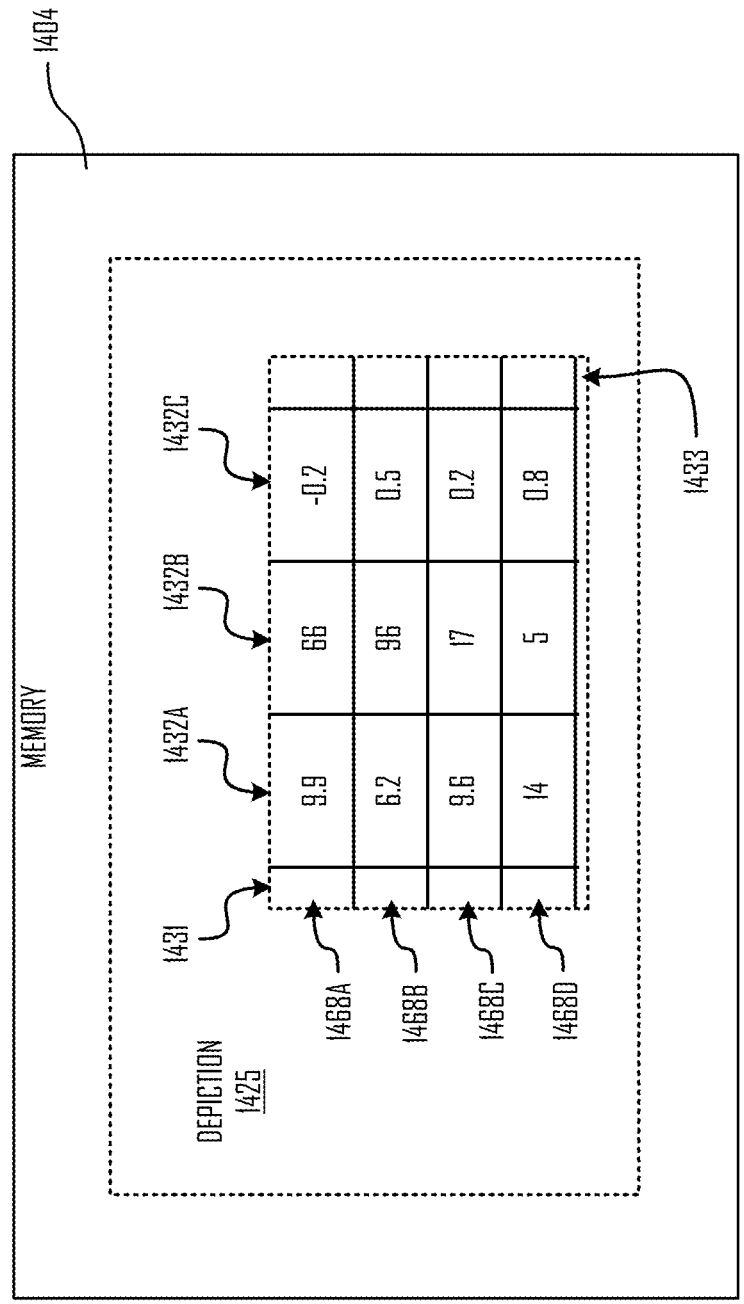
FIG. 14 illustrates various forestry-related depictions according to one or more embodiments.

FIG. 14 provides a schematic illustration of a forestry-related depiction 1425 as further described herein, residing in a memory 1404 (implemented in one or more of the above-described memories 1004, 1104 or in a drone 1231 or other vehicle 230, e.g.). A "depiction" of a land tract as used herein means a dataset that includes one or more photographic, categorical, or other descriptive data components concerning respective parts of the land tract unless context dictates otherwise. It may include, in some instances, sets of coordinates 1433 correlated to one or more instances of photographic or schematic images 1431 of physical features of the land as well as scalar determinants 1432A-C with which the images 1431 or coordinates 1433 are correlated. In some variants, for example, such a depiction may include map data (showing historical water features, e.g.) or other such non-biometric determinants 1432A (that may describe soil composition, localized meteorological data, ground elevation, or thermal or precipitation history, e.g.), or other such measurements that may affect but do not directly describe any current occurrence of non-motile organisms living upon tracked positions of the land.

Figure 15:
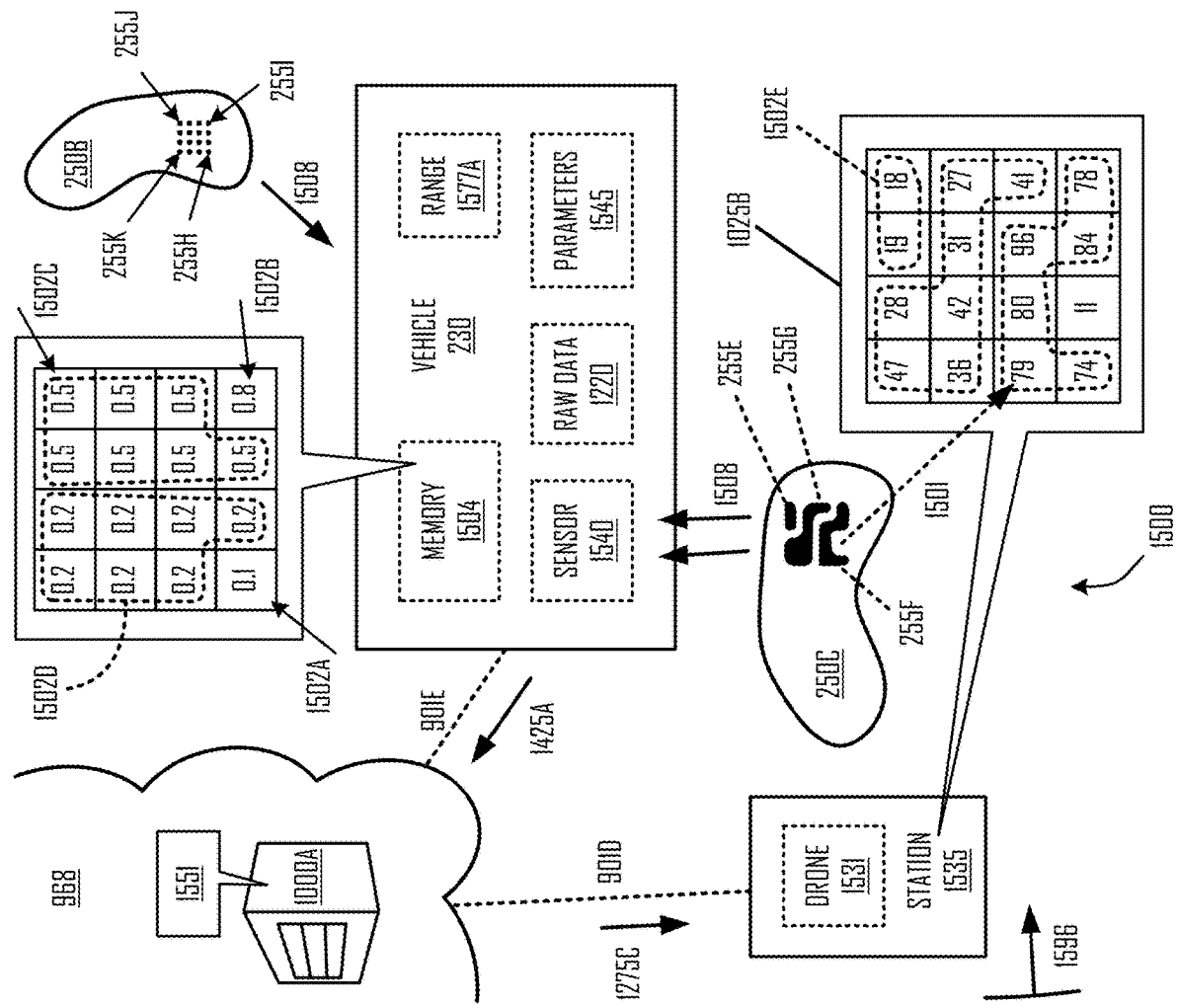
FIG. 15 illustrates another system relating to one or more task flows described herein according to one or more embodiments.

FIG. 15 illustrates another system relating to one or more task flows described herein according to one or more embodiments. Information management system 1500 configured to interact with one or more other tracts 250B-C to which one or more vehicle 230 as described herein may be deployed. In a first deployment, one or more sensors 1540 aboard vehicle 230 receive and detect energy 1508 from several positions 255E-G of tract 250B which is manifests as raw digital data 1220 (described with reference to FIG. 12, e.g.) in memory 1504. Also a portion of raw data 1220 is distilled into a depiction 1425A that includes a current location-specific artificial biometric 1502A-E for each of the positions 255 as shown. The depiction 1425A may also include some of the photographic data initially captured by the one or more sensors 1540. In some variants a CPU 158 aboard vehicle 230 may be configured to streamline its operations by redacting portions of the photographic data that are unduly duplicative (depicting some or all images of positions 255J for which a significant biometric is not of great interest by virtue of being well understood, e.g.). This can occur, for example, in a context in which a marginal range 1577A is selected (via a botanical consultant using one or more client devices 1100A-B remote from tract 250B, e.g.) so that a lower limit 261 is below 0.2 and so that an upper limit 252 is 0.4; in which a first location-specific artificial biometric 1502A (currently describing position 255H, e.g.) is below the marginal range 1577A; in which a second location-specific artificial biometric 1502B (currently describing position 255I, e.g.) is above the marginal range 1577A; in which a third location-specific artificial biometric 1502D (currently describing position 255K, e.g.) is within the marginal range 1577A; in which the botanical consultant receives a prioritization 1551 as a real-time response to a large patch of vegetation exhibiting a biometric 1502D within the marginal range 1577A having been detected (at server 500A, e.g.); in which the consultant has set a limit (a number of square meters as one of the on-board parameters 1545, e.g.) as to what constitutes a "large patch"; in which no real-time response would otherwise have been sent to the consultant; in which some signal paths 401A-D is effectively bandwidth-limited but other signal paths 401E of interest are not; and in which the consultant would not otherwise have been able to provide a verdict 1275C in time to avoid a wasted opportunity (to include position 255K and the rest of the patch in one or more drones 1531 applying an herbicide to a large adjacent part of tract 250B that includes position 255H, e.g.).

In some contexts current data depicting a first microsite (position 255K, e.g.) may be used to characterize an entire "third" position even when that position has been extended to include a succession of additional adjacent microsites partly based on the value of the biometric of each microsite in the succession being within the range 1577 and partly based on each microsite of the succession being adjacent another microsite of the succession. The effects of such algorithmic extensions are evident, for example, in the irregular shapes of positions 255E-G.

In a later deployment, one or more sensors 1540 (described with reference to FIG. 1, e.g.) aboard vehicle 230 receive and detect energy 1508 from several irregularly-shaped positions 255E-G of tract 250C which is then recorded as raw digital data 1220 in memory 1504. This can occur, for example, in a context in which a depiction 1425B reflecting this data is downloaded via signal path 401D while station 1535 is in a vicinity 1596 of tract 250C; in which depiction 1425B manifests a biometric map (having biometric values manifested as a likelihood-indicative or other percentage as shown, e.g.) or programmed navigation routes for one or more drones 1531, e.g.); and in which such information flow 1501 (via server 500A and signal paths 401D-E, e.g.) includes a prioritization 1551 and verdict 1275C as described below. This can occur, for example, in a context in which the range has a lower limit of 20-25 and an upper limit of 50-70; and in which the "third" position is position 255G.

As used herein, a "prioritization" may refer to a conditional automatic notification (requesting an expedited verdict selectively in response to some datasets 1666B-C but not to other datasets 1666A, e.g.), a ranking (listing the prioritized item before one or more other items, e.g.), or some other expression signifying elevated importance relative to that of a nearby position (microsite, e.g.) or its attributes. In some contexts, respective "prioritizations" may be different for different parties, such as in a context in which client device 1100A prioritizes record 1468A over one or more other depicted records in response to "66" falling within range "A" (as shown in FIG. 12) and in which client device 1100B prioritizes record 1468B over one or more other depicted records in response to "0.5" falling within range "B." This can make a significant difference, for example, in a context in which such ranking triggers a selective automatic download of prioritized records; in which a full-resolution image 1431 is adequate to ensure a correct outcome in one or more of the verdicts 1275 at issue and in which a lower-resolution image 1431 is not; in which full-resolution images 1431 for the thousands of records 1467 of a given land tract not feasible via a limited-bandwidth connection to one or both of the client devices 1100 via which the respective prioritizations 1551 are downloaded; and in which the correct and timely outcomes of at least some verdicts 1276 at issue would not otherwise be feasible without a substantial hardware upgrade (to improve bandwidth of linkages 401A-B, e.g.).

Figure 16:
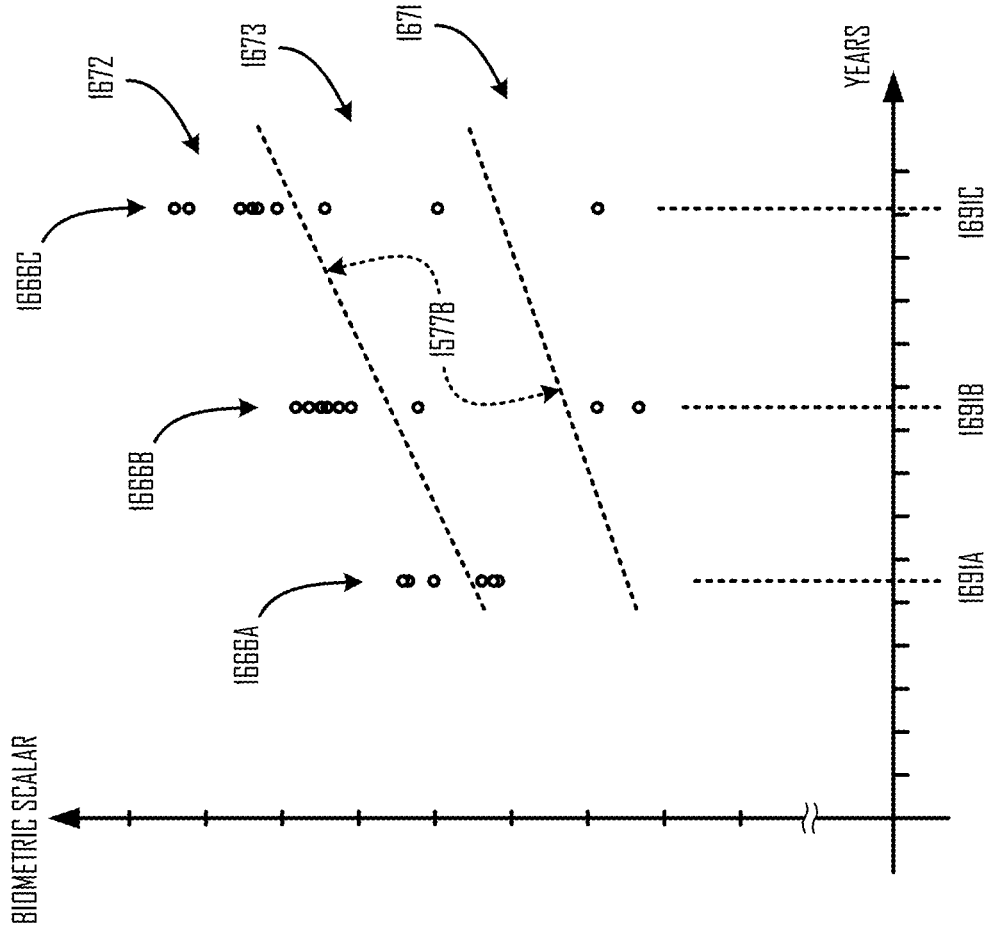
FIG. 16 illustrates a scatter plot depicting scalar biometric datasets derived from raw data taken at several different times and a time-dependent scalar biometric range to which each such dataset pertains according to one or more embodiments.
Figure 19:
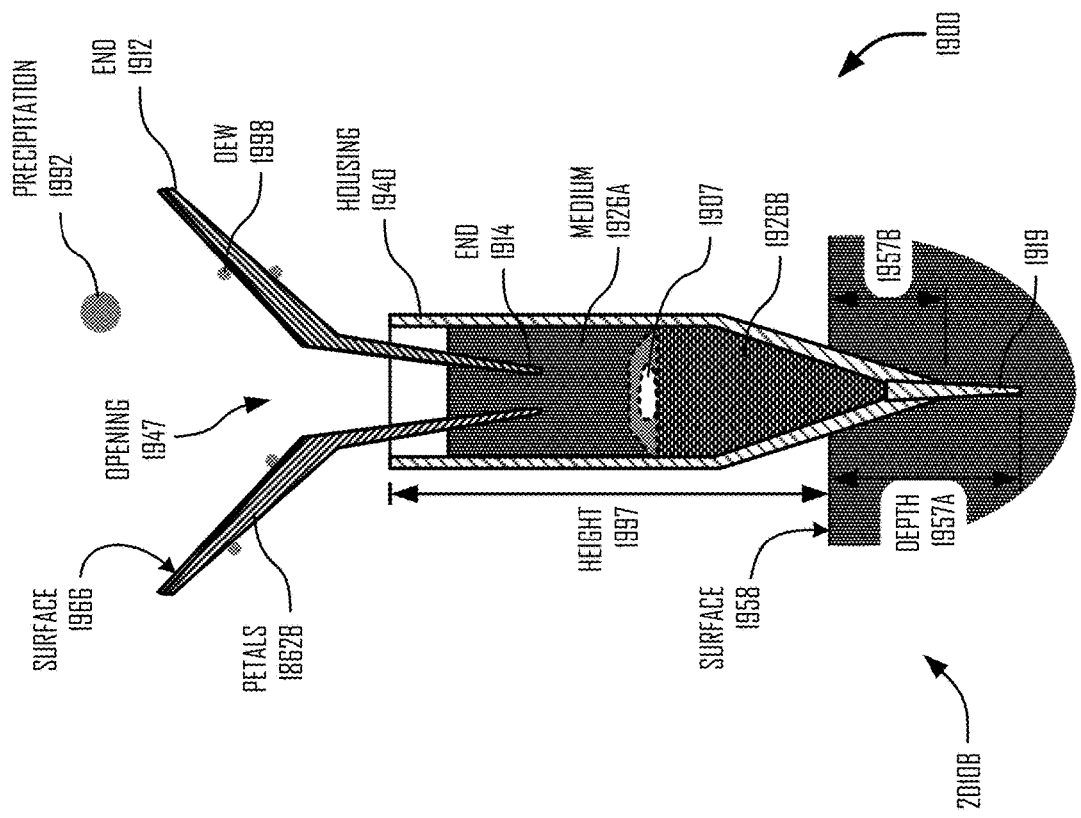
FIG. 19 illustrates an aerially deployed propagule capsule having landed within a microsite according to one or more embodiments.
Figure 18:
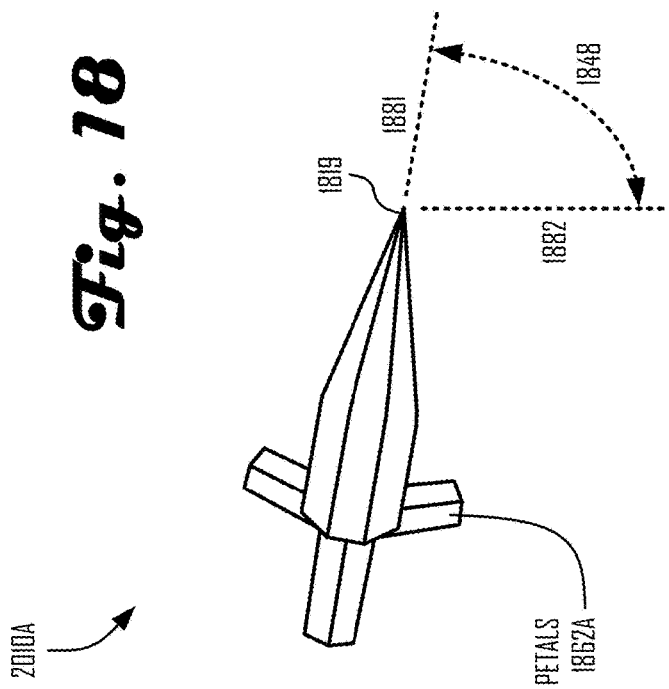
FIG. 18 illustrates an aerially deployed propagule capsule on a trajectory toward a target within a microsite according to one or more embodiments.
Figure 20:
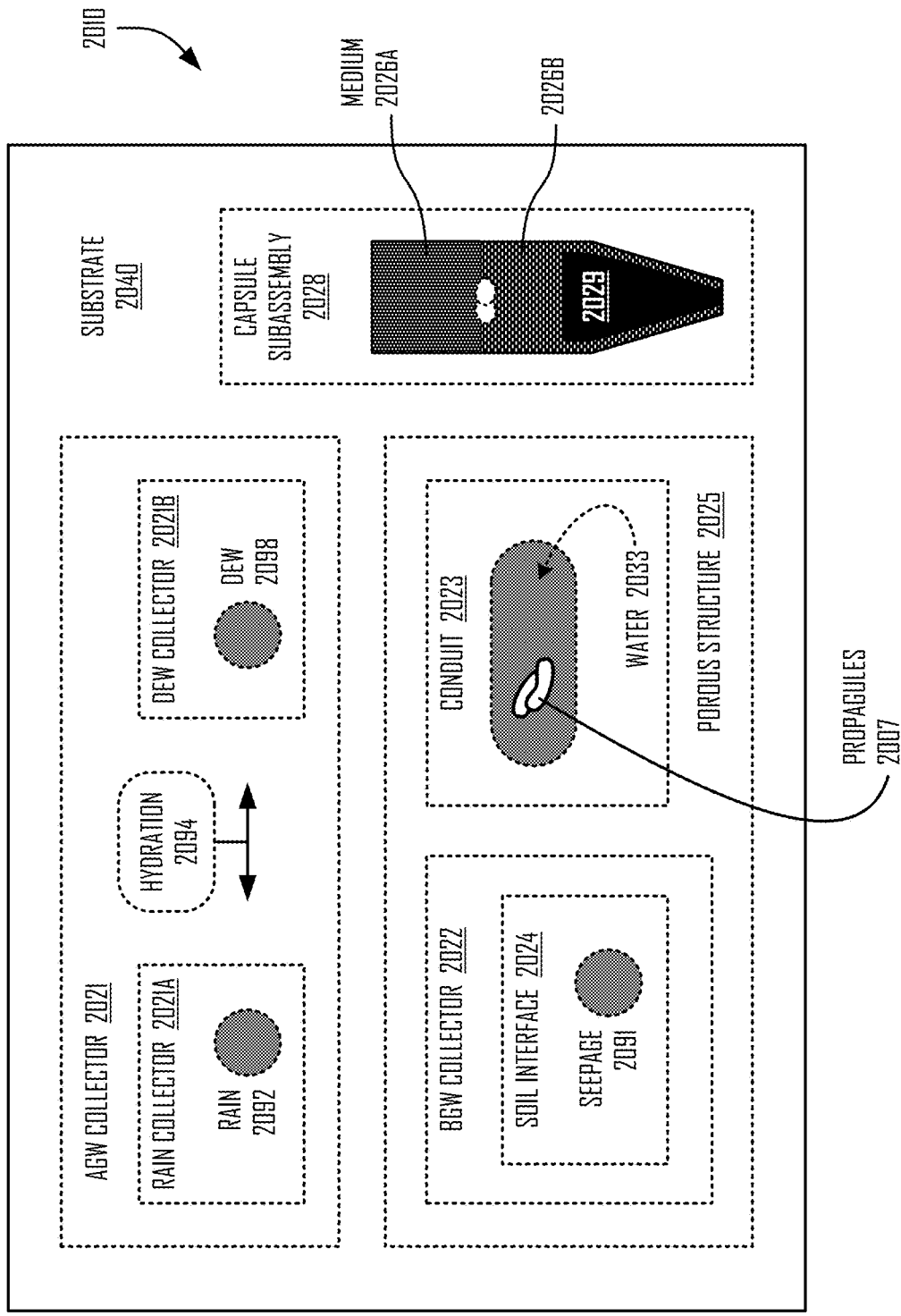
FIG. 20 schematically illustrates various configurations of propagule capsules according to one or more embodiments.

FIG. 16 illustrates a scatter plot depicting a range 1577 having upper and lower limits that both increase as a function of one or more determinants (time, e.g.) with a succession of current datasets 1666A-C each separated by several years. In light of teachings herein, one skilled in the art will be able to identify various health-indicative or growth-indicative artificial biometrics for which such a time-dependent range 1577 would be appropriate. A botanist or other expert who is on call for making time-critical verdicts 1275 in marginal cases, for example, may in some contexts prefer to select such a range 1577 (to minimize false positive and negative priority determinations over time, e.g.) to be calculated. At a first (nominal) time 1691A (within a week of the average timestamped date, e.g.) a dataset 1666A includes several location-specific artificial biometrics of the then-current depiction 1425 that are within a selected range 1577 as well as several location-specific artificial biometrics of the then-current depiction 1425 that are above the selected range 1577. It will be noted that no location-specific artificial biometrics of the then-current depiction 1425 are below the selected range 1577.

In each of datasets 1666B-C, several location-specific artificial biometrics of the then-current depiction 1425 are above the selected range 1577. In dataset 1666B, at least one location-specific artificial biometrics of the then-current depiction 1425 is within the selected range 1577, suggesting that the biometric (and the "third" position to which it pertains) deserves a higher priority 1551 than one or more of the other (over-limit or under-limit) biometrics in the dataset 1666B (nominally) corresponding to the same time 1691B. Likewise in dataset 1666C, a plurality of location-specific artificial biometrics of the then-current depiction 1425 (nominally taken at time 1691C pursuant to execution block 705, e.g.) is within the selected range 1577, suggesting that the biometrics (and the "third" positions to which they pertain) are "more marginal" and deserving of higher prioritization (ranking or conditionally urgent treatment, e.g.) than some or all of the other (over-limit or under-limit) biometrics in dataset 1666C. Many datasets 1666 described herein warrant special handling of within-range location-specific biometric values 1673 as contrasted with that of corresponding under-limit values 1671 and over-limit values 1672.

In light of teachings herein, numerous existing techniques may be applied for configuring special-purpose circuitry or other structures effective for obtaining and applying limits to biometric values as described herein without undue experimentation. See, e.g., U.S. Pat. No. 10,078,784 ("Forestry information management systems and methods streamlined by automatic biometric data prioritization"); U.S. Pat. No. 9,420,737 ("Three-dimensional elevation modeling for use in operating agricultural vehicles"); U.S. Pat. No. 9,378,554 ("Real-time range map generation"); U.S. Pat. No. 9,373,149 ("Autonomous neighborhood vehicle commerce network and community"); U.S. Pat. No. 9,354,235 ("System and process for quantifying potentially mineralizable nitrogen for agricultural crop production"); U.S. Pat. No. 9,340,797 ("Compositions and methods for control of insect infestations in plants"); U.S. Pat. No. 9,310,354 ("Methods of predicting crop yield using metabolic profiling"); U.S. Pat. No. 9,412,140 ("Method and system for inspection of travelers"); U.S. Pat. No. 9,378,065 ("Purposeful computing"); U.S. Pat. No. 8,682,888 ("System and methods for tasking, collecting, and dispatching information reports"); U.S. Pat. No. 9,423,249 ("Biometric measurement systems and methods"); U.S. Pat. No. 9,286,511 ("Event registration and management system and method employing geo-tagging and biometrics"); U.S. Pat. No. 9,268,915 ("Systems and methods for diagnosis or treatment"); U.S. Pat. No. 9,137,246 ("Systems, methods and apparatus for multivariate authentication"); and U.S. Pat. No. 9,014,516 ("Object information derived from object images"). These documents are incorporated herein by reference to the extent not inconsistent herewith.

In light of teachings herein, numerous existing techniques may be applied for configuring special-purpose circuitry or other structures effective for manifesting and implementing priorities and verdicts as described herein without undue experimentation. See, e.g., U.S. Pat. No. 9,311,605 ("Modeling of time-variant grain moisture content for determination of preferred temporal harvest windows and estimation of income loss from harvesting an overly-dry crop"); U.S. Pat. No. 9,390,331 ("System and method for assessing riparian habitats"); U.S. Pat. No. 9,383,750 ("System for predictively managing communication attributes of unmanned vehicles"); U.S. Pat. No. 9,378,509 ("Methods, apparatus, and articles of manufacture to measure geographical features using an image of a geographical location"); U.S. Pat. No. 9,373,051 ("Statistical approach to identifying and tracking targets within captured image data"); U.S. Pat. No. 9,355,154 ("Media sequencing method to provide location-relevant entertainment"); U.S. Pat. No. 9,336,492 ("Modeling of re-moistening of stored grain crop for acceptable time-of-sale moisture level and opportunity windows for operation of storage bin fans based on expected atmospheric conditions"); U.S. Pat. No. 9,277,525 ("Wireless location using location estimators"); U.S. Pat. No. 9,269,022 ("Methods for object recognition and related arrangements"); U.S. Pat. No. 9,237,416 ("Interactive advisory system for prioritizing content"); U.S. Pat. No. 9,202,252 ("System and method for conserving water and optimizing land and water use"); U.S. Pat. No. 9,131,644 ("Continual crop development profiling using dynamical extended range weather forecasting with routine remotely-sensed validation imagery"); U.S. Pat. No. 9,113,590 ("Methods, apparatus, and systems for determining in-season crop status in an agricultural crop and alerting users"); U.S. Pat. No. 8,775,428 ("Method and apparatus for predicting object properties and events using similarity-based information retrieval and modeling"); U.S. Pat. No. 8,146,539 ("Method of reducing herbaceous fuels in areas susceptible to wildfires"); U.S. Pat. No. 7,764,231 ("Wireless location using multiple mobile station location techniques"); and U.S. Pub. No. 2016/0073573 ("Methods and systems for managing agricultural activities"). These documents are incorporated herein by reference to the extent not inconsistent herewith.

FIG. 17 illustrates an aerial deployment planting system configured to access microsites over irregular ground 1759. Each microsite 1755 in the area 1750 to be planted includes one or more propagule placement targets 1756 therein. As shown an unmanned vehicle 1730 includes a propulsion subassembly 1735 having a plurality of propellers 1734 or other limbs for ambulation. The propulsion subassembly supports a targeting subassembly 1770 (by one or more flexible gimbals 1779 therebetween) that has just deployed a seed capsule 1710. More generally such containment/targeting subassemblies may be gimbaled relative to the propulsion subassembly so as to stabilize the targeting subassembly while propagule capsules 210 (like seed capsule) are successively released aerially toward respective targets 1756 (smaller than a square meter, e.g.) while ambulating so that the respective targets come within a range 1777 of the targeting subassembly.

Referring now to FIGS. 18-20, FIG. 18 illustrates an aerially deployed propagule capsule 2010A presently traveling in a nearly horizontal direction on a trajectory toward a target. As shown a drag coefficient of propagule capsule remains between 0.04 and 0.5 in flight primarily due to a plurality of outwardly-directed petals 1862A, which causes an angle 1848 of travel (relative to a downward direction 1882) to decrease steadily while the propagule capsule follows its trajectory. Such moderate drag coefficients allow a directional propagule capsule traveling in a primarily horizontal direction 1881 (i.e. having an angle between 45 and 135 degrees relative to a downward direction) to right itself before landing (i.e. so that it lands in a primarily vertical direction). This allows an anterior protrusion 1819 to penetrate a ground surface significantly enough so that capsule can remain upright. This can occur, for example, in a context in which water collectors atop the capsule (petals 1662A, e.g.) would not otherwise work effectively (so as to foster and not stunt seedling growth) during the critical task of plant root egress for finding a reliable water supply.

FIG. 19 illustrates a system 1900 comprising an aerially deployed propagule capsule 2010B having landed within a microsite. Because an anterior protrusion 1919 (tip) has penetrated a ground surface 1958 significantly (by a depth 1957A of more than 5 mm, e.g.) enough so that capsule 2010B is likely to remain upright for more than 3 weeks, one or more unstratified, recalcitrant, or other propagules 1907 therein are likely to survive as long as there is sufficient harvestable dew 1998 or other available precipitation 1992 collectable via the one or more petals 1862B of capsule 2010B. Propagule capsule 2010B is configured to include one or more growth media 1926A-B that serve as artificial water-transfer conduits between proximal ends 1914 of the petals and the water-directing surfaces 1966 thereof. This allows precipitation 1992 (rain or snow, e.g.) or other water (artificial hydration delivered by unmanned drones, e.g.) to be directed all the way from the distal ends 1912 of the petals 1862 into a primary opening 1947 atop a housing 1940 and through to the propagule(s) 1907. In some contexts such artificial above-ground-water collectors (petals, e.g.) for a single propagule capsule collectively have a total surface area larger than 3 square centimeters, wherein each of the artificial above-ground-water collector(s) is near enough to at least one of the one or more artificial water-transfer conduits (media, e.g.) so that capillary action therebetween can occur). As shown housing configured to support (at least one of) the one or more water-transfer media is adjacent the one or more propagules, allowing above-ground-water (rain or dew, e.g.) from the one or more artificial above-ground-water collectors to flow via the water-transfer media to the one or more propagules.

In some contexts such petals may comprise a latticed layer of wire (a fine mesh, e.g.) with numerous holes therethrough each within 1-2 orders of magnitude of 0.5 millimeters in width/diameter so as to allow (optionally hydrophobic) surfaces thereof to have a higher effective water collection area per unit of air drag coefficient. In some variants, moreover, one or more propagules may be held within a chamber that provides protection (from wind and solar desiccation and propagule predation, e.g.) by having a largest opening larger than 1 square millimeter and smaller than 10 square centimeters and with all other openings thereof smaller than 3 square millimeters. Seed predation may be further reduced, in some variants, by having a housing configured to extend to a minimum height 1997 greater than 3 centimeters above the surrounding ground surface 1958. Moreover in some variants a porous or other hydration conduit/collector comprises a portion of housing that extends underground to a depth 1957B greater than 0.2 millimeters, with at least some of the housing below surface being configured to serve as an additional water collector as a function of capillarity and water gradients between the surface of housing and the edaphic environment.

FIG. 20 schematically illustrates various configurations of propagule capsules 2010. In some variants an aerial deployment planting system comprises a propagule capsule 2010 configured to contain one or more propagules 2007 and one or more artificial water collectors. These may include one or more above-ground-water collectors 2021 (e.g. one or more rain collectors 2021A or dew collectors 2021B). Alternatively or additionally they may include one or more soil interfaces 2024 or other below-ground-water collectors 2022 (or both). Moreover such systems may also include one or more artificial water-transfer conduits 2023 and one or more substrates 2040 (implementing a housing, e.g.) configured to support the one or more artificial water-transfer conduits adjacent the one or more propagules 2007 and thereby to facilitate rain 2092, dew 2098, seepage 2091, capillary action, or other water having timely and persistent access to the one or more propagules (throughout the germination and early seedling growth phases, e.g.).

In some contexts, seepage 2091 is a best-available source of water 2033, necessitating a below-ground-water collector (a tip having primarily longitudinal capillaries therethrough, e.g.) intimately coupled with a moist soil or ground-based substrate interface (by deep placement, e.g.). Alternatively or additionally, a single porous structure 2025 may serve as both a below-ground water collector and a conduit in direct contact with the propagule(s). In some variants, moreover, a mass-produced capsule subassembly 2028 may be made of a harder medium pressed toward and fused with a softer medium 2026B with one or more propagules therebetween. Alternatively or additionally, one or more such media may include a cavity (an air-filled recess 2029, e.g.) larger than 1 milliliter. In some contexts, moreover, artificial hydration 2094 delivered (as a conditional response to several hot, dry days following a capsule deployment, e.g.) via a hydration deployment (drone route, e.g.) may pass to ailing propagules via an artificial rain collector 2021A, an artificial dew collector 2021B, or an artificial below-ground-water collector 2022 (or via a combination of these). See also FIGS. 22-32 for additional propagule capsule configuration features according to various embodiments.

Figure 21:
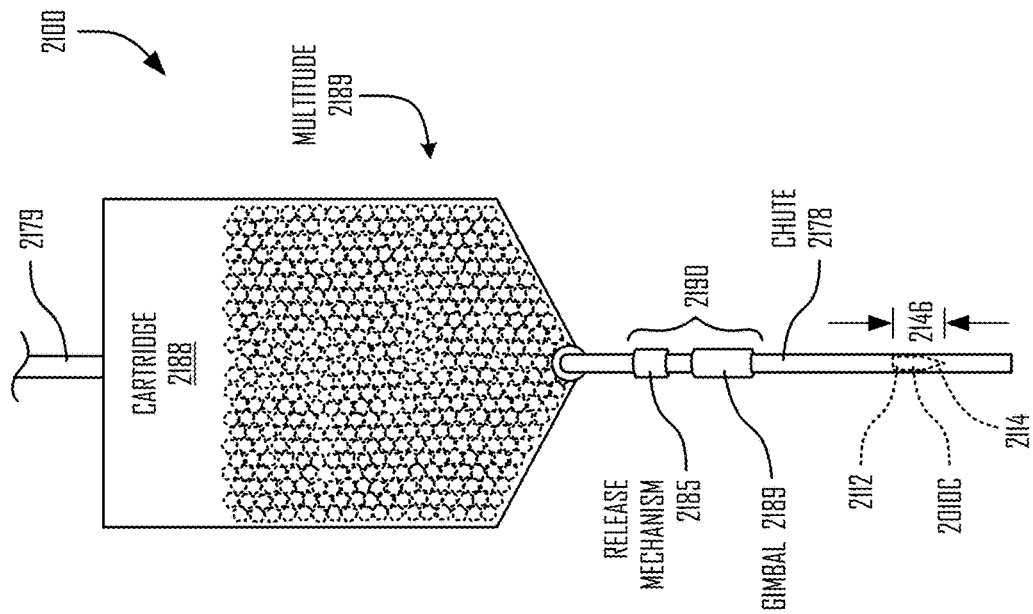
FIG. 21 illustrates a targeting subassembly in the process of deploying a propagule capsule according to one or more embodiments.

FIG. 21 illustrates a system 2100 (suitable for use with/in an unmanned vehicle, e.g.) comprising a payload of an unmanned vehicle, a targeting subassembly in the process of deploying a propagule capsule 2010C having a length 2146 of about 3 centimeters. In some variants the propagule capsule 2010C may have bullet-like or similar funnel shape (having a wide back/top end 2112 and a front half that tapers to a pointed front/bottom end 2114, e.g.). A cartridge 2188 as shown (or a hopper or other selectively-dispensing container) contains a multitude 2189 of other capsules 210, 2010 (instantiating a propagule cartridge 488, e.g.) aboard the same vehicle. See FIG. 31. A gimbal 2179 is configured to stabilize the targeting subassembly (relative to a dynamic propulsion assembly, e.g.) during deployment. In the deployment, the propagule capsule 2010C passed through a staging subassembly 2190 comprising a release mechanism 2185 or a secondary gimbal (configured to make fine adjustments to a direction of an endmost portion of a tube, barrel, or other chute 2178, e.g.). Because chute is much easier to move (optionally having an angular moment of inertia smaller than 1 kilogram-meters^2, e.g.) than a main portion of the unmanned vehicle, a suitable actuator thereof can make an adjustment (to an angle of travel at a moment of release, e.g.) of two degrees or more very quickly (in less than 100 milliseconds, e.g.).

In some contexts such propagule-capsule-containing cartridges may be mass produced and kept in a climate-controlled environment with a humidity and temperature therein both artificially maintained below suitable setpoints (the setpoint being below 80% and 80 degrees Fahrenheit respectively, e.g.) until less than 24 hours before they are mounted (on an unmanned vehicle configured to perform individual capsule deployment, e.g.). Alternatively or additionally, some such cartridges may be configured to be opened so that one or more propagule capsules 210, 2010 therein are thereby modified inside the cartridge (by exposing propagule capsules 210, 2010 therein to artificial heating or hydration, e.g.) within 24 hours before an individual deployment of a particular one of the propagule capsules 210, 2010 therein.

Figure 22:
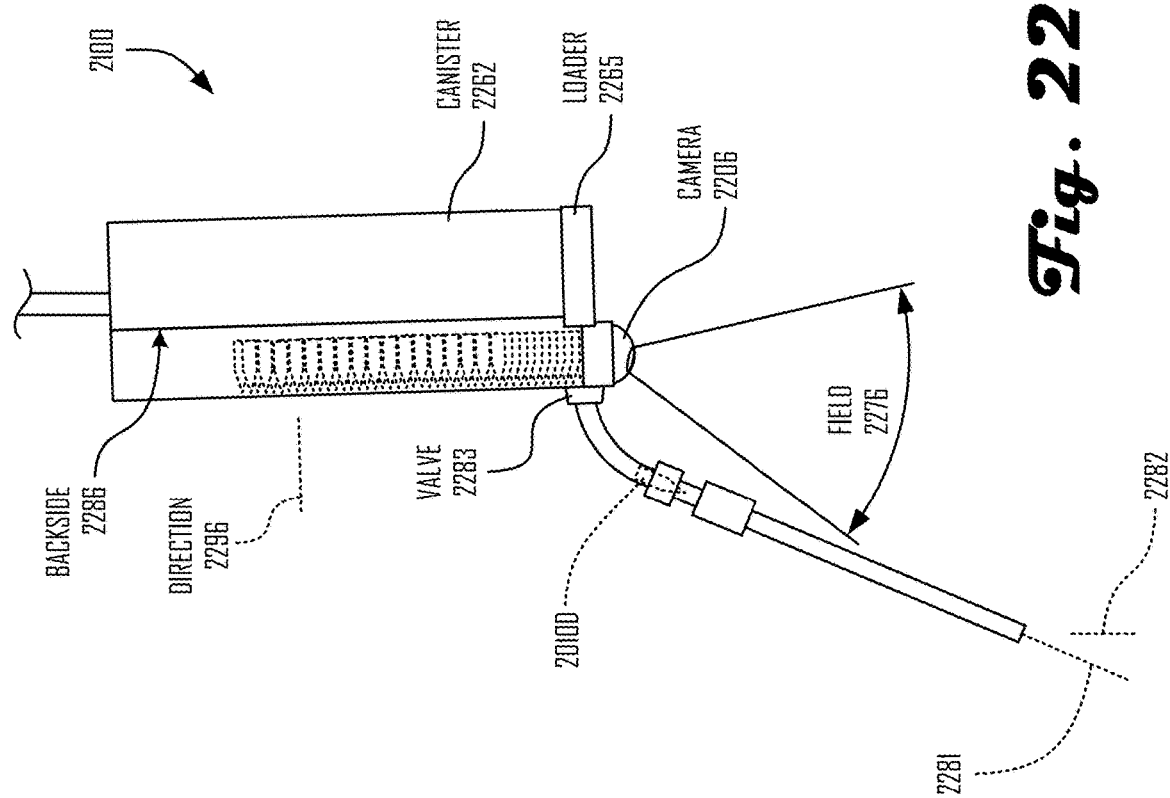
FIG. 22 illustrates the targeting subassembly of FIG. 21 preparing to deploy another propagule capsule according to one or more embodiments.

FIG. 22 illustrates the system of FIG. 21 in which a targeting assembly thereof is preparing to deploy another propagule capsule 2010D. There it can be seen that a backside 2286 of a capsule-containing cartridge may be configured to be opened (temporarily removed, e.g.) so as to allow one or more propagule capsules 210, 2010 therein thereby to be modified inside the cartridge (by adding petals, coatings, or other capsule components via posterior openings thereof, e.g.) within 24 hours of an individual capsule deployment. This can occur, for example, in a context in which many experimental treatments upon capsules 210, 2010 therein (or subassemblies thereof) to ascertain how yields might be improved would otherwise be possible only on a very limited scale (because of long lead times required for cost-effective mass production of capsule subassemblies, e.g.). Alternatively or additionally, the cartridge may (optionally) implement a gravity-fed hopper in which propagule capsules 210, 2010 therein are all (nominally) aligned in parallel (in a downwardly diagonal direction 2296, e.g.).

In some variants, moreover, one or more changes to a structure or composition of each propagule capsule 210, 2010 may be made successively within a staging subassembly (of an unmanned vehicle, e.g.) en route. This can occur, for example, in a context in which a staging subassembly is configured to puncture or otherwise cut into most or all propagule capsules 210, 2010 from a given cartridge successively during a single deployment of the unmanned vehicle. In some variants, for example, a staging subassembly may be configured to alter a structure or composition (or both) of the first propagule capsule 2010C before deploying the first propagule capsule 2010C and also configured to alter a structure or composition of a second propagule capsule 2010D less than one minute after deploying the first propagule capsule 2010C and less than one minute before deploying the second propagule capsule 2010D.

Alternatively or additionally, a (variant of a) staging subassembly may be configured (1) to open a first valve 2283 so that a propagule capsule 2010D (pushed by loader 2265, e.g.) can approach a staging position, (2) to allow the staging subassembly to engage the propagule capsule 2010D at a staging position therein, (3) to finely aim a chute of a targeting subassembly toward a target, and (4) to allow the staging subassembly to release the propagule capsule 2010D via the finely-aimed chute so that the propagule capsule 2010D has a precisely controlled direction 2281 relative to a downward direction 2282. This can occur, for example, in a context in which one or more cameras 2206 of the payload has a field 2276 of view that overlaps an endmost portion of chute and in which an applied propellant pressure (from canister 2262, e.g.) that accelerates the propagule capsule 2010D is controlled or taken into account (or both) when deciding when to release the propagule capsule 2010D toward the target and in which (one or more solenoids, servos, or other motor controls of) gimbal finely tunes the release angle of chute using image data obtained from the one or more cameras 2206.

Figure 23:
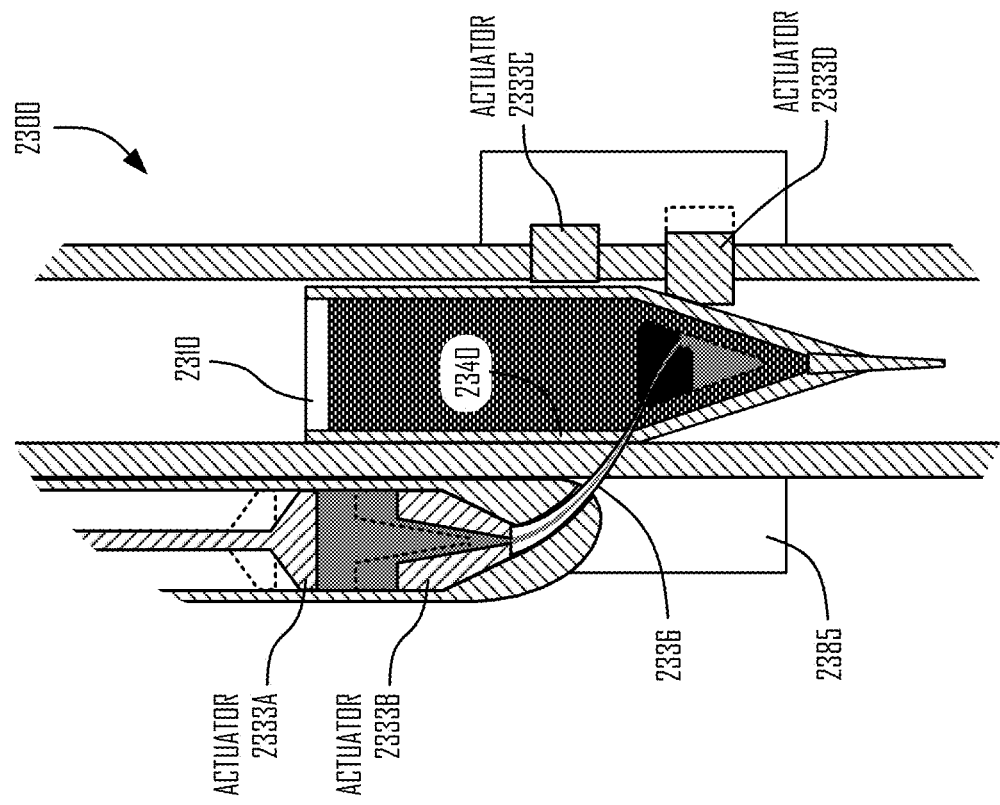
FIG. 23 illustrates a system in which a propagule capsule is being staged for deployment according to one or more embodiments.

FIG. 23 illustrates a system 2300 in which a propagule capsule 2310 (optionally as an instance of capsule 210, e.g.) is being staged for deployment via a release mechanism 2385 that includes several actuators 2333A-D. Prior to the configuration of FIG. 23, one or more actuators 2333B-C were retracted (upward and rightward, e.g.) enough to allow propagule capsule 2310 to drop freely into the staging position as shown. This allows one or more positioning actuator 2333D (in a leftward/engaged position as shown) to engage the propagule capsule 2310 so as to stop the downward motion. With the propagule capsule 2310 there, one or more puncture actuators 2333B are allowed to move into an engaged position (downward as shown) so that (a housing 2340 of) propagule capsule 2310 is laterally punctured (by syringe 2336 as shown, e.g.). In some contexts one or more simultaneous additional punctures (so as to allow an escape of displaced air, e.g.) may be appropriate, not shown. Finally one or more plungers (instances of actuator 2333A, e.g.) are actuated (by a downward motion thereof, e.g.).

Figure 24:
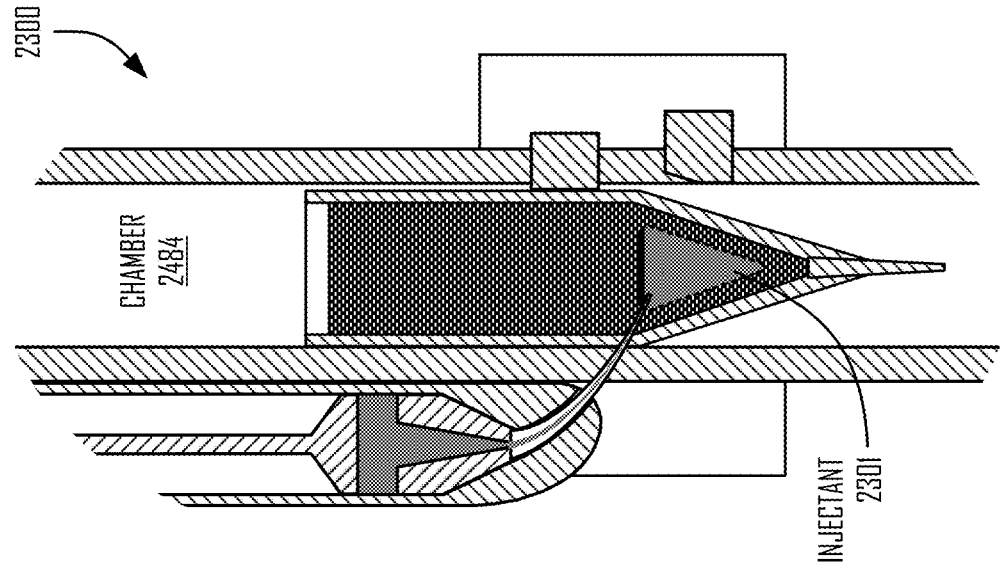
FIG. 24 illustrates the system of FIG. 23 in which the propagule capsule is in a more advanced state of staging according to one or more embodiments.

FIG. 24 illustrates the system of FIG. 23 in which the propagule capsule is in a more advanced state of staging by virtue of an injectant 2301 (a water-containing mixture or gel, e.g.) nearly filling up a chamber of the propagule capsule 2310. Meanwhile another valve is opened so that chamber 2484 is pressurized to a calibrated firing pressure (greater than 2 atmospheres, e.g.) from a pressurized canister 2262 aboard the unmanned vehicle. And when special-purpose aiming circuitry determines that a present position of chute is sufficiently on target a slight (rightward) movement of one or more release actuators 2333C allows the propagule capsule 2310 to accelerate rapidly toward its target.

In some variants one or more systems, 2300 described herein implement a staging subassembly configured to alter a composition of a propagule capsule 2310 (as an instance of one or more other capsules described herein, e.g.) by depositing an injectant 2301 into the first propagule capsule before deploying (releasing or shooting, e.g.) the first propagule capsule and also configured to alter a composition of a second propagule capsule by depositing the injectant 2301 into the second propagule capsule less than one minute after deploying the first propagule capsule 2010C and less than one minute before deploying the second propagule capsule. This can occur, for example, in a context in which any such modification (as an injectant 2301, e.g.) would not otherwise be feasible because of a premature structural degradation of its housing 2340 that would prevent a successful targeting and ground penetration of adequate depth.

FIG. 25 illustrates a system 2500 comprising a just-deployed propagule capsule about to undergo degradation (a rupture of housing 2540 similar to other substrates described herein, e.g.) induced by water. This can occur, for example, in a context in which a dry weight majority of an artificial water-transfer conduit thereof is a growing medium constructed and arranged to undergo a volumetric expansion of more than 20% when hydrated (like that of compressed and dried peat 162 when saturated with water, e.g.). Alternatively or additionally, in a context in which a substrate includes a housing 240, 2540 that advantageously balances initial structural integrity (i.e. upon individual capsule deployment) with preventing compression damage upon the one or more propagules by having (at least) a longitudinal housing portion thereof (a water-soluble adhesive material 145 within a seam 2508, e.g.) having an aqueous solubility greater than 5 grams per liter. Such features may be used to accelerate a rupturing of the substrate that makes possible an egress of one or more roots through the substrate and into surrounding soil 2599. See FIG. 24. Moreover in some variants a soil-contacting exterior surface 2568A may be absorbent enough to soak water up from surrounding soil 2599.

FIG. 26 illustrates the deployed propagule capsule of FIG. 25 having undergone a significant degradation induced by the water (hours or days after deployment, e.g.). A growing medium, having absorbed significant water, has therefore a volumetric expansion of more than 20% when hydrated (like that of compressed and dried peat 162 when saturated with water, e.g.). This can be accelerated in an instance where a mass-produced capsule subassembly of a particular type (make and model, e.g.) has been seen to suffer low yield and in which a capsule treatment affecting capsule composition or structure (or both) within 24 hours of individual capsule deployment may enhance yields, for example. By whatever protocol, it is generally desirable to balance initial structural integrity (i.e. upon individual capsule deployment) with other factors that may promote higher survival rates or similar biometrics as described above (such as by increasing instances of rupture 2606 by which root egress, especially in a downward direction, may occur more often). See FIGS. 27-28.

Figure 27:
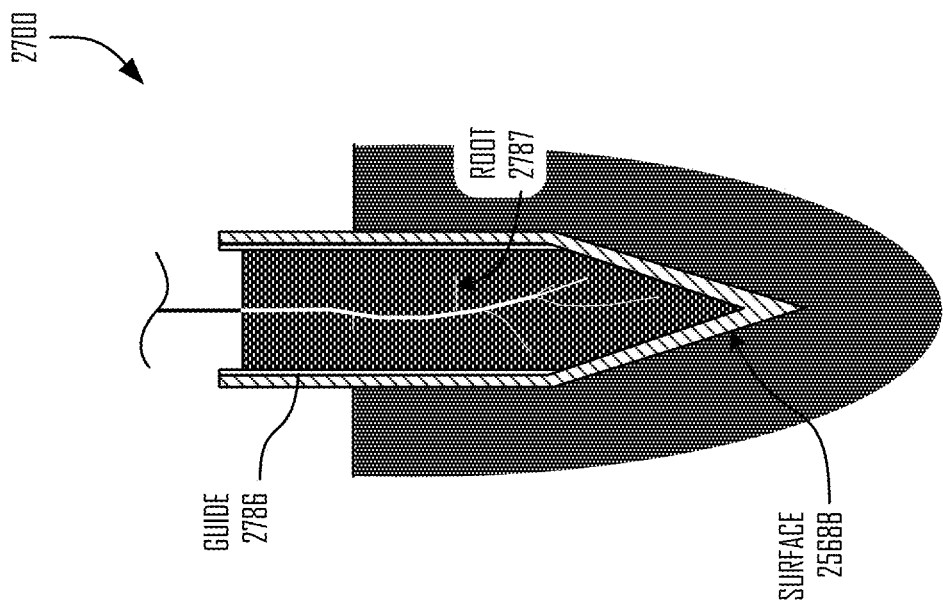
FIG. 27 illustrates a deployed propagule capsule having one or more root-guiding structures.

FIG. 27 illustrates a deployed propagule capsule in which a housing 240, 2540 includes a plurality of substantially longitudinal guides 2786 (ribs or grooves more vertical than horizontal as shown, e.g.) so as to redirect (less productive) lateral root growth of the one or more (roots 2787 of) propagules, downward (more productively). Alternatively or additionally, in some variants a soil-contacting exterior surface 2568B of the housing 2540 may be absorbent enough to soak water up from surrounding soil after capsule deployment, accelerating degradation of the housing 2540 and thereby facilitating root growth.

Figure 28:
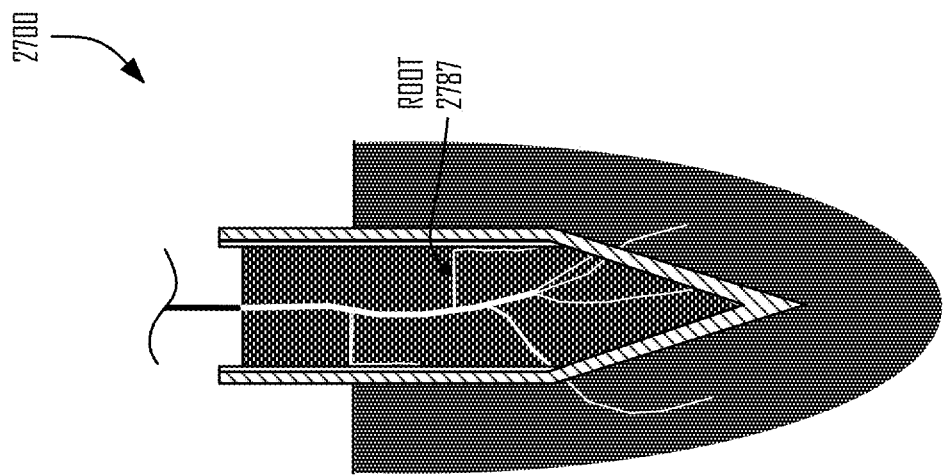
FIG. 28 illustrates the deployed propagule capsule of FIG. 27 in which the root-guiding structure(s) thereof have guided root growth.

FIG. 28 illustrates the deployed propagule capsule of FIG. 27 in which the root-guiding structure(s) thereof have guided root growth that was initially lateral to travel downward instead.

Figure 29:
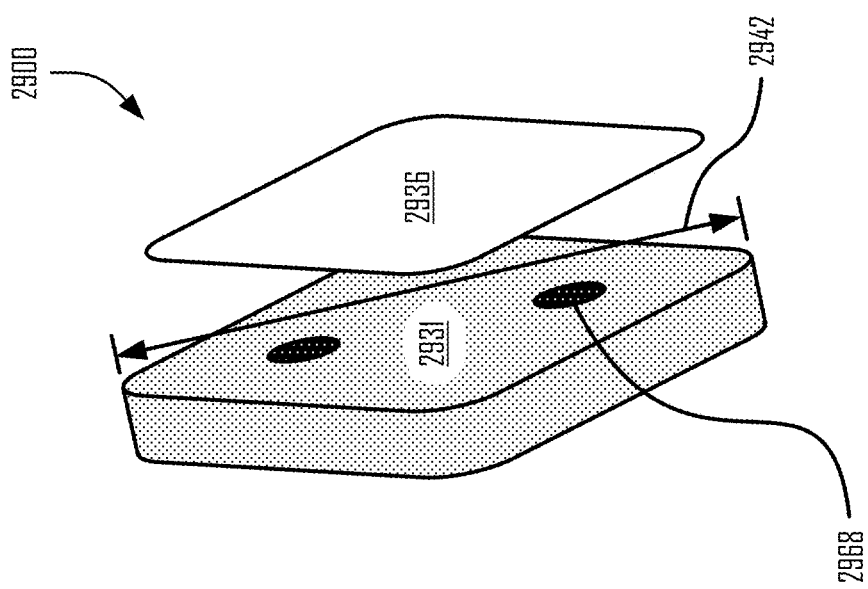
FIG. 29 illustrates a system including components of a wide base propagule capsule under construction.

FIG. 29 illustrates various configurations of a planting system 2900 incorporating a "wide base" propagule capsule. Such capsules may be configured to contain one or more propagules, in a borehole 2968 or similar recessed portion of (a side of) a first layer 2931 of one or more (amorphous or other) porous dry growth media 126. In various embodiments, a volumetric majority of the first layer 2931 may comprise dried pressed coconut coir 161 or peat 162 (or some combination of these). Alternatively or additionally first layer 2931 may include diatomaceous earth or other such suitable porous media. As used herein a "wide base" propagule capsule refers to one having a base diameter 242, 2942 of more than 3 centimeters. This is in contrast to smaller-footprint capsules (depicted above at FIGS. 22-28, e.g.) that typically deploy along a forward trajectory and feature a single frontmost portion (designed to pierce the ground, e.g.). As shown, planting system 2900 is configured to hold one or more propagules in each occupied recessed portion with adhesive-containing fill material (see FIG. 31) or a biodegradable containment covering 2936 (or both).

Figure 30:
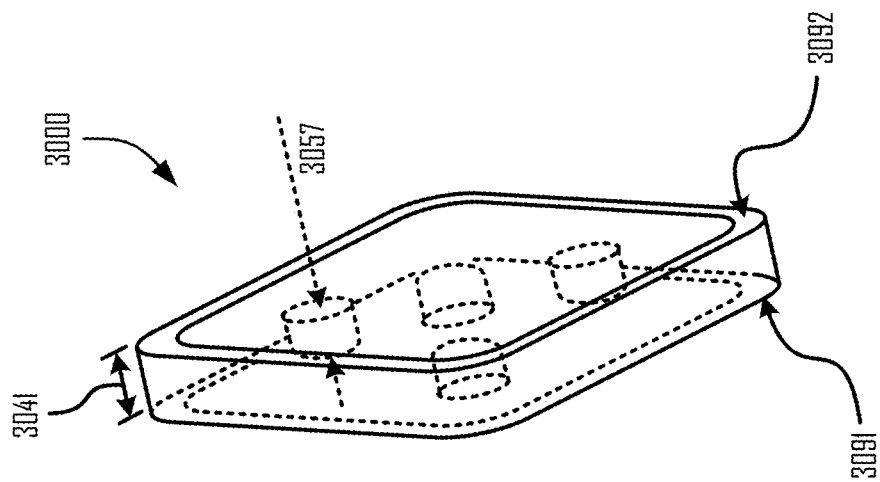
FIG. 30 illustrates a system including additional aspects of a wide base propagule capsule.

FIG. 30 illustrates features of another planting system 3000 incorporating a "wide base" propagule capsule having a (nominal maximum capsular) thickness 241, 3041 (between 1 and 30 mm, e.g.), optionally incorporating the features of system 2900 also. As shown, each of the (opposite) sides 3091-3092 has a plurality of boreholes 2968 configured to receive seeds 107 or other propagules 207, each covered with a biodegradable containment covering 2936. In some variants such recessed portions may (optionally be configured each with a depth sufficient to) penetrate a majority of the capsular thickness 241, 3041 as shown. Alternatively or additionally such coverings 2936 on one or both major sides may cover a majority of the side with a (nominally) smooth and slippery surface to facilitate deployment (from a stack or similar gravity feed arrangement, e.g.) and provide only a (nominally) slight barrier to seedling growth. Moreover in some variants such coverings 2936 may leave an outermost part of the side uncovered to facilitate absorption of occasional precipitation (into first layer 2931, e.g.) while it is available (not yet evaporated, e.g.).

FIG. 31 illustrates features of another planting system 3100 incorporating wide base propagule capsules 210, optionally incorporating one or more features described in FIGS. 29-30 also. As shown, a drone-borne sleeve 3188 or other cartridge of a field-selected type 3141 and capacity 3142 contains one or more stacks 3189 of puck-type propagule capsules 210, 3110 of a field-selected type 3111 (identified with a label like "1-sided small puck" or "2-sided small puck with fir and grass seeds," e.g.) and footprint 3112 (between 5 and 100 square centimeters, e.g.). The "2-sided" designation may refer to primary and secondary sides 3161-3162 both containing such propagules 3107 in respective recessed portions 3168 thereof, allowing the capsules to be deployed in a tumbling trajectory 3197. Such deployment may be implemented with a linear-actuation-type loader 3165 via one or more sloping guides 3195. Recessed portions 3168 on each of the sides 3161-3162 may be covered with a coating or biodegradable containment covering 2936 having a thickness 3159 within an order of magnitude of 0.1 millimeter. Alternatively or additionally a slightly larger thickness 3158 (within an order of magnitude of 0.2 millimeters, e.g.) of the one or more media 126, 3126 may effectively protect against rodent predation (provided that it is contiguous or that any topside openings thereof are small enough to be sealed with a fixative without substantially hindering seedling growth, e.g.). In some variants the propagule 3107 may likewise be protected (slightly) by a coating 3118 or fill material 3170 containing one or more olfactory or gustatory pest deterrent agents 3171 or fertilizers (or both). Such amendatory agents 3171 may include one or more olfactory or gustatory pest deterrents (ghost peppers or similarly pungent materials exceeding 5000 Scoville heat units, e.g.) or fertilizers (blood meal or other animal by-products, e.g.). Alternatively or additionally such fill material 3170 may include one or more effective water-absorbent materials (fragments of diatomaceous earth or fibrous material, e.g.). One or more granular compressed growth media 126, 3126 may also be used in such fill material 3170 provided that due care is taken to avoid strangling the seedling or root with excessive fixative 3172. If a fill material 3170 or other growth media 126 is "highly" granular or porous (or both), this corresponds to capsule components made thereof containing "substantial" interstitial gas 173 (i.e. more than 2% of a housing 240, 2340 or cavity) as further described herein.

Figure 32:
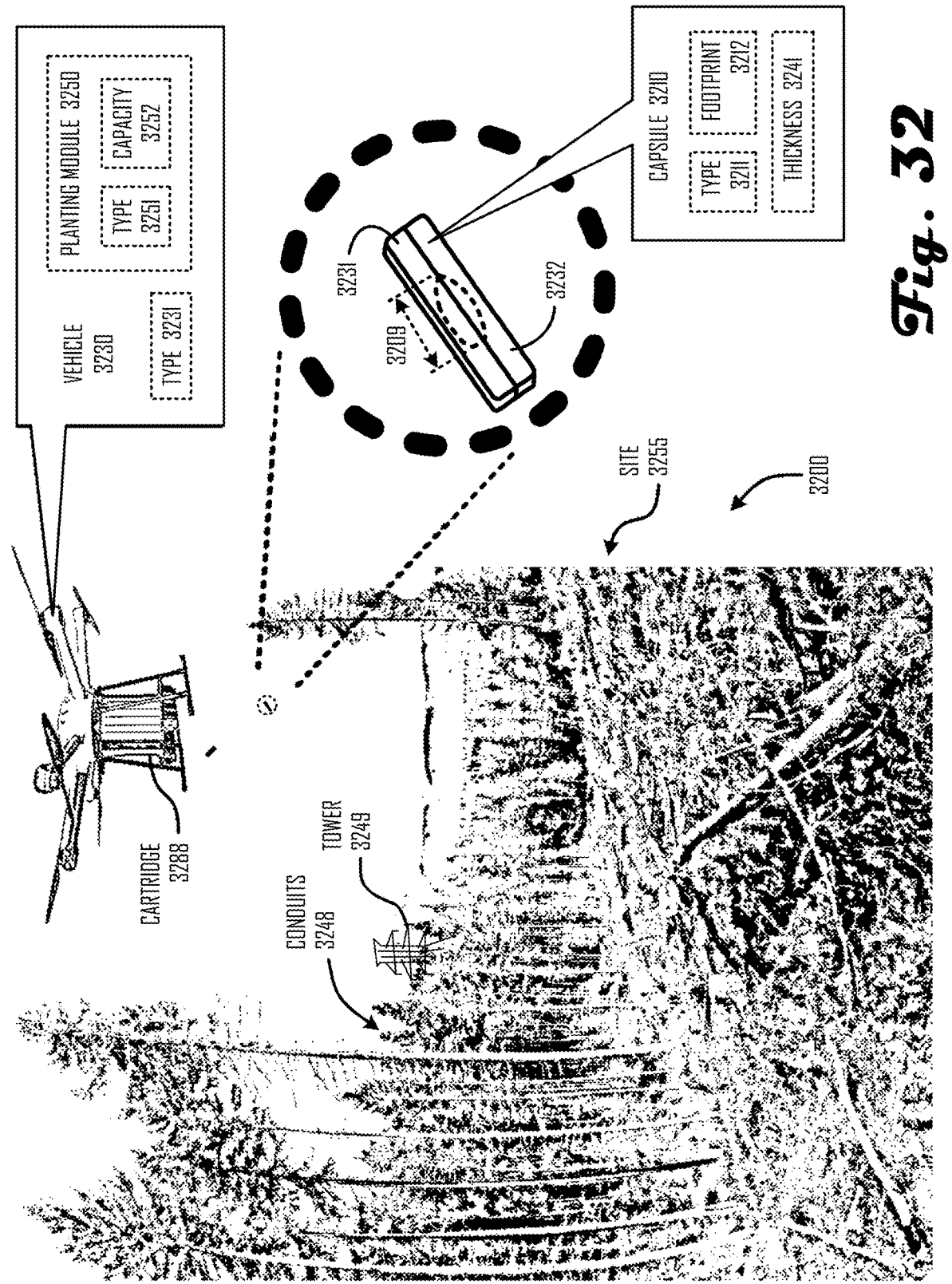
FIG. 32 illustrates a system including a flying vehicle carrying a container with another propagule capsules in a tumbling trajectory.

FIG. 32 illustrates features of another planting system 3200 incorporating propagule capsules 3210 dropped by a planting module 3250 toward a planting site 3255. In some contexts various types 3251 and capacities 3252 of factory-configured planting modules 3250 may be provided at a remote site and matched to a suitable number and type 3231 of compatible vehicles 3230 (flying drones, e.g.). In some variants large propagules (i.e. having a diameter longer than 5 millimeters, e.g.) such as some acorns may be deployed in a clamshell-type capsule 3210 such that a single propagule effectively extends into recessed portions 3168 of two layers 3231-3232. Because this type 3211 of capsule 3210 (having a capsule footprint 3212 exceeding 10 square centimeters) and thickness 3241 (of 2-5 centimeters) severely limits the capsule count bearable by each cartridge, it is expected that a single vehicle may simultaneously bear one or more higher-capsule-count cartridges (in which each of the numerous capsules 3110 thereof in a stack has a smaller thickness 241, 3041, e.g.) and a lower-capsule-count cartridge 3288 (i.e. able to hold only a relatively smaller number of capsules 3110 thereof than a higher-capsule-count cartridge also aboard) in a single mixed deployment (planting conifers in some sites 3255 and oaks in others, e.g.) of a single flight or route.

In some variants a planting module 3250 may be of a type 3251 configured to include a selectively first removable sleeve 3188 or other first cartridge 3288 (so that the planting module 3250 may remain attached to vehicle 3230 (drone 431, 1231, e.g.) with one or more other sleeves 3188 or cartridges 3288 thereof remaining in situ, e.g.). Alternatively or additionally the planting module 3250 may be released from the vehicle 3230 (at a discharge location, e.g.) during its flight as an automatic and conditional response to completing a planting deployment phase of a programmatic route 1323 (along which most or all propagule capsules 210, 2010, 3110, 3210 within the first sleeve 3188 or cartridge 3288 are deployed, e.g.). In some variants, for example, the same programmatic route 1323 calls for the vehicle 3230 to proceed to a next (fully loaded) planting module 3250 or station (configured for battery or fuel cell replacement, e.g.) right after such release (within a minute, e.g.).

Also shown in FIG. 32 is an electrical tower 3249 configured to support several high voltage lines (as examples of conventional utility power grid conduits 3248) for purposes of contrasting locations that are accessible to an installed electrical power grid. As used herein a tract 250 is "remote" if it is more than 100 meters from any tower-supported, buried, or other conventional utility power grid conduits. As used herein a utility power grid conduit is "conventional" if it is an installed power line or a power cord operably coupled to draw electricity therefrom (via a wall outlet of a permanent structure, e.g.).

Referring now to FIG. 33, there is shown a power distribution system 3300 suitable for charging multiple lithium-based battery units 365F-J according to one or more embodiments. One or more power sources (not shown) are operably coupled to provide power in a remote location 250 to one or more chargers 366 each operably coupled to one or more lithium-based battery units 365F-J. Several cubby holes 569A-E are provided so that respective batteries will be protected from one another during such charging. For example DC power 368 may be routed to one or more chargers 366 (as shown in FIG. 3) so that a dozen or more battery units 365 may be charged while resident in respective cubby holes 569 having outward-facing vents 3347 (with a cross-sectional area 3348 larger than 5 square centimeters, e.g.). As used herein, exhausting or otherwise facing "outward" means generally away from a center of a motor vehicle or other structure of which it is a part and not directly toward any other battery-containing cubby hole 569 within 1 meter.

This can occur, for example, in a context in which one or more layers 3330 have a (median aggregate or other nominal) thickness 3332 within an order of magnitude of 1-5 centimeters, in which a nominal R factor 3334 between successive batteries 365H-I is within an order of magnitude of 1-10 m^2 kelvin/watt, wherein the first lithium-based battery unit thereafter contains within an order of magnitude of 100-1000 watt-hours (Wh) of energy, and in which conduction or degradation of such layers 3330 would otherwise allow a thermal runaway in one cubby hole 569D (i.e. greater than 500 degrees) to trigger a chain reaction in one or more adjacent cubby holes 569C by which a lithium-based battery unit 365H therein ignites and jeopardizes other nearby battery units 365F-G. In some variants, for example, a material 3333 may include a fire-retardant component 3335 (gypsum, e.g.) having a melting temperature higher than 500 degrees Celsius as to facilitate an aggregate charging rate within an order of magnitude of 50-500 kilowatts per transport vehicle 230, in some variants without even having to unload charging equipment from such vehicles. Even though a burning lithium-based battery unit 569D can sometimes trigger a flame temperature as high as 850 degrees Celsius, such innovative charging systems 300, 3300 make remote drone fleet deployment feasible at scale by enabling safe remote simultaneous recharging of a dozen or more lithium-based battery units 365. This can be a game changer in forestry or other contexts where an agricultural or other drone fleet would not otherwise be safe for such deployments remote from any established power grid.

FIG. 34 illustrates a flow chart of operations relating to aerial deployment planting. Operation 3415 describes gathering data (special-purpose circuitry aboard a reconnaissance drone 431, 1231, or other unmanned vehicle gathering raw data 1220 of materials on a planting area (tract 250, e.g.), that includes a first microsite or other planting site 255, 3255, e.g.).

Operation 3420 describes storing the data (special-purpose circuitry at station storing the raw data 1220 of the materials on the planting site 3255, e.g.).

Operation 3430 describes qualifying the first microsite as a suitable planting area (special-purpose circuitry at station generating or accepting a decision to plant the area, e.g.).

Operation 3445 describes placing propagules into propagule capsules 210 (special-purpose circuitry in factory robots assembling propagules, 3107 into capsule subassemblies or capsule subassemblies into propagule capsules 210, 3110, e.g.). This can occur, for example, in a context in which such assembly also includes loading sleeves 3188 or other cartridges with propagule capsules 210, 3110.

Operation 3455 describes deploying an unmanned vehicle to the planting area with many loaded propagule capsules 210 (special-purpose circuitry at station directing unmanned vehicle to commence a planting route for a next swath of planting area, e.g.).

Operation 3460 commences a loop.

Operation 3470 describes determining that the unmanned vehicle is within range of an unplanted target (special-purpose circuitry aboard unmanned vehicle successfully moving so that a next planting target is currently within range, e.g.).

Operation 3475 describes launching a propagule capsule targeted toward and landing within a corresponding microsite (special-purpose circuitry aboard unmanned vehicle successfully triggering a launch of a propagule capsule, 3110 targeted toward and landing within a corresponding microsite, e.g.).

Operation 3480 moves control to a next iteration of the loop unless all available microsites are planted or it is time to reload.

FIG. 35 illustrates a flow 3500 of operations relating to artificially enhanced deployment planting. Operation 3510 describes obtaining a multitude of propagules each having a diameter within an order of magnitude of 3 millimeters (a factory or field deployment worker preparing or procuring dozens or hundreds of propagules 207, 3107 each having a length 3209 more than 0.3 mm and less than 3 centimeters, e.g.).

Operation 3520 describes commences a loop.

Operation 3530 describes configuring one or more propagules in a propagule capsule with a thickness within an order of magnitude of 1 centimeter, a diameter within an order of magnitude of 10 cm, and a footprint larger than 3 square cm (e.g. an assembly machine or worker configuring one or more propagules into a puck or similar capsule 210, 2010, 3110, 3210 with a thickness 241 within an order of magnitude of 1 centimeter, a diameter 242 within an order of magnitude of 10 cm, and a footprint 212 larger than 5 square cm in area). This can occur, for example, in a context in which the capsule design calls for dried compressed peat 162, coconut coir 161, or similar hydration-activated expanding growth media 126, 3126 to comprise a volumetric majority of each completed capsule 210, 2010, 3110, 3210.

Operation 3540 commences a next iteration of the loop unless the desired set of propagule capsules are ready.

Operation 3550 describes loading a resulting multitude of dry propagule capsules into a chamber shorter than 1 meter (an assembly machine or worker loading a stack 3189 of dry propagule capsules 210, 2010, 3110, 3210 into a sleeve 3188 or the like with a vertical capacity 3142 of less than one meter, e.g.). This can occur, for example, in a context in which each of the propagule capsules 210, 2010, 3110, 3210 has a thickness 241, 3041 of 1-5 cm and in which the stack 3189, multitude, or other capsule supply has a height less than that of 20-100 capsules.

Operation 3560 describes deploying a drone 431, carrying the chamber to a vicinity of a microsite (a field deployment worker or station deploying a drone 431, 1231, carrying a sleeve 3188 or other capsule supply within a deployment range of a target planting site 3255, e.g.).

Operation 3570 describes deploying a first dry propagule capsule via a sloped guide to fall in a tumbling trajectory such that the first dry propagule capsule lands with a primary side thereof (upon or otherwise) above and adjacent the microsite (a flying or other vehicle 3230 deploying a first dry propagule capsule 210, 2010, 3110, 3210 via a sloped guide 3195 to fall in a tumbling trajectory 3197 such that the first dry propagule capsule 210, 2010, 3110, 3210 lands with its primary side 3161 closer than a secondary side 3162 to the microsite, e.g.). This can occur, for example, in a context in which such placement allows below-ground seepage, dew, or rain eventually to perfuse the dried and highly compressed growth media 126, 3126 (by capillary action, e.g.), triggering the volumetric expansion; in which the volumetric expansion allows the propagule 207, 3107 to grow upward through the media 126, 3126; in which the local hydration allows at least one root 2787 from the one or more propagules 207, 3107 to grow downward into the microsite; and in which such survival and growth would otherwise require prohibitively expensive human intervention.

FIG. 36 illustrates a flow 3600 of operations relating to artificially enhanced deployment planting. Operation 3615 describes configuring one or more dry growth media in a first layer so that a thickness of the first layer is within an order of magnitude of 1 centimeter and so that a diameter of the first layer is more than twice its thickness (an assembly machine or worker configuring one or more dry growth media 126, 3126 in a first layer 2931, 3231 so that a thickness 241, 3041 of the first layer 2931, 3231 is within an order of magnitude of 1 centimeter and so that a diameter 242, 2942 of the first layer 2931, 3231 is more than twice its thickness 241, 3041, e.g.).

Operation 3625 describes forming recessed portions on primary and secondary (opposite) sides of the first layer, the recessed portions each including a borehole extending through most of the thickness of the first layer (an assembly machine or worker forming boreholes or grooves on primary and secondary (opposite) sides 3161, 3162 of the first layer 2931, 3231, the recessed portions 3168 each including a borehole 2968 extending through most of the thickness 3041 of the first layer 2931, 3231, e.g.).

Operation 3645 describes holding a first propagule at least partly within the recessed portion of the primary side by affixing a biodegradable containment covering to the primary side of the first layer with more than half of the first propagule exposed to air (an assembly machine or worker affixing a paper or other biodegradable containment covering 2936 to the primary side 3091 of the first layer 2931, 3231 so as to hold one or more propagules 207, 3107 at least partly within a recessed portion 3168 of the primary side 3161, e.g.). This can occur, for example, in a context in which the biodegradable containment covering 2936 comprises a water-soluble polymer or similar slippery material adhesively affixed to a major flat surface of the primary side 3091, in which the (coated or other) propagule 207, 3107 is surrounded with one or more fill materials 3170 (having components) that are sufficiently granular so that more than half of (a surface area of) the first propagule is exposed to a gas 173 (e.g. air or nitrogen) and thereby facilitating access to water and suitable drainage, in which the one or more growth media 126, 3126 above the deployed capsule 3110 is enough to hide a seed or other germinating propagule 3107 and not enough to impair upward growth and in which biodegradable containment coverings and fill material 3170 are not reliably effective for preventing propagule predation by rodents.

Operation 3655 describes holding a second propagule at least partly within the recessed portion of the secondary side by affixing a biodegradable containment covering to the secondary side of the first layer with more than half of the second propagule exposed to a gas (an assembly machine or worker affixing a biodegradable containment covering 2936 to the secondary side 3092 of the first layer 2931, 3231 so as to hold one or more propagules 207, 3107 at least partly within a recessed portion 3168 thereof, e.g.). In some variants the propagules on the primary and secondary sides 3091, 3092 may be of the same species so as to enhance the likelihood that at least one such propagule will survive. This can occur, for example, in a context in which any such propagule on the secondary side 3092 will be devoured, in which a tumbling trajectory 3197 of the deployment is performed haphazardly in lieu of any effective mechanism for ensuring that the primary side 3091 will land below the secondary side 3092, in which a 50% yield loss due to predation would not be acceptable, in which a final determination of which is the primary side 3091 is only made upon deployment of each capsule, and in which greater amounts of adhesive or other blockages would otherwise stunt capsular yields by presenting a dangerous barrier that each fragile seedling must pierce before reaching a planting site 255.

Operation 3665 describes deploying a resulting dry propagule capsule to fall in a tumbling trajectory such that the dry propagule capsule lands with the primary side thereof upon or otherwise adjacent a planting site and whereby the first layer protects the first propagule against rodent predation long enough for a root to grow from the first propagule into the planting site (a field deployment worker or station deploying a drone 431, 1231, carrying a sleeve 3188 or other capsule supply configured to activate a capsule release actuator within a deployment range of a target planting site 3255, e.g.). This can occur, for example, in a context in which operation 3665 is a component of operation 3570 and in which a record of such actuation is kept in conjunction with contemporaneous context data (photographic data from a camera 2206 or coordinates from a positioning system aboard the drone. Alternatively or additionally, the capsule release actuator may be implemented as a respective linear actuator positioned adjacent each of several sleeves 3188 aboard the drone.

FIG. 37 illustrates a flow chart of operations relating to aerial deployment. Operation 3710 describes configuring one or more power sources as described herein (e.g. by a system operator directly or otherwise coupling the one or more generators or other first electrical power sources 352 so as to provide AC power directly or otherwise through a first current-limiting disconnect switch 353, a first camlock interface 354 and to one or more AC/DC converters 358).

Operation 3720 describes routing power as described herein to charge at least four battery units (e.g. by a system operator directly or otherwise configuring power components to carry DC power 368 from an AC/DC conversion unit through one or more DC buses 359 having a controlled voltage 374 to one or more chargers 366 so as to charge first, second, third, and fourth lithium-based battery units 365A-D therethrough simultaneously). This can occur, for example, so that each charged lithium-based battery unit 365A thereof contains more than 400 watt-hours (Wh) of stored energy.

Operation 3730 describes configuring a motor vehicle as described herein (e.g. by a system operator personally or otherwise assembling a truck, helicopter, bus, or other single motor vehicle 230 to haul hardware like that of FIG. 3).

Operation 3740 describes powering a drone as described herein (e.g. by a system operator personally or otherwise configuring a drone 431, 1231 to be powered at least partly by a first lithium-based battery unit 365 configured to facilitate a first deployment of numerous propagule capsules 210, 2910, 3010 therein and also configured to facilitate germination (of propagules 207, 2907) thereof by dispersing the numerous propagule capsules 210, 2910, 3010 remotely).

Operation 3750 describes powering another drone in a like manner. In some variants, for example, third and fourth lithium-based battery units 365 are respectively charged while the first and second are being charged simultaneously via the one or more DC buses 359.

Operation 3760 describes reloading the first drone as described herein (e.g. by a system operator personally or otherwise loading numerous additional propagule capsules 210, 2910, 3010 aboard the first drone 431, 1231 and replacing the first lithium-based battery unit 365A with the third lithium-based battery unit 365C after the first drone deployment.

Operation 3770 describes reloading the second drone as described herein (e.g. by a system operator personally or otherwise loading numerous additional propagule capsules 210, 2910, 3010 aboard the second drone 431, 1231 and replacing the second lithium-based battery unit 365B with the fourth lithium-based battery unit 365D after the prior deployment of the second drone.

Following these operations flow 3700 may further include an operation like powering the first drone 431, 1231 (at least) by the third lithium-based battery unit 365C configured to facilitate a deployment of (at least some of) the numerous additional propagule capsules 210, 2910, 3010 and also configured to (cause, promote, or otherwise) facilitate germination of propagules 207, 2907 thereof (e.g. by dispersing the numerous additional propagule capsules 210, 2910, 3010 remotely). Flow 3700 may likewise include powering the second drone 431, 1231 by the fourth lithium-based battery unit 365D configured to facilitate a deployment of the numerous other propagule capsules 210, 2910, 3010 and also configured to facilitate germination thereof (e.g. by dispersing the numerous other propagule capsules 210, 2910, 3010 remotely).

In light of teachings herein, numerous existing techniques may be applied for configuring special-purpose circuitry or other structures effective for configuring structures and materials as described herein without undue experimentation. See, e.g., U.S. Pub. No. 2018/0077855 ("Seed Planter Using Air Propulsion"), U.S. Pub. No. 2018/0075834 ("Noise Cancellation for Aerial Vehicle"), U.S. Pub. No. 2018/0035606 ("Smart Interactive and Autonomous Robotic Property Maintenance Apparatus, System, and Method (Finds Bare Spots, Uses Gimbal Gyroscope)"), U.S. Pub. No. 2018/0024570 ("Gimbaled Universal Drone Controller"), U.S. Pub. No. 2018/0024422 ("Gimbal Having Parallel Stability Mechanism"), U.S. Pub. No. 2018/0000028 ("Multi-Media Structures Containing Growth Enhancement Additives"), U.S. Pub. No. 2017/0359943 ("Automatic Target Recognition and Dispensing System"), U.S. Pub. No. 2017/0288976 ("Modules Registration and Status Update Of Modular Assembly System"), U.S. Pub. No. 2017/0286089 ("Firmware of Modular Assembly System"), U.S. Pub. No. 2017/0285927 ("Host Applications of Modular Assembly System"), U.S. Pub. No. 2017/0282091 ("Modular Assembly System"), U.S. Pub. No. 2017/0029109 ("Aircraft Seed Broadcasting Systems, Apparatus and Methods"), U.S. Pub. No. 2016/0234997 ("Systems and Methods for Aerial Seeding"), U.S. Pub. No. 2011/0303137 ("Seed Sensor System and Method for Improved Seed Count and Seed Spacing"), U.S. Pub. No. 2011/0035999 ("Structures and Methods for Attaching a Display Article to a Germinateable Seed and a Germinated Plant Carrying the Structure and/or the Display Article"), U.S. Pub. No. 2009/0107370 ("Planting Devices, Structures, and Methods"), and U.S. Pub. No. 2006/0042530 ("Product for and Method of Aerial Seeding Using Agglomerated Minerals"). These documents are incorporated herein by reference to the extent not inconsistent herewith.

With respect to the numbered clauses and claims expressed below, those skilled in the art will appreciate that recited operations therein may generally be performed in any order. Also, although various operational flows are presented in a sequence(s), it should be understood that the various operations may be performed in other orders than those which are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise. Also in the numbered clauses below, specific combinations of aspects and embodiments are articulated in a shorthand form such that (1) according to respective embodiments, for each instance in which a "component" or other such identifiers appear to be introduced (with "a" or "an," e.g.) more than once in a given chain of clauses, such designations may either identify the same entity or distinct entities; and (2) what might be called "dependent" clauses below may or may not incorporate, in respective embodiments, the features of "independent" clauses to which they refer or other features described above.

CLAUSES 1. (Independent) A propagule growth facilitation or other fleet support method comprising:
    obtaining a first propagule capsule 210, 2010, 3110, 3210 created by forming a (slurry or other) fibrous or granular mixture 113 of one or more base materials (e.g. coir 161 or peat 162) with one or more supplements 142;
    carrying the first propagule capsule 210, 2010, 3110, 3210 aboard a first aircraft/drone 431, 1231 toward a planting site 255; and
    automatically depositing the first propagule capsule 210, 2010, 3110, 3210 to the planting site 255 so that the fibrous or granular mixture 113 draws water at the planting site 255 into contact with a first propagule 207, 3107 of the first propagule capsule 210, 2010, 3110, 3210; wherein one or more supplements 142 in the fibrous or granular mixture 113 accelerate a growth of the first propagule 207, 3107 through the fibrous or granular mixture 113 into the planting site 255.

2. (Independent) A propagule growth facilitation or other fleet support method comprising:
    obtaining a multitude of propagules 207, 1907, 2007, 3107 each having a diameter (e.g. length 3209) within an order of magnitude of 3 millimeters;
    configuring one or more propagules 207, 1907, 2007, 3107 in a first propagule capsule 210, 2010, 3110, 3210 with a thickness 241, 3041 within an order of magnitude of 1 centimeter, a diameter 242, 2942 within an order of magnitude of 10 cm, and a footprint 212, 3112, 3212 larger than 5 square cm and so that a volumetric majority of the first propagule capsule 210, 2010, 3110, 3210 comprises growth media 126, 3126;
    loading a multitude of propagule capsules 210, 2010, 3110, 3210 including the first propagule capsule 210, 2010, 3110, 3210 into a first aircraft/drone 431, 1231;
    deploying the aircraft/drone 431, 1231 carrying the propagule capsules 210, 2010, 3110, 3210 to a vicinity 1596 of a first planting site 255; and
    deploying the first propagule capsule 210, 2010, 3110, 3210 to fall such that the first propagule capsule 210, 2010, 3110, 3210 lands with a first side 3161 thereof oriented above and adjacent the first planting site 255, wherein local hydration 2094 later causes at least one root from the one or more propagules 207, 1907, 2007, 3107 to grow out of the propagule capsule 210, 2010, 3110, 3210 and take root in the first planting site 255.

3. The method of METHOD CLAUSE 1 or CLAUSE 2, wherein the first aircraft/drone is a drone 431, 1231.

4. The method of METHOD CLAUSE 1 or CLAUSE 2, wherein the first aircraft/drone is an aircraft.

5. (Independent) A propagule growth facilitation or other fleet support method comprising:
    configuring one or more dry media 126, 3126 in a first layer 2931, 3231 so that a thickness 241, 3041 of the first layer 2931, 3231 is within an order of magnitude of 1 centimeter;
    forming one or more recessed portions 208 on a first side 3161 of and one or more recessed portions 208 on a second side 3162 of the first layer 2931, 3231;
    holding a first propagule at least partly within the recessed portion of the first side 3161 by affixing a biodegradable containment covering 2936 to the first side 3091, 3161 of the first layer 2931, 3231;
    holding a second propagule at least partly within the recessed portion of the second side 3162 by affixing a biodegradable containment covering 2936 to the second side 3162 of the first layer 2931, 3231 so as to assemble a first propagule capsule 210; and deploying the first propagule capsule 210, 2010, 3110, 3210 so that it lands with the first side 3161 thereof upon or otherwise adjacent a planting site 255.

6. (Independent) A propagule growth facilitation or other fleet support method comprising:
configuring one or more dry media 126, 3126 in a first layer 2931, 3231 so that a thickness 241, 3041 of the first layer 2931, 3231 is within an order of magnitude of 1 centimeter;
forming one or more recessed portions 208 on a first side 3161 of and one or more recessed portions 208 on a second side 3162 of the first layer 2931, 3231;
holding a first propagule at least partly within the recessed portion of the first side 3161 by affixing a biodegradable containment covering 2936 to the first side 3091, 3161 of the first layer 2931, 3231;
holding a second propagule at least partly within the recessed portion of the second side 3162 by affixing a biodegradable containment covering 2936 to the second side 3162 of the first layer 2931, 3231 so as to assemble a first propagule capsule 210; and
deploying the first propagule capsule 210, 2010, 3110, 3210 so that it lands with the first side 3161 thereof upon or otherwise adjacent a planting site 255.

7. (Independent) A propagule growth facilitation or other fleet support method comprising:
obtaining a first current-limiting disconnect switch 353;
obtaining one or more alternating-current-to-direct-current (AC/DC) converters 358;
transporting aboard one or more motor vehicles 230 (at least) a first electrical power source 352, the first current-limiting disconnect switch 353, the one or more AC/DC converters 358, one or more direct-current (DC) buses 359, and one or more chargers 366 to a first remote tract 250 more than 100 meters from any conventional utility power grid conduit 3248;
configuring (by operably coupling) the first electrical power source 352 to provide alternating-current (AC) power (directly or otherwise) through the first current-limiting disconnect switch 353 and to the one or more alternating-current-to-direct-current (AC/DC) converters 358A-C at the first remote tract 250;
routing DC power 368 from the one or more AC/DC converters 358 through the one or more DC buses 359 to the one or more chargers 366 so as to charge multiple battery units 365 including first and second lithium-based battery units 365 therethrough simultaneously so that the multiple battery units 365 are simultaneously charged at the first remote tract 250; and
powering first and second aircraft/drones 431, 1231 at the first remote tract 250 by the first and second lithium-based battery units respectively so as to obtain (airborne data 1215 or other) raw data 1220 for use in (surveying, planting, amending, or otherwise) fostering propagule growth according to forestry or other agricultural technologies known or described herein.

8. The method of any of the above METHOD CLAUSES, wherein simultaneously powering first and second aircraft/drones at a first remote tract more than 100 meters from any conventional utility power grid conduit by first and second lithium-based battery units respectively comprises:
configuring many aircraft/drones 431, 1231 at a remote tract 250 each simultaneously to include many payloads (capsules or other materials to be delivered, e.g.) a total payload greater than 5 kilograms.

9. The method of any of the above METHOD CLAUSES, wherein simultaneously powering first and second aircraft/drones at a first remote tract more than 100 meters from any conventional utility power grid conduit by first and second lithium-based battery units respectively comprises:
configuring many aircraft/drones 431, 1231 at a remote tract 250 each simultaneously to bear thousands of propagules 207, 1907, 2007, 3107.

10. The method of any of the above METHOD CLAUSES, wherein simultaneously powering first and second aircraft/drones at a first remote tract more than 100 meters from any conventional utility power grid conduit by first and second lithium-based battery units respectively comprises:
configuring many aircraft/drones 431, 1231 at a remote tract 250 each simultaneously to bear more than 2 kg of propagules 207, 1907, 2007, 3107.

11. The method of any of the above METHOD CLAUSES, wherein simultaneously powering first and second aircraft/drones at a first remote tract more than 100 meters from any conventional utility power grid conduit by first and second lithium-based battery units respectively comprises:
configuring many aircraft/drones 431, 1231 at a remote tract 250 each simultaneously to include (by virtue of each aircraft/drone bearing or being borne by a propagule-containing sleeve 3188 or similar module, e.g.) a total payload greater than 1 kilogram.

12. The method of any of the above METHOD CLAUSES, wherein a first adhesive material 145 thereof comprises roughly 0.3% to 3% of the fibrous or granular mixture by weight.

13. The method of any of the above METHOD CLAUSES, wherein a first adhesive material 145 thereof comprises roughly 0.3% of the fibrous or granular mixture by weight.

14. The method of any of the above METHOD CLAUSES, wherein a first adhesive material 145 thereof comprises roughly 3% of the fibrous or granular mixture by weight.

15. The method of any of the above METHOD CLAUSES, comprising:
warming a fibrous or granular mixture 113 thereof in a mold 109 and allowing (time for) a majority of water thereof to evaporate.

16. The method of any of the above METHOD CLAUSES, comprising:
using a factory mold 109 configured to exert significant pressure (e.g. within an order of magnitude of 15 atmospheres) upon a compressible component of a growth medium 126 thereof (while curing) so that hydration from a planting site 255 later triggers substantial volumetric expansion of the first propagule capsule 210, 2010, 3110, 3210.

17. The method of any of the above METHOD CLAUSES, comprising:
using a factory mold 109 configured to exert significant pressure (e.g. within an order of magnitude of 15 atmospheres) upon a compressible component of a growth medium 126 thereof so that hydration from a planting site 255 later triggers substantial volumetric expansion of the first propagule capsule 210, 2010, 3110, 3210.

18. The method of any of the above METHOD CLAUSES, wherein routing DC power 368 from the one or more AC/DC converters 358 to the one or more chargers 366 comprises:
charging the first and second lithium-based battery units 365 simultaneously within respective adjacent first and second (outward-facing or other) cubby holes 569 separated by one or more (layers 3330 comprising) materials 3333 having a nominal (aggregate or other total median) thickness 3332 within an order of magnitude of 1 centimeter.

19. The method of any of the above METHOD CLAUSES, wherein routing DC power 368 from the one or more AC/DC converters 358 to the one or more chargers 366 comprises:
    charging the first and second lithium-based battery units 365 simultaneously within respective adjacent first and second (outward-facing or other) cubby holes 569 separated by one or more (layers 3330 comprising) materials 3333 having a nominal (aggregate or other total median) thickness 3332 within an order of magnitude of 5 centimeters.

20. The method of any of the above METHOD CLAUSES, wherein routing DC power 368 from the one or more AC/DC converters 358 to the one or more chargers 366 comprises:
    charging the first and second lithium-based battery units 365 simultaneously within respective adjacent first and second (outward-facing or other) cubby holes 569 separated by one or more (layers 3330 comprising) materials 3333 having a nominal (aggregate or other total median) R factor 3334 therebetween within an order of magnitude of 1 m^2 kelvin/watt.

21. The method of any of the above METHOD CLAUSES, wherein routing DC power 368 from the one or more AC/DC converters 358 to the one or more chargers 366 comprises:
    charging the first and second lithium-based battery units 365 simultaneously within respective adjacent first and second (outward-facing or otherwise) outwardly-exhausted cubby holes 569 separated by one or more (layers 3330 comprising) materials 3333 having a nominal (aggregate or other total median) R factor 3334 therebetween within an order of magnitude of 10 m^2 kelvin/watt.

22. The method of any of the above METHOD CLAUSES, wherein routing DC power 368 from the one or more AC/DC converters 358 to the one or more chargers 366 comprises:
    charging the multiple battery units 365 all simultaneously within the first remote tract 250 at an aggregate charging rate 369 within an order of magnitude of 50 kilowatts per motor vehicle.

23. The method of any of the above METHOD CLAUSES, wherein routing DC power 368 from the one or more AC/DC converters 358 to the one or more chargers 366 comprises:
    charging multiple lithium-based battery units 365 so that the first lithium-based battery unit 365 thereafter contains within an order of magnitude of 100 watt-hours (Wh) of energy.

24. The method of any of the above METHOD CLAUSES, wherein routing DC power 368 from the one or more AC/DC converters 358 to the one or more chargers 366 comprises:
    charging multiple lithium-based battery units 365 so that the first lithium-based battery unit 365 thereafter contains within an order of magnitude of 1000 watt-hours (Wh) of energy.

25. The method of any of the above METHOD CLAUSES, wherein routing DC power 368 from the one or more AC/DC converters 358 to the one or more chargers 366 comprises:
    charging multiple lithium-based battery units 365 simultaneously, including the first and second lithium-based battery units 365, at an aggregate charging rate 369 within the first remote tract 250 within an order of magnitude of 50 kilowatts per motor vehicle 230 of the one or more motor vehicles 230.

26. The method of any of the above METHOD CLAUSES, wherein routing DC power 368 from the one or more AC/DC converters 358 to the one or more chargers 366 comprises:
    charging multiple lithium-based battery units 365 simultaneously, including the first and second lithium-based battery units 365, at an aggregate charging rate 369 within the first remote tract 250 within an order of magnitude of 500 kilowatts per motor vehicle 230 of the one or more motor vehicles 230.

27. The method of any of the above METHOD CLAUSES, wherein routing DC power 368 from the one or more AC/DC converters 358 to the one or more chargers 366 comprises:
    charging multiple lithium-based battery units 365 simultaneously, including the first and second lithium-based battery units 365, at an aggregate charging rate 369 within the first remote tract 250 within an order of magnitude of 50-500 kilowatts, wherein the one or more motor vehicles 230 consist of a single vehicle 230 and wherein the single vehicle is a truck with a trailer 439.

28. The method of any of the above METHOD CLAUSES, wherein routing DC power 368 from the one or more AC/DC converters 358 to the one or more chargers 366 comprises:
    charging third and fourth lithium-based battery units 365 simultaneously;
    after a first aircraft/drone leaves and returns, loading numerous additional propagule capsules aboard the first aircraft/drone and replacing the first lithium-based battery unit with the third lithium-based battery unit; and
    after a second aircraft/drone leaves and returns, loading numerous other propagule capsules aboard the second aircraft/drone and replacing the second lithium-based battery unit with the fourth lithium-based battery unit.

29. The method of any of the above METHOD CLAUSES, comprising:
    powering the first aircraft/drone with a third lithium-based battery unit while the numerous additional propagule capsules are deployed remotely; and
    powering the first aircraft/drone with a fourth lithium-based battery unit while the numerous other propagule capsules are deployed remotely.

30. The method of any of the above METHOD CLAUSES, wherein routing DC power 368 from the one or more AC/DC converters 358 to the one or more chargers 366 comprises:
    charging (at least) the first and second lithium-based battery units 365 simultaneously.

31. The method of any of the above METHOD CLAUSES, wherein routing DC power 368 from the one or more AC/DC converters 358 to the one or more chargers 366 comprises:
    charging the first lithium-based battery unit 365 so that the first lithium-based battery unit 365 thereafter contains within an order of magnitude of 100-1000 watt-hours (Wh) of energy.

32. The method of any of the above METHOD CLAUSES, wherein routing DC power 368 from the one or more AC/DC converters 358 to the one or more chargers 366 comprises:
    charging the first lithium-based battery unit 365A so that the first lithium-based battery unit 365A thereafter contains more than 400 watt-hours (Wh) of energy.
33. The method of any of the above METHOD CLAUSES, comprising:
    powering first and second aircraft/drones 431, 1231 both simultaneously at the first remote tract 250 more than 100 meters from any conventional utility power grid conduit 3248 by the first and second lithium-based battery units 365 so as to deploy a multitude of propagules to the first remote tract 250.
34. The method of any of the above METHOD CLAUSES, comprising:
    configuring a single truck to haul a first electrical power source 352, a first current-limiting disconnect switch 353, a first camlock interface 354, a first power converter 358, one or more DC buses 359, and one or more chargers 366.

35. The method of any of the above METHOD CLAUSES, wherein powering first and second aircraft/drones comprises:
 powering first and second aircraft/drones by the first and second lithium-based battery units respectively while the first and second aircraft/drones each carry dozens of or more payloads simultaneously therein.

36. The method of any of the above METHOD CLAUSES, wherein powering first and second aircraft/drones comprises:
 powering first and second aircraft/drones by the first and second lithium-based battery units respectively while the first and second aircraft/drones deploy numerous propagule capsules therein.

37. The method of any of the above METHOD CLAUSES, comprising:
 configuring the motor vehicle 230 to be borne by one or more wheels.

38. The method of any of the above METHOD CLAUSES, comprising:
 configuring the motor vehicle 230 to be borne by propellers or other wings.

39. The method of any of the above METHOD CLAUSES, comprising:
 configuring the motor vehicle 230 as a passenger vehicle.

40. The method of any of the above METHOD CLAUSES, wherein a first camlock interface is configured to couple a first electrical power source to the first current-limiting disconnect switch and thereby to receive AC power from the first electrical power source.

41. The method of any of the above METHOD CLAUSES, comprising:
 fostering propagule growth by aggregating location-specific artificial biometrics of a depiction 1425, by transmitting a notification (requesting an expedited verdict 1275, e.g.) selectively as an automatic and conditional response to a determination of which of the location-specific artificial biometrics are within a selected range 1577.

42. The method of any of the above METHOD CLAUSES, comprising:
 fostering propagule growth by holding a multitude of propagule capsules 210, 2010, 3110, 3210 so as to be supported by the first aircraft/drone 431, 1231 and by deploying at least some of the multitude of propagule capsules 210, 2010, 3110, 3210 to a vicinity of a first planting site 255 within the first remote tract 250.

43. The method of any of the above METHOD CLAUSES, wherein the one or more motor vehicles 230 consist of a single motor vehicle 230 including a trailer 439.

44. The method of any of the above METHOD CLAUSES, wherein powering first and second aircraft/drones 431, 1231 at a first remote tract 250, more than 100 meters from any conventional utility power grid conduit 3248, comprises:
 fostering propagule growth (according to forestry or other agricultural technologies known or described herein) by depositing propagule capsules 210, 2010, 3110, 3210 via the first and second aircraft/drones 431, 1231 within the first remote tract 250.

45. The method of any of the above METHOD CLAUSES, wherein a first propagule capsule 210 thereof is configured so that more than half of (a surface of) at least one propagule 207, 3107 is exposed to air or another gas 173 in the first propagule capsule 210.

46. The method of any of the above METHOD CLAUSES, wherein a first propagule capsule thereof is configured with a first layer 2931, 3231 having a diameter 242, 2942 that is more than twice its thickness 241, 3041

47. The method of any of the above METHOD CLAUSES, comprising:
 after a first aircraft/drone 431, 1231 thereof leaves and returns, loading numerous additional propagule capsules 210, 2010, 3110, 3210 aboard the first aircraft/drone 431, 1231 and replacing a first lithium-based battery unit 365 thereof with a locally recharged third lithium-based battery unit 365;
 after a second aircraft/drone 431, 1231 leaves and returns, loading numerous other propagule capsules 210, 2010, 3110, 3210 aboard the second aircraft/drone 431, 1231 and replacing a second lithium-based battery unit 365 thereof with a locally recharged fourth lithium-based battery unit 365; and
 powering the first aircraft/drone 431, 1231 (at least) with one of the lithium-based battery units 365 while the numerous additional propagule capsules 210, 2010, 3110, 3210 are deployed remotely (i.e. from any accessible power grid).

48. The method of any of the above METHOD CLAUSES, wherein routing DC power 368 comprises:
 charging first and second lithium-based battery units 365 thereof so that each contains more than 400 watt-hours (Wh) of energy before powering the first and second aircraft/drones 431, 1231 therefrom.

49. The method of any of the above METHOD CLAUSES, wherein configuring the vehicle 230 comprises:
 configuring one or more motor vehicles 230 thereof to include one or more (generators or other) electrical power sources 352 configured to provide alternating-current (AC) power (directly or otherwise) through a first current-limiting disconnect switch 353 and to one or more alternating-current-to-direct-current (AC/DC) converters 358A-C, wherein the single truck 430 is configured to haul the first electrical power source 352, the first current-limiting disconnect switch 353, the first camlock interface 354, one or more direct-current (DC) buses 359, and one or more chargers 366A-E.

50. The method of any of the above METHOD CLAUSES, wherein configuring the vehicle 230 comprises:
 configuring as one or more motor vehicles 230 thereof a single truck 430 that includes one or more electrical power sources 352 configured to provide alternating-current (AC) power through a first current-limiting disconnect switch 353 and a first camlock interface 354 and to one or more alternating-current-to-direct-current (AC/DC) converters 358A-C, wherein the single truck 430 is configured to haul the first electrical power source 352, the first current-limiting disconnect switch 353, the first camlock interface 354, one or more direct-current (DC) buses 359, and one or more chargers 366A-E.

51. The method of any of the above METHOD CLAUSES, wherein configuring the vehicle 230 comprises:
configuring as one or more motor vehicles 230 thereof a single truck 430 coupled to a trailer 439 that (collectively) includes one or more electrical power sources 352 configured to provide alternating-current (AC) power through a first current-limiting disconnect switch 353 and a first camlock interface 354 and to one or more alternating-current-to-direct-current (AC/DC) converters 358A-C, wherein the single truck 430 is configured to haul the first electrical power source 352, the first current-limiting disconnect switch 353, the first camlock interface 354, one or more direct-current (DC) buses 359, and one or more chargers 366A-E.

52. The method of any of the above METHOD CLAUSES, wherein configuring the vehicle 230 comprises:
configuring as one or more motor vehicles 230 thereof a single truck 430 coupled to a trailer 4 that includes one or more electrical power sources 352 configured to provide alternating-current (AC) power through a first current-limiting disconnect switch 353 and a first camlock interface 354 and to one or more alternating-current-to-direct-current (AC/DC) converters 358A-C, wherein the single truck 430 is configured to haul the first electrical power source 352, the first current-limiting disconnect switch 353, the first camlock interface 354, one or more direct-current (DC) buses 359, and one or more chargers 366A-E; wherein DC power 368 is routed from (at least one of) the one or more AC/DC converters 358 through one or more direct-current (DC) buses 359 to one or more chargers 366A-E so as to charge first, second, third, and fourth lithium-based battery units 365A-D therethrough simultaneously.

53. The method of any of the above METHOD CLAUSES, wherein configuring the vehicle 230 comprises:
configuring as one or more motor vehicles 230 thereof a single truck 430 coupled to a trailer 439 that includes one or more electrical power sources 352 configured to provide alternating-current (AC) power through a first current-limiting disconnect switch 353 and a first camlock interface 354 and to one or more alternating-current-to-direct-current (AC/DC) converters 358A-C, wherein the single truck 430 is configured to haul the first electrical power source 352, the first current-limiting disconnect switch 353, the first camlock interface 354, one or more direct-current (DC) buses 359, and one or more chargers 366A-E; wherein DC power 368 is routed from (at least one of) the one or more AC/DC converters 358 through one or more direct-current (DC) buses 359 to one or more chargers 366A-E so as to charge first, second, third, and fourth lithium-based battery units 365A-D therethrough simultaneously and so that each of the first, second, third, and fourth lithium-based battery units 365A-D thereafter contains more than 400 watt-hours (Wh) of energy.

54. The method of any of the above METHOD CLAUSES, wherein configuring the vehicle 230 comprises:
configuring a single truck 430 as the motor vehicle 230 to haul the first electrical power source 352, the first current-limiting disconnect switch 353, the first camlock interface 354, the first power converter 358, the one or more direct-current (DC) buses 359, and the one or more chargers 366A-E.

55. The method of any of the above METHOD CLAUSES, wherein powering the first and second aircraft/drones comprises:
powering first and second aircraft/drones 431, 1231 (at least partly) by the first and second lithium-based battery units 365 respectively while the first and second aircraft/drones 431, 1231 deploy dozens of or more propagule capsules 210, 2010, 3110, 3210 therein.

56. The method of any of the above METHOD CLAUSES, wherein configuring the vehicle 230 comprises:

configuring the motor vehicle 230 to be borne by one or more wheels 437.

57. The method of any of the above METHOD CLAUSES, wherein configuring the vehicle 230 comprises:

configuring the motor vehicle 230 to be borne by propellers or other wings 434.

58. The method of any of the above METHOD CLAUSES, wherein configuring the vehicle 230 comprises:

configuring the motor vehicle 230 as a passenger vehicle (i.e. to bear at least one person).

59. The method of any of the above METHOD CLAUSES, wherein first camlock interface 354 is configured to couple a first electrical power source 352 directly (i.e. not through active circuitry but only through passive conduits) to the first current-limiting disconnect switch 353 and thereby to receive alternating-current (AC) power 367 from the first electrical power source 352.

60. The method of any of the above METHOD CLAUSES, comprising:

incorporating one or more fibrous or other particulate media as a component (i.e. as some or all) of one or more growth media 126, 3126 such that the one or more particulate media is sufficiently coarse or porous (or both) so that a capsule body component (a housing 240 or layer 2931, 3231) contains more than 3% interstitial gas by volume.

61. The method of any of the above METHOD CLAUSES, comprising:

incorporating one or more particulate media as a component of one or more growth media 126, 3126 such that the one or more particulate media is sufficiently coarse so that a capsule body component contains more than 0.5% interstitial gas 173 by volume (between pieces thereof).

62. The method of any of the above METHOD CLAUSES, comprising:

incorporating one or more particulate media as a component of one or more growth media 126, 3126 such that the one or more particulate media is sufficiently porous so that a capsule body component contains more than 0.5% interstitial gas 173 by volume (in pores thereof).

63. The method of any of the above METHOD CLAUSES, wherein deploying the first propagule capsule 210, 2010, 3110, 3210 comprises:

releasing the first propagule capsule 210, 2010, 3110, 3210 in a tumbling trajectory 3197.

64. The method of any of the above METHOD CLAUSES, wherein deploying the first propagule capsule 210, 2010, 3110, 3210 comprises:

releasing the first propagule capsule 210, 2010, 3110, 3210 in a tumbling trajectory 3197, wherein tumbling trajectory 3197 is created haphazardly, in lieu of any effective mechanism for ensuring that the first side 3091, 3161 will land below the second side 3092, 3162.

65. The method of any of the above METHOD CLAUSES, wherein configuring the one or more media 126, 3126 in a first layer 2931, 3231 comprises:
   forming a borehole 2968 extending through most of the thickness 241, 3041 of the first layer 2931, 3231 as the one or more recessed portions 208 on the first side 3161.

66. The method of any of the above METHOD CLAUSES, wherein first layer 2931, 3231 protects the first propagule against rodent predation long enough for a root to grow from the first propagule into the planting site 255.

67. The method of any of the above METHOD CLAUSES, wherein a weight majority of at least one artificial water-transfer conduit of the first propagule capsule 210, 2010, 3110, 3210 is dehydrated compressed peat 162 or another growing medium 126 configured to undergo a volumetric expansion of more than 20% when hydrated.

68. The method of any of the above METHOD CLAUSES, wherein an exterior surface of the first propagule capsule 210, 3110 includes a soil-contacting portion of a first water collector larger than 1 square centimeter and is configured to absorb more than 5 microliters of liquid per hour directly from surrounding soil 2599 by wicking.

69. The method of any of the above METHOD CLAUSES, wherein an endmost portion longer than 0.5 mm of the first propagule capsule 210, 3110 has a footprint 212 of about 2 square mm, wherein first propagule capsule 210, 3110 is less than 5% water by weight.

70. The method of any of the above METHOD CLAUSES, wherein one or more propagules comprise a dormant seed 107 of a tree.

71. The method of any of the above METHOD CLAUSES, wherein first propagule capsule 210, 2010, 3110, 3210 lands with a first side 3161 thereof upon and above the first microsite.

72. The method of any of the above METHOD CLAUSES, wherein first propagule capsule 210, 2010, 3110, 3210 has a substantial component (i.e. a volumetric majority or other portion 208 larger than 10% by volume) of dried compressed peat 162.

73. The method of any of the above METHOD CLAUSES, wherein first propagule capsule 210, 2010, 3110, 3210 has a substantial component (i.e. a volumetric majority or other portion 208 larger than 10% by volume) of coconut coir 161.

74. The method of any of the above METHOD CLAUSES, wherein first propagule capsule 210, 2010, 3110, 3210 has a substantial component (i.e. a volumetric majority or other portion 208 larger than 10% by volume) of one or more hydration-activated expanding growth media 126 (e.g. dried compressed coconut coir 161, peat 162, or a mixture thereof).

75. The method of any of the above METHOD CLAUSES, wherein below-ground seepage, dew, or rain later perfuses the dried and highly compressed media 126, 3126 (by capillary action, e.g.) and thereby triggers a volumetric expansion of the media 126, 3126.

76. The method of any of the above METHOD CLAUSES, wherein a volumetric expansion of at least some of the first propagule capsule 210, 2010, 3110, 3210 allows a first propagule 207, 3107 therein to grow upward through the media 126, 3126.

77. The method of any of the above METHOD CLAUSES, wherein local hydration allows at least one root 2787 from the one or more propagules 207, 3107 to grow in a generally downward direction (within 45 degrees) into the planting site 255.

78. The method of any of the above METHOD CLAUSES, wherein a biodegradable containment covering 2936 comprises a water-soluble polymer, wax paper, or a similar slippery material adhesively affixed to a major flat surface of the first side 3091, 3161.

79. The method of any of the above METHOD CLAUSES, wherein at least a first one of the one or more propagules 207, 3107 is surrounded with one or more fill materials 3170 (having components) that are sufficiently granular so that more than half of (a surface area of) the first propagule 207 is exposed to an ambient gas 173, 3173 (e.g. air or nitrogen) and thereby facilitating access to water and suitable drainage.

80. The method of any of the above METHOD CLAUSES, comprising:
   creating the first propagule capsule 210, 2010, 3110, 3210 by forming a fibrous or granular mixture 113 of one or more fibrous or granular base materials (e.g. coir 161 or peat 162) with one or more supplements 142 and a first adhesive material 145 such that prior to curing the first adhesive material 145 comprises at least 1% of the fibrous or granular mixture 113 by weight;
   surrounding a first propagule 207, 3107 with the fibrous or granular mixture 113; and
   curing at least the first adhesive material 145 of the fibrous or granular mixture 113 surrounding the first propagule 207, 3107.

81. The method of any of the above METHOD CLAUSES, wherein local hydration later (e.g. several hours or days after deployment of the first propagule capsule) allows the growth media 126, 3126 to expand volumetrically by more than 10% and thereby allows at least the one root to escape the propagule capsule 210, 2010, 3110, 3210.

82. The method of any of the above METHOD CLAUSES, wherein local hydration later (e.g. several hours or days after deployment of the first propagule capsule) allows the growth media 126, 3126 to expand volumetrically by more than 20% and thereby allows the at least one root to escape the propagule capsule 210, 2010, 3110, 3210.

83. The method of any of the above METHOD CLAUSES, wherein deploying the first propagule capsule 210, 2010, 3110, 3210 comprises launching the first propagule capsule 210, 2010, 3110, 3210 from the first aircraft/drone 431, 1231.

84. The method of any of the above METHOD CLAUSES, wherein first aircraft/drone 431, 1231 is configured to cause the first propagule capsule 210, 2010, 3110, 3210 to follow a tumbling trajectory 3197 during deployment.

85. The method of any of the above METHOD CLAUSES, wherein first aircraft/drone 431, 1231 is configured to cause the first propagule capsule 210, 2010, 3110, 3210 to bounce on a sloped guide 3195 into a tumbling trajectory 3197 during deployment.

86. The method of any of the above METHOD CLAUSES, wherein planting site 255 is a microsite 1755.

87. The method of any of the above METHOD CLAUSES, wherein loading the multitude of the propagule capsules 210, 2010, 3110, 3210 comprises:
   loading the multitude of propagule capsules 210, 2010, 3110, 3210 including the first propagule capsule 210, 2010, 3110, 3210 into a capsule stack 3189 within a chamber shorter than 1 meter of a planting module 450 of the aircraft/drone 431, 1231.

88. The method of any of the above METHOD CLAUSES, wherein loading the multitude of the propagule capsules 210, 2010, 3110, 3210 comprises:
  loading the multitude of propagule capsules 210, 2010, 3110, 3210 including the first propagule capsule 210, 2010, 3110, 3210 into a capsule stack 3189 within a chamber shorter than 1 meter of a sleeve 3188 or cartridge 488 aboard the aircraft/drone 431, 1231.

89. The method of any of the above METHOD CLAUSES, wherein loading the multitude of the propagule capsules 210, 2010, 3110, 3210 comprises:
  loading the multitude of propagule capsules 210, 2010, 3110, 3210 including the first propagule capsule 210, 2010, 3110, 3210 into a capsule stack 3189 within the aircraft/drone 431, 1231.

90. The method of any of the above METHOD CLAUSES, wherein volumetric majority (e.g. as portion 208) of the first propagule capsule 210, 2010, 3110, 3210 comprises growth media 126, 3126 volumetrically compressed by more than 1% when the first propagule capsule 210, 2010, 3110, 3210 is deployed and wherein first propagule capsule 210, 2010, 3110, 3210 later expands in response to hydration 2094.

91. The method of any of the above METHOD CLAUSES, wherein first propagule capsule 210, 2010, 3110, 3210 is dry in that less than 5% of a weight of the first propagule capsule 210, 2010, 3110, 3210 is (unsealed, unfrozen, and otherwise) available liquid hydration at the time of capsule deployment.

92. The method of any of the above METHOD CLAUSES, wherein method includes all of the operations depicted in FIG. 7.

93. The method of any of the above METHOD CLAUSES, comprising configuring a cartridge 488 to allow a first propagule capsule 210, 2010, 3110, 3210 to leave the cartridge 488 while dozens (i.e. at least 24) of other propagule capsules 210, 2010, 3110, 3210 are all nominally aligned in parallel.

94. The method of any of the above METHOD CLAUSES, comprising:
  configuring a aircraft/drone propulsion subassembly to have one or more robotic limbs (legs or wings 434, e.g.) so as to allow the first unmanned vehicle 230 to ambulate (walk or fly, e.g.); and
  positioning a steerable chute 2178 and one or more actuators (a solenoid or other motor control in gimbal, e.g.) configured to adjust an angle of the steerable chute 2178 relative to the aircraft/drone propulsion subassembly by more than one degree in less than 100 milliseconds.

95. The method of any of the above METHOD CLAUSES, wherein the one or more propagules 207 comprise a dormant seed 107 of a coniferous tree (a pine, e.g.).

While various system, method, article of manufacture, or other embodiments or aspects have been disclosed above, also, other combinations of embodiments or aspects will be apparent to those skilled in the art in view of the above disclosure. The various embodiments and aspects disclosed above are for purposes of illustration and are not intended to be limiting, with the true scope and spirit being indicated in the final claim set that follows.

What is claimed is:

1. A propagule growth facilitation method comprising:
  configuring one or more dry media in a first layer so that a thickness of the first layer is within an order of magnitude of 1 centimeter (cm);
  forming one or more recessed portions on a first side of and one or more recessed portions on a second side of the first layer, wherein the recessed portions each comprise a borehole extending through most of the thickness of the first layer;
  holding a first propagule at least partly within the recessed portion of the first side by affixing a biodegradable containment covering to the first side of the first layer with more than half of the first propagule exposed to a gas;
  holding a second propagule at least partly within the recessed portion of the second side by affixing a biodegradable containment covering to the second side of the first layer with more than half of the second propagule exposed to a gas so as to assemble a first propagule capsule; and
  deploying the first propagule capsule with a tumbling trajectory haphazardly, in lieu of any effective mechanism for ensuring that the first side will land below the second side, and so that it lands with the first side thereof upon or otherwise adjacent a planting site, wherein the first layer protects the first propagule against predation long enough for a root to grow from the first propagule into the planting site.

2. The propagule growth facilitation method of claim 1, wherein the one or more dry media in the first layer is configured so that a diameter of the first layer is more than twice its thickness.

3. The propagule growth facilitation method of claim 1, wherein the configuring the one or more dry media comprises:

incorporating one or more growth media as a component of the one or more dry media such that the one or more growth media is sufficiently coarse or porous so that the first layer contains more than 1% interstitial gas by volume.

4. A propagule growth facilitation method comprising:

configuring one or more dry media in a first layer so that a thickness of the first layer is within an order of magnitude of 1 centimeter;

forming one or more recessed portions on a first side of and one or more recessed portions on a second side of the first layer;

holding a first propagule at least partly within the recessed portion of the first side by affixing a biodegradable containment covering to the first side of the first layer with more than half of the first propagule exposed to a gas;

holding a second propagule at least partly within the recessed portion of the second side by affixing a biodegradable containment covering to the second side of the first layer so as to assemble a first propagule capsule; and deploying the first propagule capsule so that it lands with the first side thereof upon or otherwise adjacent a planting site.

5. The propagule growth facilitation method of claim 4, wherein the configuring the one or more dry media in the first layer so that the thickness of the first layer is within an order of magnitude of 1 centimeter comprises:

configuring the first layer so that a diameter thereof is more than twice a thickness thereof.

6. The propagule growth facilitation method of claim 4, wherein the configuring the one or more dry media comprises:

incorporating one or more growth media as a component of the one or more dry media such that the one or more growth media is sufficiently porous so that the first layer contains more than 0.5% interstitial gas by volume.

7. The propagule growth facilitation method of claim 4, wherein the deploying the first propagule capsule comprises:

releasing the first propagule capsule in a spinning trajectory.

8. The propagule growth facilitation method of claim 4, wherein the deploying the first propagule capsule comprises:

releasing the first propagule capsule in a tumbling trajectory wherein the tumbling trajectory is created haphazardly, in lieu of any effective mechanism for ensuring that the first side will land below the second side.

9. The propagule growth facilitation method of claim 4, wherein the configuring the one or more media in a first layer comprises:

forming a borehole extending through most of the thickness of the first layer as the one or more recessed portions on the first side.

10. The propagule growth facilitation method of claim 4, wherein the first layer protects the first propagule against rodent predation long enough for a root to grow from the first propagule into the planting site.

11. The propagule growth facilitation method of claim 4, wherein a weight majority of at least one artificial water-transfer conduit of the first propagule capsule is dehydrated compressed peat or another growing medium configured to undergo a volumetric expansion of more than 20% when hydrated.

12. The propagule growth facilitation method of claim 4, wherein an exterior surface of the first propagule capsule includes a soil-contacting portion of a first water collector larger than 1 square centimeter and is configured to absorb more than 5 microliters of liquid per hour directly from surrounding soil by wicking.

13. The propagule growth facilitation method of claim 4, wherein an endmost portion longer than 0.5 mm of the first propagule capsule has a footprint of about 2 square mm, wherein the first propagule capsule is less than 5% water by weight.

14. The propagule growth facilitation method of claim 4, wherein the one or more propagules comprise a dormant seed of a tree.

15. The propagule growth facilitation method of claim 4, wherein the first propagule capsule has a substantial component of coconut coir.

16. The propagule growth facilitation method of claim 4, wherein the first propagule capsule has a substantial component of one or more hydration-activated expanding growth media.

17. The propagule growth facilitation method of claim 4, wherein below-ground seepage, dew, or rain later perfuses the dried and highly compressed media and thereby triggers a volumetric expansion of the media.

18. The propagule growth facilitation method of claim 4, wherein a volumetric expansion of at least some of the first propagule capsule allows a first propagule therein to grow upward through the media.

19. The propagule growth facilitation method of claim 4, wherein local hydration allows at least one root from the one or more propagules to grow in a generally downward direction into the planting site.

20. The propagule growth facilitation method of claim 4, wherein at least a first one of the one or more propagules is surrounded with and in contact with one or more fill materials that are sufficiently granular so that more than half of the first propagule is exposed to an ambient gas and thereby facilitating access to water and suitable drainage.

* * * * *